US012552162B2

(12) United States Patent
Hanada

(10) Patent No.: US 12,552,162 B2
(45) Date of Patent: Feb. 17, 2026

(54) LIQUID DISCHARGE HEAD AND LIQUID DISCHARGE APPARATUS

(71) Applicant: Takaya Hanada, Kanagawa (JP)

(72) Inventor: Takaya Hanada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 81 days.

(21) Appl. No.: 18/600,808

(22) Filed: Mar. 11, 2024

(65) Prior Publication Data

US 2024/0308214 A1 Sep. 19, 2024

(30) Foreign Application Priority Data

Mar. 15, 2023 (JP) ................................ 2023-040396

(51) Int. Cl.
*B41J 2/14* (2006.01)
*B41J 2/175* (2006.01)

(52) U.S. Cl.
CPC ....... *B41J 2/14201* (2013.01); *B41J 2/17596* (2013.01)

(58) Field of Classification Search
CPC .. B41J 2/14201; B41J 2/17596; B41J 2/1606; B41J 2/1607; B41J 2/1632; B41J 2/1623; B41J 2/1626; B41J 2/1642; B41J 2/162; B41J 2002/14475; B41J 2202/05; B41J 2202/12; B05B 1/14; B05B 1/3046; B05B 13/0431; B05B 15/58; B05B 13/0452; F16K 1/42
See application file for complete search history.

(56) References Cited

U.S. PATENT DOCUMENTS

2005/0103902 A1 5/2005 Hornsell et al.
2006/0238587 A1 10/2006 Horsnell et al.
2019/0077163 A1* 3/2019 Sato .................... B41J 2/17509
2019/0100008 A1* 4/2019 Sugai .................... F04B 17/003
(Continued)

FOREIGN PATENT DOCUMENTS

JP H07-189922 A 7/1995
JP 2006-168143 A 6/2006
(Continued)

OTHER PUBLICATIONS

Extended European Search Report issued Aug. 2, 2024 in European Patent Application No. 24160030.3, 5 pages.

*Primary Examiner* — Kristal Feggins
(74) *Attorney, Agent, or Firm* — XSENSUS LLP

(57) ABSTRACT

A liquid discharge head includes: a nozzle plate having: a first nozzle; and a second nozzle, from each of which a liquid is dischargeable from a first face of the nozzle plate; a channel communicating with each of the first nozzle and the second nozzle, the channel on a second face opposite to the first face of the nozzle plate; multiple cylindrical protrusions having: a first cylindrical protrusion around the first nozzle and protruding continuously from an inner wall face of the first nozzle toward the channel, the first cylindrical protrusion having a first outer diameter; and a second cylindrical protrusion around the second nozzle and protruding continuously from an inner wall face of the second nozzle toward the channel, the second cylindrical protrusion having a second outer diameter larger than the first outer diameter of the first cylindrical protrusion.

16 Claims, 35 Drawing Sheets

(56) References Cited

U.S. PATENT DOCUMENTS

| | | | |
|---|---|---|---|
| 2019/0217614 A1 | 7/2019 | Kaiba et al. |
| 2020/0039217 A1 | 2/2020 | Kaiba et al. |
| 2020/0324312 A1 | 10/2020 | Kaiba et al. |
| 2022/0111405 A1 | 4/2022 | Maruyama et al. |
| 2022/0111406 A1 | 4/2022 | Kudoh et al. |
| 2022/0379609 A1 | 12/2022 | Matsufuji et al. |
| 2023/0286271 A1 | 9/2023 | Murai et al. |
| 2023/0302799 A1 | 9/2023 | Fujita et al. |
| 2023/0321979 A1 | 10/2023 | Saito |

FOREIGN PATENT DOCUMENTS

| | | | |
|---|---|---|---|
| JP | 2018-126917 | A | 8/2018 |
| JP | 2020-023177 | A | 2/2020 |
| WO | 94/08794 | A1 | 4/1994 |
| WO | WO2018/108576 | A1 | 6/2018 |

* cited by examiner

FIG. 17A

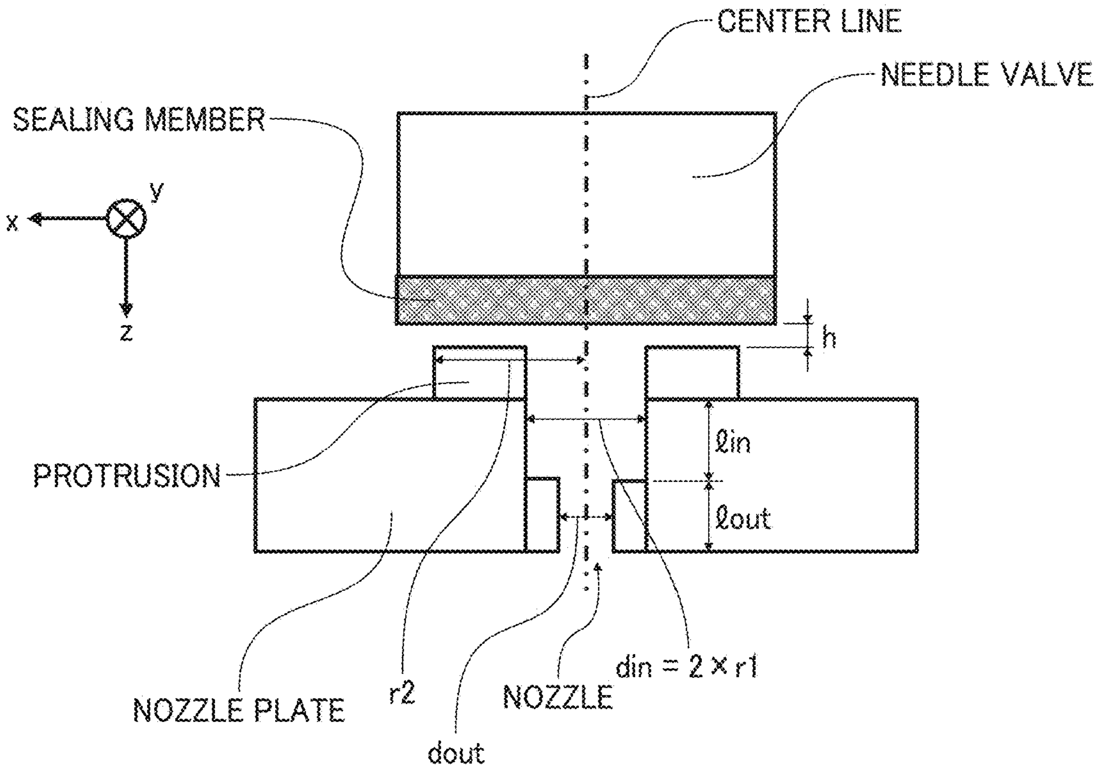

FIG. 17B

Rf EQUATION: $$\frac{6\mu \ln\left(\frac{r_2 - \Delta x}{r_1}\right)}{\pi h^3} + \frac{128\,\mu l_{out}}{\pi d_{out}^4} + \frac{128\,\mu l_{in}}{\pi d_{in}^4} = R_f$$

FIG. 17C

<SET VALUE>

INK VISCOSITY $\mu$: 100cp

INLET NOZZLE DIAMETER din = 2 × r1: 150 $\mu$m

OUTLET NOZZLE DIAMETER dout: 100 $\mu$m

PROTRUSION (SEAL) OUTER DIAMETER 2 × r2: 300 $\mu$m

INLET NOZZLE LENGTH ℓin: 400 $\mu$m

OUTLET NOZZLE LENGTH ℓout: 100 $\mu$m

DISTANCE h BETWEEN NEEDLE VALVE AND PROTRUSION h: 30 $\mu$m

* Δx = EDGE PROCESSING WIDTH (EDGE PROCESSING AMOUNT)

FIG. 19A

| NOZZLE NO. | r2 (μm) | Δx (μm) | Rf |
|---|---|---|---|
| NOZZLE 1 | 320 | 21 | $8.9 \times 10^{12}$ |
| NOZZLE 2 | 340 | 31 | $8.9 \times 10^{12}$ |
| NOZZLE 3 | 280 | 1 | $8.9 \times 10^{12}$ |

FIG. 19B

| NOZZLE NO. | ℓout (μm) | Δx (μm) | Rf |
|---|---|---|---|
| NOZZLE 1 | 105 | 10 | $9.1 \times 10^{12}$ |
| NOZZLE 2 | 110 | 15 | $9.1 \times 10^{12}$ |
| NOZZLE 3 | 95 | 1 | $9.1 \times 10^{12}$ |

FIG. 19C

| NOZZLE NO. | dout (μm) | Δx (μm) | Rf |
|---|---|---|---|
| NOZZLE 1 | 99 | 12 | $9.0 \times 10^{12}$ |
| NOZZLE 2 | 97 | 19 | $9.0 \times 10^{12}$ |
| NOZZLE 3 | 102 | 1 | $9.0 \times 10^{12}$ |

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-040396, filed on Mar. 15, 2023, in the Japan Patent Office, the entire disclosure of which is hereby incorporated by reference herein.

BACKGROUND

Technical Field

The present embodiment relates to a liquid discharge head and a liquid discharge apparatus.

Description of the Related Art

A liquid discharge head discharges droplets such as ink from a nozzle, and discharges liquid by opening and closing the nozzle using a nozzle opening/closing valve (needle valve) arranged on the nozzle (nozzle hole), a nozzle opening/closing driver (piezoelectric element, actuator) that brings (separates) the nozzle opening/closing valve into contact with (from) the nozzle, and a controller that controls the nozzle opening/closing driver.

In such liquid discharge head, the liquid to be discharged is pressurized and supplied to the nozzle, and in this state, the nozzle opening/closing valve comes into contact with (is separated from) the nozzle, so that the pressurized and supplied liquid is discharged as droplets from the nozzle only while the nozzle opening/closing valve is separated from the nozzle. It is possible to implement the discharge of the liquid according to a pressurizing force to the liquid, a distance of a gap between the nozzle opening/closing valve and the nozzle, that is, the fluid resistance generated by the supply, and an opening/closing time of the nozzle opening/closing valve.

SUMMARY

In an aspect of the present disclosure, a liquid discharge head includes: a nozzle plate having: a first nozzle; and a second nozzle, from each of which a liquid is dischargeable from a first face of the nozzle plate; a channel communicating with each of the first nozzle and the second nozzle, the channel on a second face opposite to the first face of the nozzle plate; multiple cylindrical protrusions having: a first cylindrical protrusion around the first nozzle and protruding continuously from an inner wall face of the first nozzle toward the channel, the first cylindrical protrusion having a first outer diameter; and a second cylindrical protrusion around the second nozzle and protruding continuously from an inner wall face of the second nozzle toward the channel, the second cylindrical protrusion having a second outer diameter larger than the first outer diameter of the first cylindrical protrusion; multiple sealing members having: a first sealing member to contact with a top face of the first cylindrical protrusion; and a second sealing member to contact with a top face of the second cylindrical protrusion; and multiple needle valves including: a first needle valve holding the first sealing member and movable between: a first position at which the first sealing member contacts the first cylindrical protrusion to close the first nozzle; and a second position at which the first sealing member separated from the first cylindrical protrusion to open the first nozzle; and a second needle valve holding the second sealing member and movable between: a first position at which the second sealing member contacts the second cylindrical protrusion to close the second nozzle; and a second position at which the second sealing member separated from the second cylindrical protrusion to open the second nozzle, wherein the first cylindrical protrusion has a first edge processed portion in which a first edge of the first cylindrical protrusion is processed to have a first edge processing width in a radial direction of the first cylindrical protrusion, and the second cylindrical protrusion has a second edge processed portion in which a second edge of the second cylindrical protrusion is processed to have a second edge processing width larger than the first edge processing width in a radial direction of the second cylindrical protrusion.

In another aspect of the present disclosure, a liquid discharge head includes: a nozzle plate having: a first nozzle having a first diameter; and a second nozzle having the first diameter, from each of which a liquid is dischargeable from a first face of the nozzle plate; a channel communicating with each of the first nozzle and the second nozzle, the channel on a second face opposite to the first face of the nozzle plate; multiple sealing members having: a first sealing member having a second diameter larger than the first diameter of the first nozzle, the first sealing member to contact with the second face of the nozzle plate to close the first nozzle; and a second sealing member having a third diameter larger than the first diameter of the second nozzle and the second diameter of the first sealing member, the second sealing member to contact with the second face of the nozzle plate to close the second nozzle; and multiple needle valves including: a first needle valve holding the first sealing member and movable between: a first position at which the first sealing member contacts the second face of the nozzle plate to close the first nozzle; and a second position at which the first sealing member separated from the second face of the nozzle plate to open the first nozzle; and a second needle valve holding the second sealing member and movable between: a first position at which the second sealing member contacts the second face of the nozzle plate to close the second nozzle; and a second position at which the second sealing member separated from the second face of the nozzle plate to open the second nozzle, wherein the first nozzle has a first edge processed portion in which a first edge of the first nozzle on the second face is processed to have a first edge processing width in a radial direction of the first nozzle, and the second nozzle has a second edge processed portion in which a second edge of the second nozzle is processed to have a second edge processing width larger than the first edge processing width in a radial direction of the second nozzle.

In further another aspect of the present disclosure, a liquid discharge head includes: a nozzle plate having: a first nozzle having a first diameter; and a second nozzle having the first diameter, from each of which a liquid is dischargeable from a first face of the nozzle plate; a channel communicating with each of the first nozzle and the second nozzle, the channel on a second face opposite to the first face of the nozzle plate; multiple sealing members having: a first sealing member on the second face of the nozzle plate surrounding the first nozzle, the first sealing member having a first opening having a second diameter larger than the first diameter of the first nozzle; and a second sealing member on the second face of the nozzle plate surrounding the second nozzle, the second sealing member having a second opening having a third diameter larger than the first diameter of the first nozzle and the second diameter of the first opening; and multiple needle valves including: a first needle valve movable between: a first position at which the first needle valve contacts the first sealing member to close the first nozzle; and a second position at which the first needle valve separated from the second sealing member to open the first nozzle; and a second needle valve movable between: a first position at which the second needle valve contacts the second sealing member to close the second nozzle; and a second position at which the second needle valve separated from the second sealing member to open the second nozzle, wherein the first needle valve has a first edge processed portion in which a first edge of the first needle valve facing the second face is processed to have a first edge processing width in a radial direction of the first needle valve, and the second needle valve has a second edge processed portion in which a second edge of the second needle valve is processed to have a second edge processing width larger than the first edge processing width in a radial direction of the second needle valve.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 17A to 17C are diagrams for describing a method of edge processing;

FIGS. 19A to 19C are tables illustrating a specific example of a method of edge processing;

Figure 1:
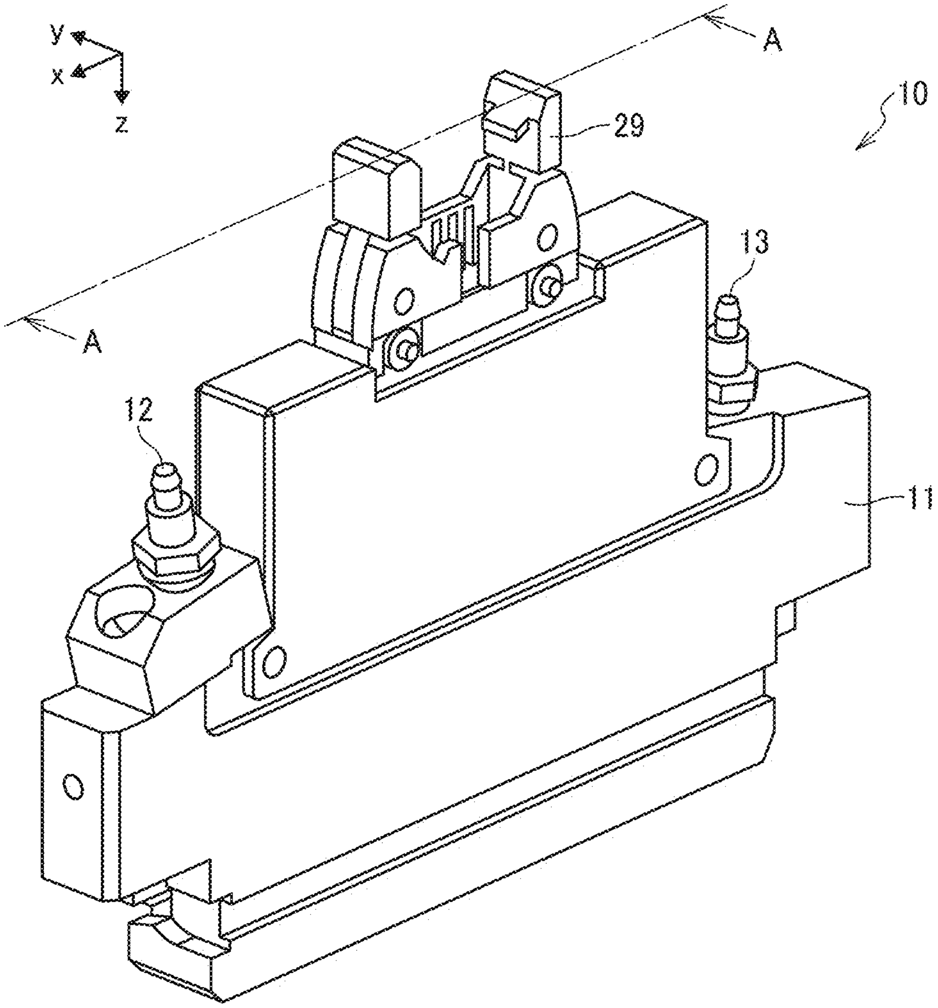
FIG. 1 is a perspective view of a liquid discharge head according to the present embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Any one of the above-described operations may be performed in various other ways, for example, in an order different from the one described above. The methods described above can be provided as program codes stored in a recording medium, to cause a processor to execute the method when executed by at least one processor.

The following is a description of modes for carrying out embodiments of the invention, with reference to the accompanying drawings. As for the description of the drawings, the same components are denoted by the same reference signs, and explanation thereof will not be repeated. Note that the embodiments described below are not limiting the present disclosure, and any deletion, addition, modification, change, and the like can be made within a scope in which a person skilled in the art can conceive including other embodiments, any of which is included within the scope of the present disclosure as long as the effects of the present disclosure can be achieved.

An embodiment according to the present embodiment is described below with reference to the drawings.

In the following description, a drive controller that controls drive of an on/off valve provided on a liquid discharge head is described as a drive controller according to an embodiment of the present embodiment. The liquid discharge head described herein discharges ink as liquid. In the present embodiment, the liquid discharge head is sometimes referred to as a discharge head or a head.

FIG. 1 is an entire perspective view of the liquid discharge head. Here, in FIG. 1, a width direction of the liquid discharge head (nozzle arrangement direction) is an x direction, a depth direction of the liquid discharge head is a y direction, and a height direction of the liquid discharge head (an opening/closing direction of a needle valve, a moving direction of the needle valve, a direction of separating/contacting movement of the needle valve, a separating/contacting direction of the needle valve, or a driving direction of the needle valve) is a z direction. In the subsequent drawings, the definition of the coordinates is similar unless otherwise specified.

A liquid discharge head 10 (an example of the liquid discharge head) includes a housing 11 (an example of a housing). The housing 11 is made of metal or resin. The housing 11 includes a connector 29 to communicate electrical signals at an upper portion of the housing 11. The housing 11 includes a supply port 12 and a collection port 13 on left and right sides thereof. The supply port 12 supplies ink to an interior of the head. The collection port 13 is used to eject the ink (an example of liquid) from the head.

Figure 2:
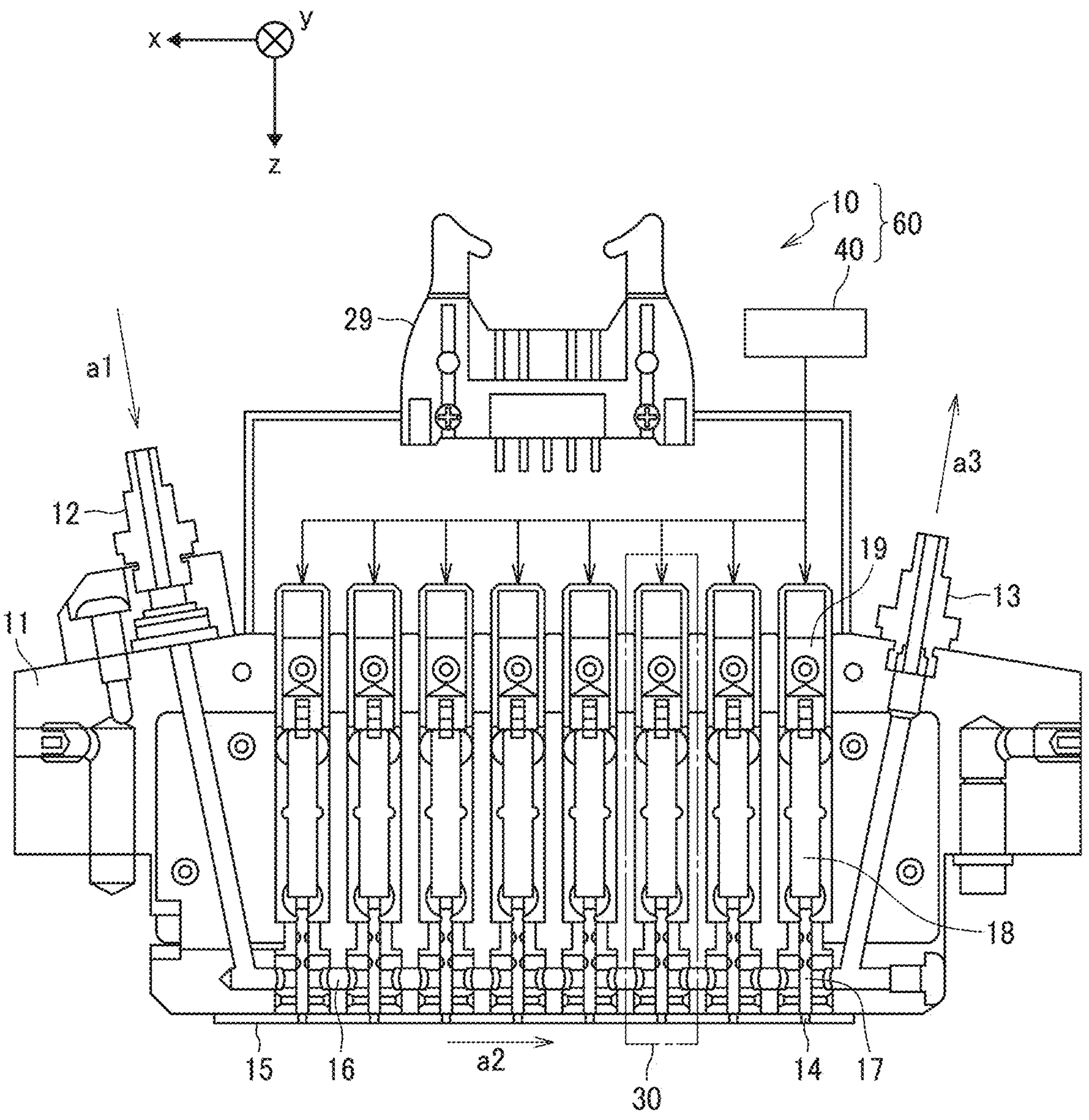
FIG. 2 is a view illustrating a head unit according to the present embodiment.

FIG. 2 is a view illustrating a head unit, and is also a view illustrating a cross section of the liquid discharge head taken along line A-A in FIG. 1. A head unit 60 includes the liquid discharge head 10 and a drive controller 40.

The liquid discharge head 10 includes a nozzle plate 15. The nozzle plate 15 is joined to the housing 11. The nozzle plate 15 includes nozzles 14 that discharge ink. The housing 11 includes a channel 16 (an example of a liquid chamber). The channel 16 sends the ink from the supply port 12 side to the collection port 13 side over the nozzle plate 15. The ink is sent in a direction indicated by arrows a1 to a3 illustrated in FIG. 2 on the channel 16.

Liquid discharge modules 30 are arranged between the supply port 12 and the collection port 13. The liquid discharge module 30 discharges the ink in the channel 16 from the nozzle 14. The number of the liquid discharge modules 30 corresponds to the number of the nozzles 14, and in this example, a configuration is illustrated in which eight liquid discharge modules 30 corresponding to eight nozzles 14 arranged in one row are provided. The number and arrangement of the nozzles 14 and the liquid discharge modules 30 are not limited to the above. For example, the number of the nozzles 14 and the number of the liquid discharge modules 30 may be one instead of plural.

The number may be eight or larger or smaller. The nozzles 14 and the liquid discharge modules 30 may be arranged in a plurality of rows instead of one row.

With the above-described configuration, the supply port 12 takes in the ink in a pressurized state from outside, feeds the ink in the direction indicated by the arrow a1, and supplies the ink to the channel 16. The channel 16 feeds the ink from the supply port 12 in the direction indicated by the arrow a2. Then, the collection port 13 ejects the ink that is not discharged from the nozzles 14 arranged along the channel 16 in the direction indicated by the arrow a3. The channel 16 is also referred to as a liquid chamber.

The liquid discharge module 30 includes a needle valve 17 that opens and closes the nozzle 14 and a piezoelectric element 18 that drives the needle valve 17.

The housing 11 includes a regulator 19 at a position facing an upper end of the piezoelectric element 18. The regulator 19 is in contact with the upper end of the piezoelectric element 18 and serves as a fixing point of the piezoelectric element 18.

Here, the nozzle 14 as an example of the nozzle is also referred to as a discharge port or a nozzle hole, the nozzle plate 15 as an example of the nozzle plate is also referred to as a discharge port forming member, the needle valve 17 as an example of a valve body is also referred to as an on/off valve, and the piezoelectric element 18 as an example of a moving unit is also referred to as a driver.

When the piezoelectric element 18 is operated to move the needle valve 17 upward, the nozzle 14 closed by the needle valve 17 is opened, and the ink is discharged from the nozzle 14. When the piezoelectric element 18 is operated to move the needle valve 17 downward, a leading end of the needle valve 17 comes into contact with the nozzle 14 to close the nozzle 14 so that the ink is not discharged from the nozzle 14. In order to prevent a decrease in discharge efficiency of the ink from the nozzle 14, the ejection of the ink from the collection port 13 may be temporarily stopped during a period in which the ink is discharged to a liquid discharge target.

Figure 3A:
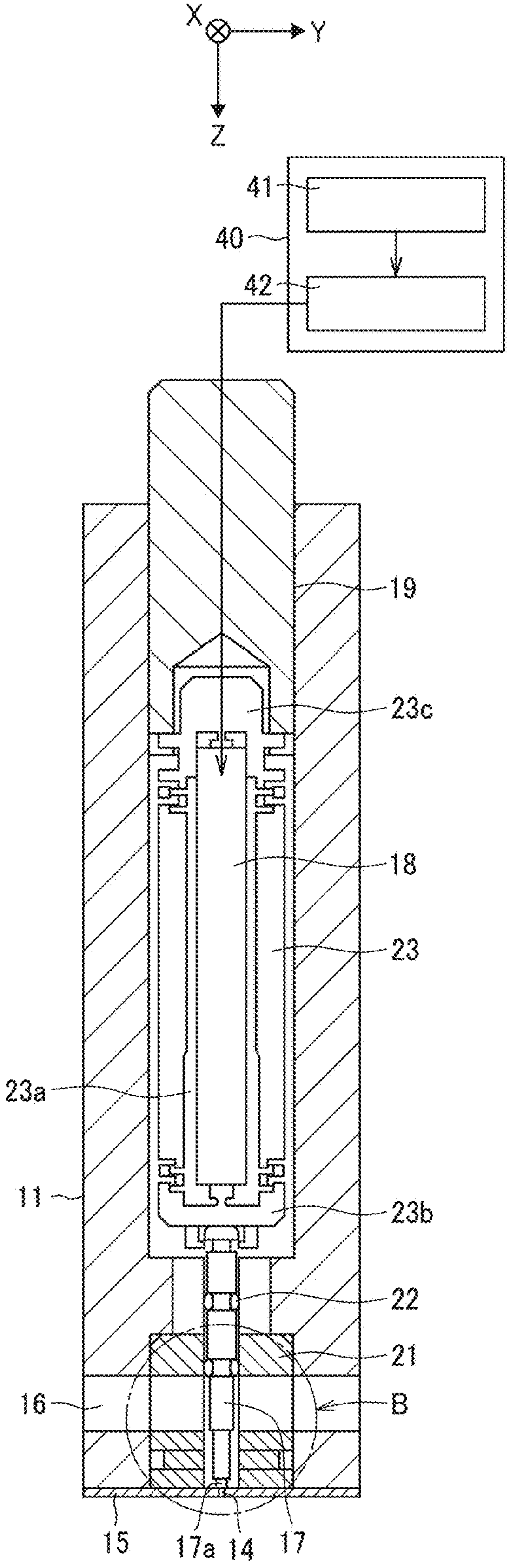
FIGS. 3A and 3B are cross-sectional views illustrating a liquid discharge module.
Figure 3B:
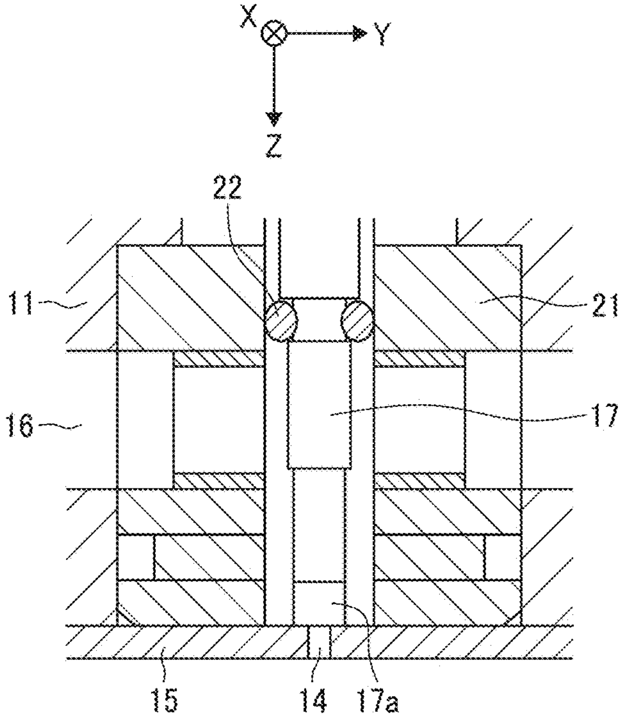

FIGS. 3A and 3B are illustrative views of a single liquid discharge module that forms the liquid discharge head. FIG. 3A is an entire cross-sectional view of the liquid discharge module, and FIG. 3B is an enlarged view of a portion B in FIG. 3A.

The channel 16 is a channel common to a plurality of liquid discharge modules 30 provided in the housing 11.

A sealing member 17*a* (an example of a sealing member), which is an elastic member, is provided at the leading end of the needle valve 17. The sealing member 17*a* is supported by a needle of the needle valve 17. The sealing member 17*a* has a cylindrical shape (ring shape), and is made of rubber and the like as a material from a viewpoint of ensuring a sealing property of the nozzle. By providing such sealing member 17*a* at the leading end, a member that matches the leading end can be used instead of forming an entire needle valve 17 of a single member. When the leading end of the needle valve 17 is pressed against the nozzle plate 15, the sealing member 17*a* is compressed, so that the needle valve 17 surely closes the nozzle 14. A pressing force of the needle valve 17 is herein set to 1 N in consideration of the sealing property. A bearing 21 is provided between the needle valve 17 and the housing 11. A seal member 22 such as an O-ring is provided between the bearing 21 and the needle valve 17. Here, a configuration in which the sealing member is provided at the leading end of the needle valve is described, but as will be described later, the present embodiment may have a configuration in which the sealing member is provided on the nozzle plate side.

The piezoelectric element 18 is accommodated in a space 11*a* inside the housing 11. The holding member 23 holds the piezoelectric element 18 in a central space 23*a*. The piezoelectric element 18 and the needle valve 17 are coaxially coupled via a leading end 23*b* of the holding member 23. The holding member 23 is coupled to the needle valve 17 on the leading end 23*b* side, and is secured by the regulator 19 attached to the housing 11 on a rear end 23*c* side.

When a voltage is applied to the piezoelectric element 18 by the drive controller 40, the piezoelectric element 18 contracts, and the piezoelectric element 18 pulls the needle valve 17 via the holding member 23. As a result, the needle valve 17 is separated from the nozzle 14 to open the nozzle 14. As a result, the ink pressurized and supplied to the channel 16 is discharged from the nozzle 14. When no voltage is applied to the piezoelectric element 18, the needle valve 17 closes the nozzle 14. In this state, even if the ink is pressurized and supplied to the channel 16, the ink is not discharged from the nozzle 14.

The drive controller 40 includes a waveform generation circuit 41 serving as a drive pulse generator and an amplification circuit 42. The waveform generation circuit 41 generates a drive pulse waveform to be described later, and the amplification circuit 42 amplifies a voltage value to a required value. Then, the amplified voltage is applied to the piezoelectric element 18. By the application of the voltage, the drive controller 40 controls opening and closing of the needle valve 17 and controls the ink discharge from the liquid discharge head. Note that, when the waveform generation circuit 41 can apply the voltage of a sufficient value, the amplification circuit 42 may be omitted.

The waveform generation circuit 41 generates a drive pulse, which is a waveform of a voltage applied to the piezoelectric element 18 changing over time. The waveform generation circuit 41 receives print data from an external personal computer (PC) or a microcomputer in the apparatus, and generates a drive pulse based on this input data. The waveform generation circuit 41 can change the voltage applied to the piezoelectric element 18 and generate a plurality of drive pulses. As described above, the waveform generation circuit 41 generates the drive pulse so that the piezoelectric element 18 expands and contracts in accordance with the drive pulse to open and close the needle valve 17.

Figure 4:
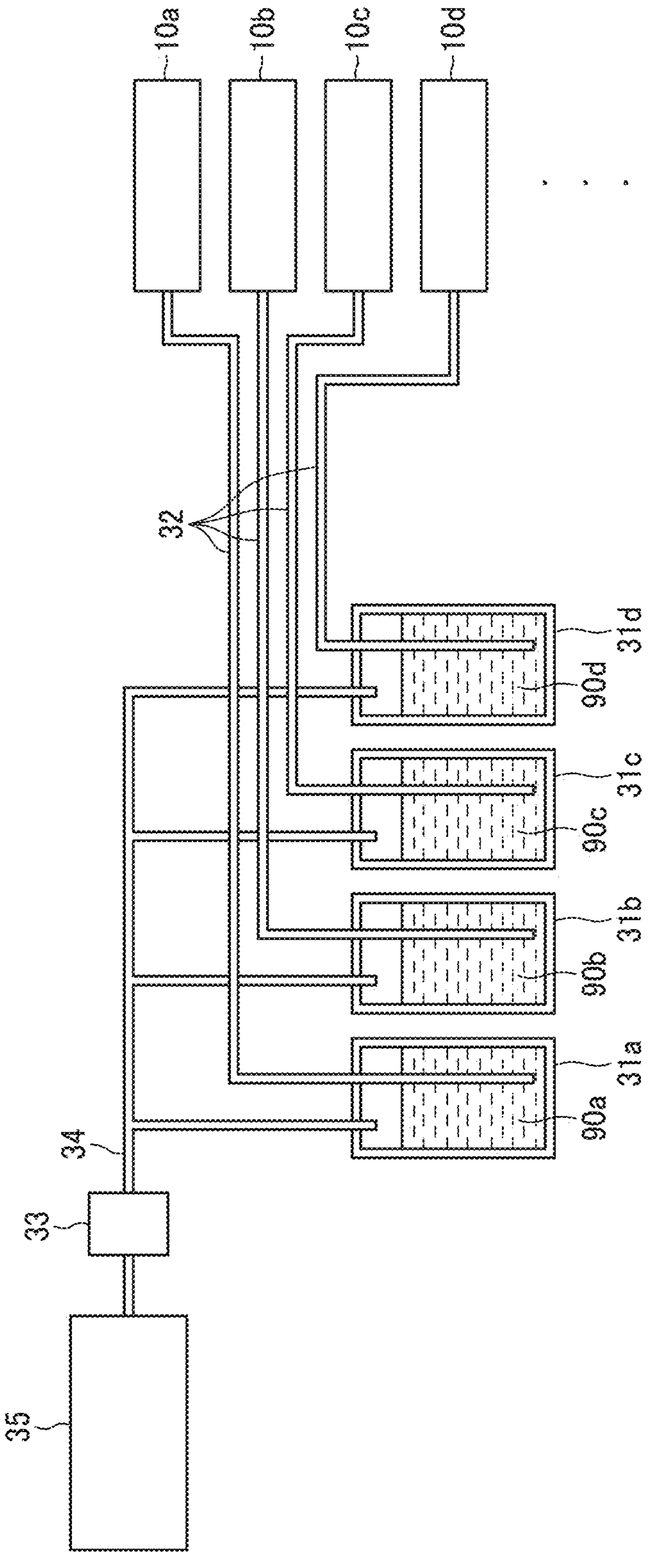
FIG. 4 is a schematic configuration view of a liquid supply unit.

FIG. 4 is a schematic configuration view illustrating an example of a liquid supply unit.

The liquid discharge apparatus includes tanks 31*a* to 31*d* as sealed containers that store inks 90*a* to 90*d* discharged from the liquid discharge heads 10*a* to 10*d*, respectively. In the following description, these inks are collectively referred to as the ink 90. The tanks are collectively referred to as the tank 31.

The tanks 31 and injection ports (supply ports 12 in FIGS. 1 and 2) of the liquid discharge heads 10 are coupled to each other via tubes 32, respectively. The tanks 31 are coupled to a compressor 35 via a pipe 34 including an air regulator 33. The compressor 35 supplies pressurized air to the tanks 31. Thus, the ink 90 in the liquid discharge head 10 is in a pressurized state, and when the needle valve as described above is opened, the ink 90 is discharged from the nozzle 14. The compressor 35, the pipe 34 including the air regulator 33, the tanks 31, and the tubes 32 collectively form an example of a liquid supply unit that pressurizes and supplies the ink 90 to the liquid discharge head 10.

[Regarding Liquid Discharge Head According to Present Embodiment in Detail]

Next, the liquid discharge head is described in detail. Then, enlarged portion (rounded portion B) of reference signs 14 and 15 in FIGS. 3A and 3B in the vicinity of the nozzle plate illustrated in FIGS. 3A and 3B is described.

[Regarding Edge Processed Portion According to Present Embodiment]

Figure 5A:
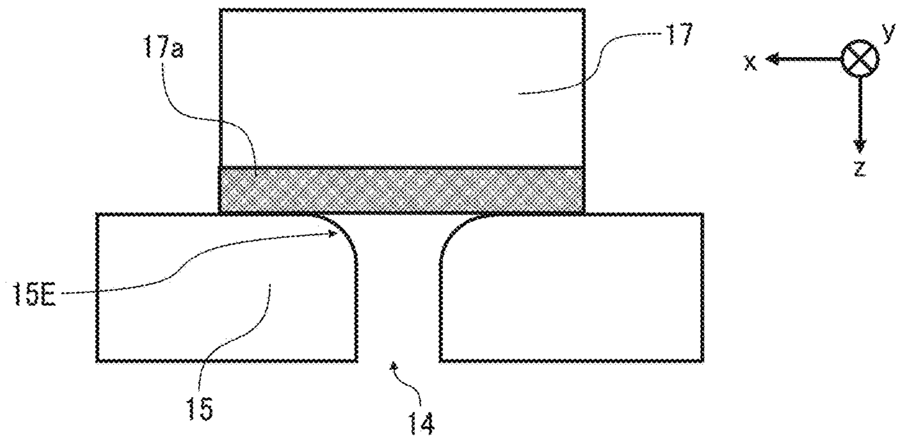
FIG. 5A is a diagram illustrating a state when a nozzle is closed when a sealing member is provided at a leading end of a needle valve.
Figure 5B:
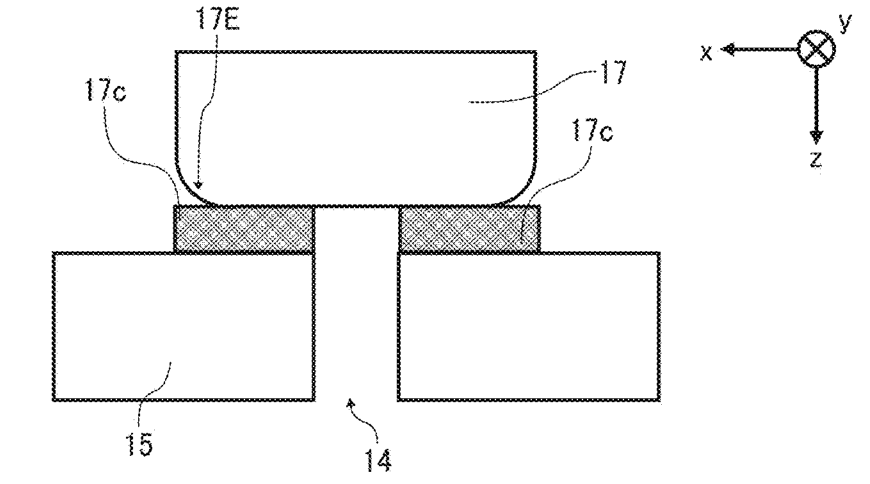
FIG. 5B is a diagram illustrating a state when the nozzle is closed when a sealing member is provided around the nozzle of a nozzle plate.
Figure 5C:
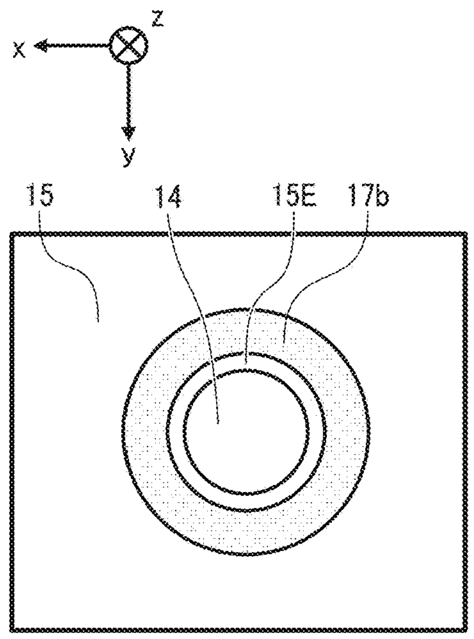
FIG. 5C is a diagram illustrating contact between the nozzle plate and the sealing member when the nozzle is closed when the sealing member is provided at the leading end of the needle valve.
Figure 5D:
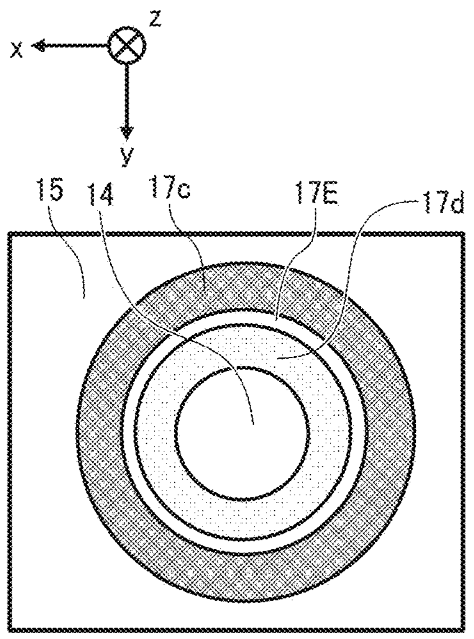
FIG. 5D is a diagram illustrating contact between the needle valve and the sealing member when the nozzle is closed when the sealing member is provided around the nozzle of the nozzle plate.

An edge processed portion, which is a substantial configuration of the present embodiment, is described. FIGS. 5A to 5D are diagrams illustrating a state in which the needle valve closes the nozzle. A state when the nozzle 14 is closed when the drive controller 40 applies the voltage to the piezoelectric element 18 to drive is described with reference to FIGS. 5A to 5D. Here, FIG. 5A is a diagram illustrating a state when the nozzle is closed when the sealing member is provided at the leading end of the needle valve, and FIG. 5B is a view illustrating a state when the nozzle is closed when the sealing member is provided around the nozzle of the nozzle plate. FIG. 5C is a diagram illustrating contact between the nozzle plate and the sealing member when the nozzle is closed when the sealing member is provided at the leading end of the needle valve. FIG. 5D is a diagram illustrating contact between the needle valve and the sealing member when the nozzle is closed when the sealing member is provided around the nozzle of the nozzle plate. FIG. 5C also is a diagram illustrating a shape of a seal portion on the nozzle plate in FIG. 5A, and FIG. 5D also is a diagram illustrating a shape of a seal portion on the nozzle plate in FIG. 5B.

First, FIG. 5A is described. In FIG. 5A, the sealing member 17*a* is provided at the leading end of the needle valve 17 (an end on a + direction side of a y-axis of the needle valve 17). When the leading end of the needle valve 17 is pressed against the nozzle plate 15, the sealing member 17*a* provided at the leading end is compressed, so that the needle valve 17 surely closes the nozzle 14. The sealing member 17*a* is in direct contact with the nozzle 14 of the nozzle plate 15. In order to prevent wear of the sealing member 17*a*, an edge around a hole of the nozzle 14 of the nozzle plate 15 is provided with an edge processed portion 15E in advance. Here, in the present embodiment, the edge processed portion refers to a portion subjected to edge processing in which a corner of an edge around the nozzle hole of the nozzle plate or an edge of an outer shape of the needle valve is shaved to provide roundness and the like. An edge processing width at that time can be defined as a width of the edge processed portion in a radial direction of the nozzle on a plane parallel to a surface (a surface on the liquid chamber side of the nozzle plate) on the opposite side of the discharge surface of the nozzle plate of the edge processed portion as for the edge processed portion regarding the nozzle. The edge processing width can be defined as a width of the edge processed portion in a radial direction of the needle valve on a plane parallel to a surface in contact with the sealing member of the needle valve of the edge processed portion as for the edge processed portion regarding the needle valve.

Next, FIG. 5B is described. In FIG. 5B, a sealing member 17*c* is provided on the nozzle plate 15. In FIG. 5B, as in FIG. 5A, when the leading end of the needle valve 17 is pressed against the nozzle plate 15, the sealing member 17*c* provided on the nozzle plate 15 is compressed, so that the needle valve 17 surely closes the nozzle 14. The sealing member 17*c* is in direct contact with the leading end of the needle valve 17. In order to prevent wear of the sealing member 17*c*, an edge of the leading end of the needle valve 17 includes an edge processed portion 17E in advance.

Next, FIG. 5C is described. In FIG. 5C, when the nozzle is closed, seal portion 17*b* is formed between the sealing member 17*a* and the nozzle plate 15. The needle valve and the sealing member have a circular shape. At that time, since the nozzle 14 has a circular shape, this is formed as a surface in a double circular shape. In contrast, due to an influence of axial displacement between the sealing member 17*a* and the nozzle 14 or accuracy of roundness of each of the sealing member 17*a* and the nozzle 14, axial displacement of around 100 μm or roundness of 30 μm or less is allowed. That is, the shape of the seal portion 17*b* is not strictly a concentric double circular shape.

Next, FIG. 5D is described. In FIG. 5D, a seal portion 17*d* is formed between the sealing member 17*c* and the needle valve 17 when the nozzle is closed. Since the needle valve 17 is circular and a diameter of a hole of the sealing member 17*c* is circular, this is formed as a surface in a double circular shape. In contrast, due to an influence of axial displacement between the sealing member and the needle valve or accuracy of roundness of each of the hole diameter of the sealing member and the needle valve, axial displacement of around 100 μm or roundness of 30 μm or less is allowed. That is, the shape of the seal portion is not strictly a concentric double circular shape.

Figure 6A:
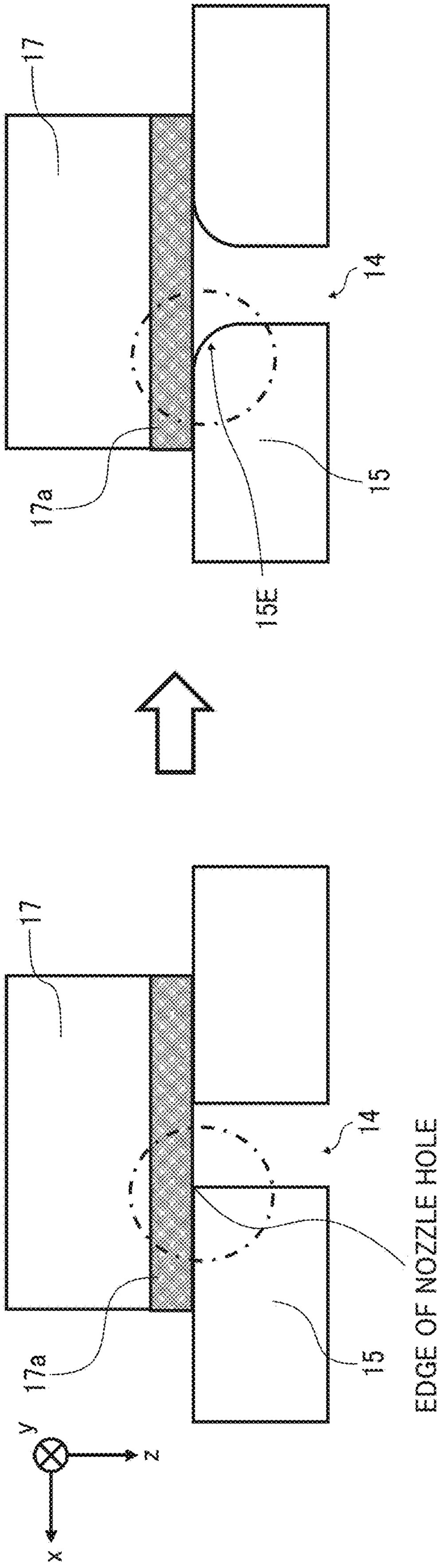
FIGS. 6A and 6B are diagrams for describing a method of forming an edge processed portion by performing edge processing on an edge of a nozzle hole in the present embodiment.
Figure 6B:
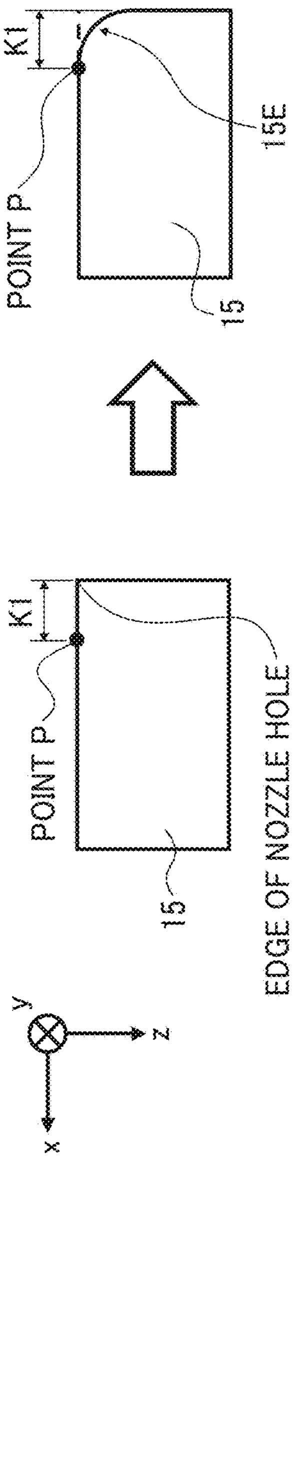

FIGS. 6A and 6B are diagrams for describing a method of performing the edge processing on the edge of the nozzle hole to form the edge processed portion in the present embodiment. FIG. 6A is a diagram illustrating a state in which the edge processing is performed on the edge of the nozzle hole, and FIG. 6B is a diagram illustrating a specific edge processing method, an enlarged view of a portion surrounded by a dashed-dotted line circle in FIG. 6A. The edge processed portion 15E in FIGS. 6A and 6B illustrates a case where processing in an R shape is performed as the edge processing.

In FIG. 6A, in a left diagram, a corner is formed at an edge of the nozzle 14, which is the nozzle hole. In a right diagram, it is found that the edge is subjected to the edge processing for forming an R surface, which is a curved surface, to form the edge processed portion 15E.

As a specific processing method, as illustrated in FIG. 6B, a predetermined distance K1 is measured in a horizontal direction (x-axis direction) from a point P at a predetermined position on a surface on which the nozzle plate 15 and the sealing member 17*a* are in contact with each other toward the nozzle 14 to form the R surface, which is the curved surface (R processing). The predetermined distance K1 is the edge processing width (edge processing amount). At that time, for example, cutting using a cutting tool or a milling cutter is considered as a processing method. R (radius) forming the R surface need not necessarily be 90 degrees, and even an acute angle is allowed as long as it is not angular.

Figure 7:
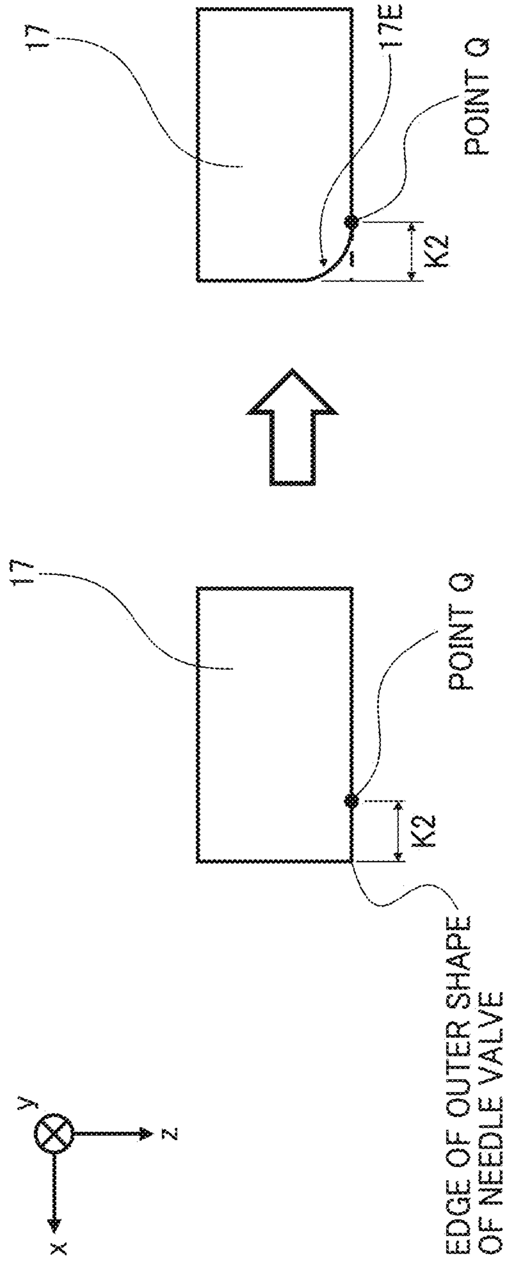
FIG. 7 is a diagram for describing a method of forming an edge processed portion by performing edge processing on an edge of an outer shape of the needle valve in the present embodiment.

Next, a method of performing the edge processing on the edge of the outer shape of the needle valve to form the edge processed portion is described. FIG. 7 is diagram for describing the method of performing the edge processing on the edge of the outer shape of the needle valve to form the edge processed portion in the present embodiment. FIG. 7 illustrates a case where the edge processing is performed only on an end (left side) in a + direction of an x-axis, but the same applies to an end (right side) in a − direction. The edge processed portion 17E in FIG. 7 illustrates a case where the R processing is performed as the edge processing.

In FIG. 7, in a left diagram, a corner is formed at the edge of the outer shape of the needle valve. It is found that the edge is subjected to edge processing for forming the R surface, which is the curved surface, to form the edge processed portion 17E in the right diagram in FIG. 7.

As a specific processing method, as illustrated in FIG. 7, a predetermined distance K2 is measured in a horizontal direction (x-axis direction) from a point Q at a predetermined position on a surface of the nozzle plate in contact with the sealing member toward the edge side of the outer shape of the needle valve 17 (+ direction of the x-axis) to form the R surface, which is the curved surface (R processing). The predetermined distance K2 is the edge processing width (edge processing amount). At that time, for example, cutting using a cutting tool or a milling cutter is considered as a processing method. R (radius) forming the R surface need not necessarily be 90 degrees, and even an acute angle is allowed as long as it is not angular.

Figure 8B:
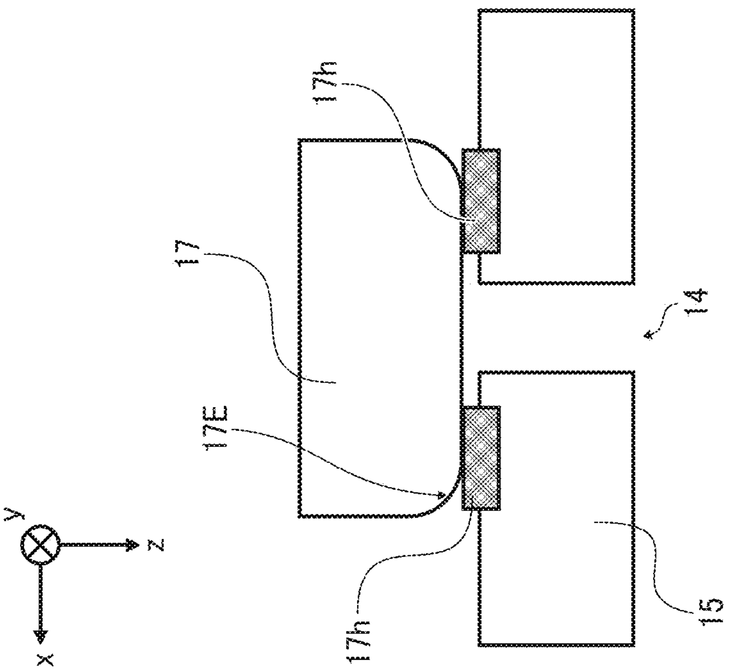
FIGS. 8A and 8B are diagrams illustrating a specific example in a state when the nozzle is closed.
Figure 8A:
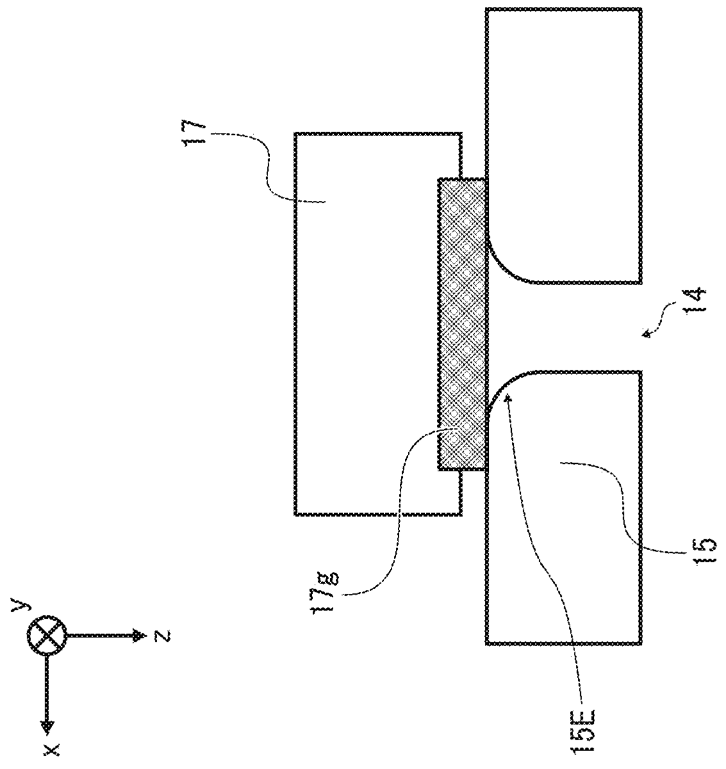

FIGS. 8A and 8B are diagrams illustrating a specific example in a state when the nozzle is closed. FIG. 8A is a diagram illustrating a specific example in a state when the nozzle is closed when the sealing member is provided at the leading end of the needle valve, and FIG. 8B illustrates a specific example in a state when the nozzle is closed when the sealing member is provided around the hole of the nozzle of the nozzle plate.

FIG. 8A is described. FIG. 8A is one specific configuration example of FIG. 5A. Here, a sealing member 17*g* made of, for example, rubber or an elastomer material is inserted into the leading end of the needle valve 17 and caulked to be secured. The needle valve 17 is formed of a metal member such as SUS304 or SUS430. The nozzle plate 15 is formed of a metal member such as SUS304 or SUS430. The nozzle 14 is manufactured by etching or drill cutting, and both surfaces of the nozzle plate 15 ensure flatness. When the nozzle is closed, a seal portion in a double circular shape is formed by the contact between the sealing member 17*g* and the nozzle plate 15. In consideration of the sealing property and fluid resistance, a sealing width corresponding to a difference between inner and outer diameters is set to about 20~300 μm.

FIG. 8B is described. FIG. 8B is one specific configuration example of FIG. 5B. A sealing member 17*h* having, for example, an O-ring shape made of rubber or an elastomer material, is inserted into a groove provided on the nozzle plate 15, and is secured by press fitting or adhesion. A width of the O-ring is sufficiently larger than that of the needle valve 17. The needle valve 17 is formed of a metal member such as SUS304 or SUS430, the leading end thereof ensures flatness, and a leading end face thereof maintains parallelism with respect to the nozzle plate 15. The nozzle plate 15 is formed of a metal member such as SUS304 or SUS430. The nozzle 14 is manufactured by etching or drill cutting, and both surfaces of the nozzle plate 15 ensure flatness. When the nozzle is closed, a seal portion is formed by contact between the sealing member 17*h* and the needle valve 17. In consideration of the sealing property and fluid resistance, a sealing width corresponding to a difference between inner and outer diameters is set to about 20~300 μm.

[Regarding Variation of Edge Processed Portion]

Figure 9A:
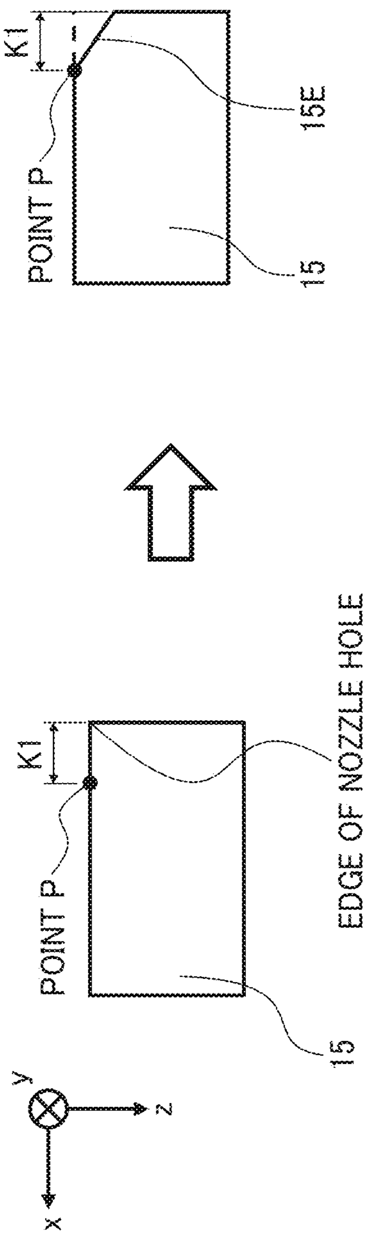
FIGS. 9A and 9B are diagrams illustrating a variation of an edge processed portion of the nozzle plate.
Figure 9B:
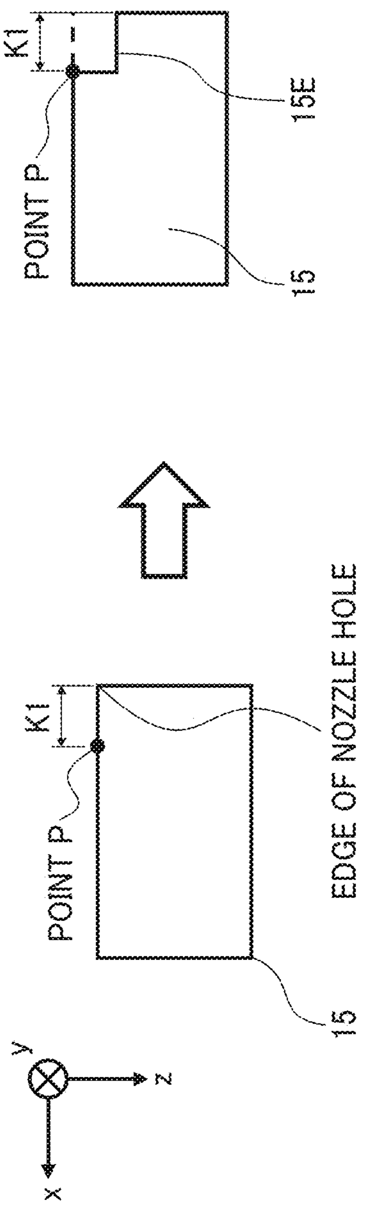

FIGS. 9A and 9B illustrate a variation of the edge processed portion of the nozzle plate. The diagrams illustrated in FIGS. 9A and 9B are enlarged views of a portion surrounded by a dashed-dotted line circle in FIG. 6A. FIG. 9A illustrates a state in which C surface processing is performed as the edge processing. A predetermined distance K1 is measured in a horizontal direction (x-axis direction) from a point P at a predetermined position on a surface on which the nozzle plate 15 and the sealing member 17*a* are in contact with each other toward the nozzle 14 to form a C surface, which is a small inclined surface. As for the C surface, for example, cutting using a cutting tool or a milling cutter is considered as a processing method. In the present embodiment, the C surface is formed at 45 degrees, but this need not necessarily be 45 degrees, and is allowed as long as it is not angular on a straight line.

For example, in a case of minute processing, C surface processing using a cutting tool having a simple shape has high processing accuracy and is versatile. This point is superior to chamfering by R processing. When a cutting width is large, cutting by a drill can make the cutting surface larger and make the processing faster as compared with cutting by a cutting tool.

Other processing methods are described. FIG. 9B illustrates a case where stepped processing with a step is performed as the edge processing instead of the C surface described above. In FIG. 9B, a predetermined distance K1 is measured in a horizontal direction (x-axis direction) from a point P at a predetermined position on a surface on which the nozzle plate 15 and the sealing member 17*a* are in contact with each other toward the nozzle 14 to form a small stepped configuration. This step need not necessarily be at 90 degrees, and may have a tapered shape, or may be subjected to minute R processing or C surface processing to eliminate angulation after cutting.

Figure 10A:
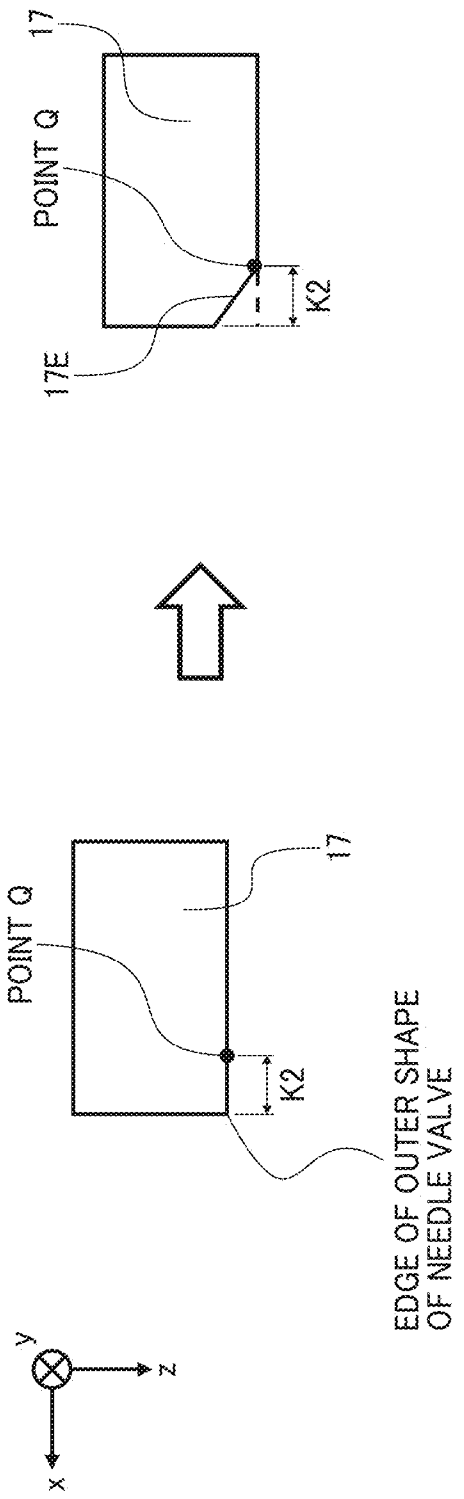
FIGS. 10A and 10B are diagrams illustrating a variation of an edge processed portion of the needle valve.
Figure 10B:
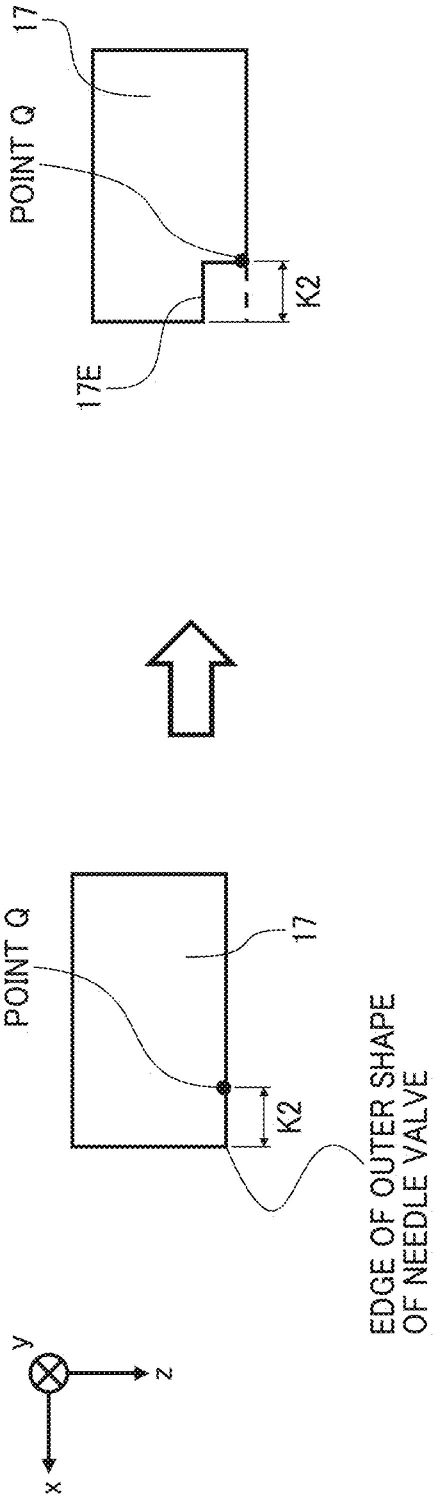

Such processing can be similarly applied to the needle valve. FIGS. 10A and 10B illustrate a variation of the edge processed portion of the needle valve. FIGS. 10A and 10B illustrate a case where the edge processing is performed only on an end (left side) in the + direction of the x-axis, but the same applies to an end (right side) in the − direction. FIG. 10A illustrates a state in which C surface processing is performed as the edge processing. A predetermined distance K2 is measured in a horizontal direction (x-axis direction) from a point Q at a predetermined position on a surface of the nozzle plate in contact with the sealing member toward the edge side of the outer shape of the needle valve 17 (+ direction of the x-axis) to form the C surface, which is the small inclined surface. As for the C surface, for example, cutting using a cutting tool or a milling cutter is considered as a processing method. In the present embodiment, the C surface is formed at 45 degrees, but this need not necessarily be 45 degrees, and is allowed as long as it is not angular on a straight line.

For example, in a case of minute processing, C surface processing using a cutting tool having a simple shape has high processing accuracy and is versatile. This point is superior to chamfering by R processing. When a cutting width is large, cutting by a drill can make the cutting surface larger and make the processing faster as compared with cutting by a cutting tool.

Other processing methods are described. FIG. 10B illustrates a case where stepped processing with a step is performed as the edge processing instead of the C surface described above. In FIG. 10B, a predetermined distance K2 is measured in a horizontal direction (x-axis direction) from a point Q at a predetermined position on a surface of the nozzle plate in contact with the sealing member toward the edge side (the + direction of the x-axis) of the outer shape of the needle valve 17 to form a small stepped configuration. This step need not necessarily be at 90 degrees, and may have a tapered shape, or may be subjected to minute R processing or C surface processing to eliminate angulation after cutting.

[Regarding Edge Processing of Edge of Nozzle in Configuration Including a Plurality of Nozzles]

A specific example of performing the edge processing in a configuration including a plurality of nozzles is described below. A case where the edge processing amount of the edge of the nozzle is different between the nozzles in the configuration including a plurality of nozzles is described as an example, and a basic idea of the present embodiment is described together. In the following embodiment, as the edge processing performed on the edge of the nozzle, processing of providing an R shape (R surface) is described as an example, but as described above, it is also possible to apply the C surface processing or small stepped processing. The edge processing width regarding the edge processed portion of the nozzle is as defined above.

Figure 11:
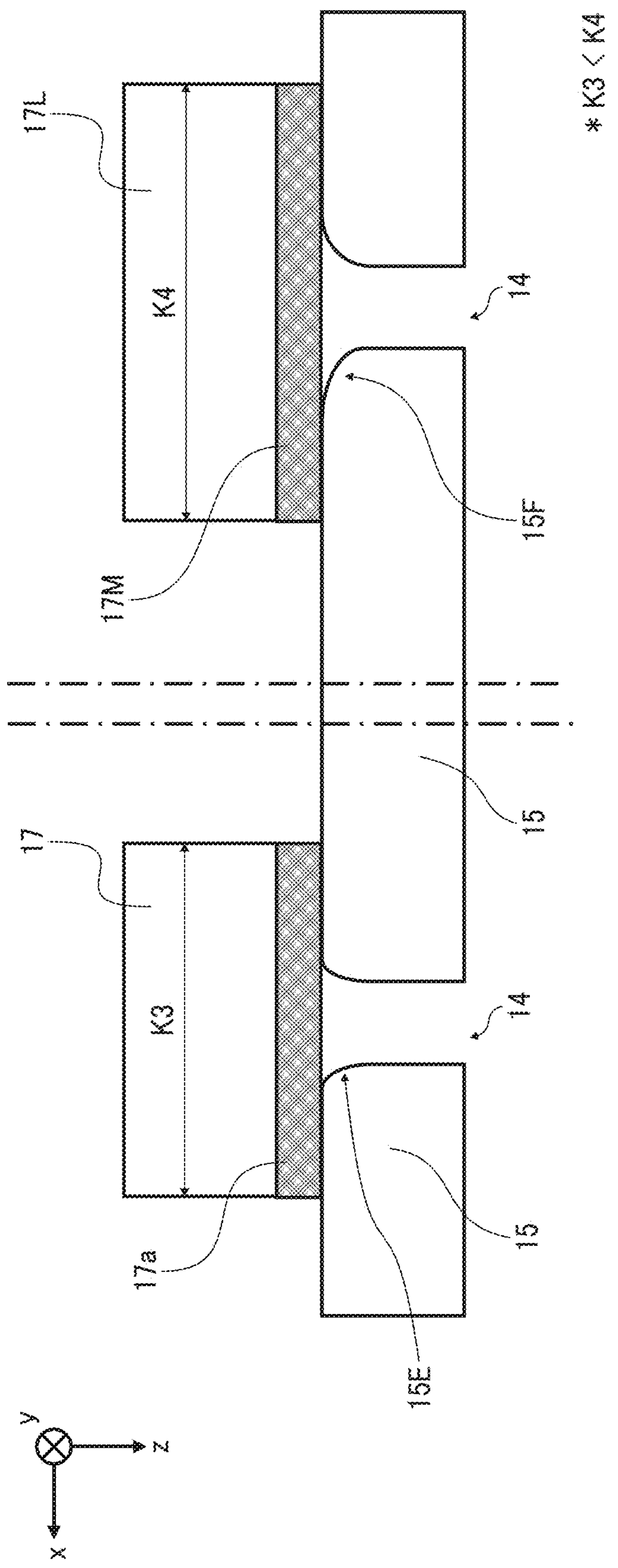
FIG. 11 is a diagram illustrating that an edge processing amount of an edge of a nozzle is different between nozzles in a configuration including a plurality of nozzles.

FIG. 11 is a diagram illustrating that the edge processing amount of the edge of the nozzle is different between the nozzles in the configuration including a plurality of nozzles. With reference to this drawing, it is described that the edge processing is performed on a plurality of nozzles, and the edge processing amount is made different according to a finished dimension of an outer diameter of the needle valve and an outer shape of the sealing member to suppress a variation in discharging performance between the nozzles.

FIG. 11 illustrates an example of a discharge apparatus including a plurality of nozzles, and this includes needle valves 17 and 17L and sealing members 17*a* and 17M having different outer diameters due to a processing difference. For the sake of description, the outer diameter of the needle valve 17 and the outer diameter of the sealing member 17*a* (an example of a second sealing member) on a left side in FIG. 11 are the same to be K3. The outer diameter of the needle valve 17L and the outer diameter of the sealing member 17M (an example of a first sealing member) on a right side in FIG. 11 are the same to be K4. A relationship therebetween is K3<K4.

For example, the sealing member may be processed by cutting using a cutting tool; since the sealing member is formed of an elastic member such as rubber, this has elasticity and the cutting property is poor, so that a processing variation is supposed to be about several 100 μm. The sealing member is attached by adhesion or caulking in accordance with the needle valve; since end face processing thereof follows the outer shape of the needle valve, so that a variation in outer diameter of the needle valve contributes to a variation in sealing member. As a result, if the outer diameter of the needle valve varies, the outer diameter of the sealing member might vary.

It is known that the discharging performance depends on the fluid resistance between the sealing member and the nozzle plate, and the fluid resistance depends on an area of the seal portion. For example, when the edge of the nozzle is subjected to chamfering with a uniform dimension between the nozzles as the edge processing, since the outer diameter of the needle valve and the outer diameter of the sealing member are different, the area of the seal portion is different between the nozzles. As a result, the discharging performance differs between the nozzles.

In view of this, in the configuration illustrated in FIG. 11, the edge processing amount is adjusted as for the edge of the nozzle according to the difference between the outer diameter of the needle valve and the outer diameter of the sealing member. For example, in order to stabilize the fluid resistance until discharge, when the outer diameter of the needle valve and the outer diameter of the sealing member are large due to the processing variation, the edge processing width (edge processing amount) is relatively increased. When the outer diameter of the needle valve and the outer diameter of the sealing member are small due to the processing variation, the edge processing amount is relatively decreased. For example, in FIG. 11, the hole size of the nozzle 14 is finished as designed, and the edge processing in the edge processed portion 15E at that time is R=5 μm. The outer diameter of the needle valve 17 and the outer diameter of the sealing member 17*a* on the left side in FIG. 11 are finished as designed. In contrast, the outer diameter of the needle valve 17L and the outer diameter of the sealing member 17M on the right side in FIG. 11 are larger than the design value by 10 μm. At that time, the fluid resistance between the sealing member 17M and the nozzle plate 15 is larger than the design value. Therefore, in order to decrease the fluid resistance, the edge processing in an edge processed portion 15F is set to R>5 μm to stabilize the fluid resistance. That is, a relationship in edge processing amount is edge processed portion 15E<edge processed portion 15F.

That is, the basic idea of the edge processing of the present embodiment is that "in a configuration including a plurality of nozzle holes, a plurality of needle valves, and a plurality of sealing members, an edge of a nozzle hole or an outer edge of a contact surface in contact with the nozzle hole of the needle valve includes an edge processed portion formed by performing edge processing, and an edge processing width (edge processing amount) of the edge processed portion is made different according to any one of a shape of the nozzle hole, an outer shape of the needle valve, or an outer shape of the sealing member in order to adjust the fluid resistance (that is, the edge processing width is made different according to the embodiment)." Accordingly, the present embodiment suppresses the variation in discharging performance.

[Regarding Edge Processing of Cylindrical Protrusion Provided at Edge of Nozzle Hole]

Figure 12A:
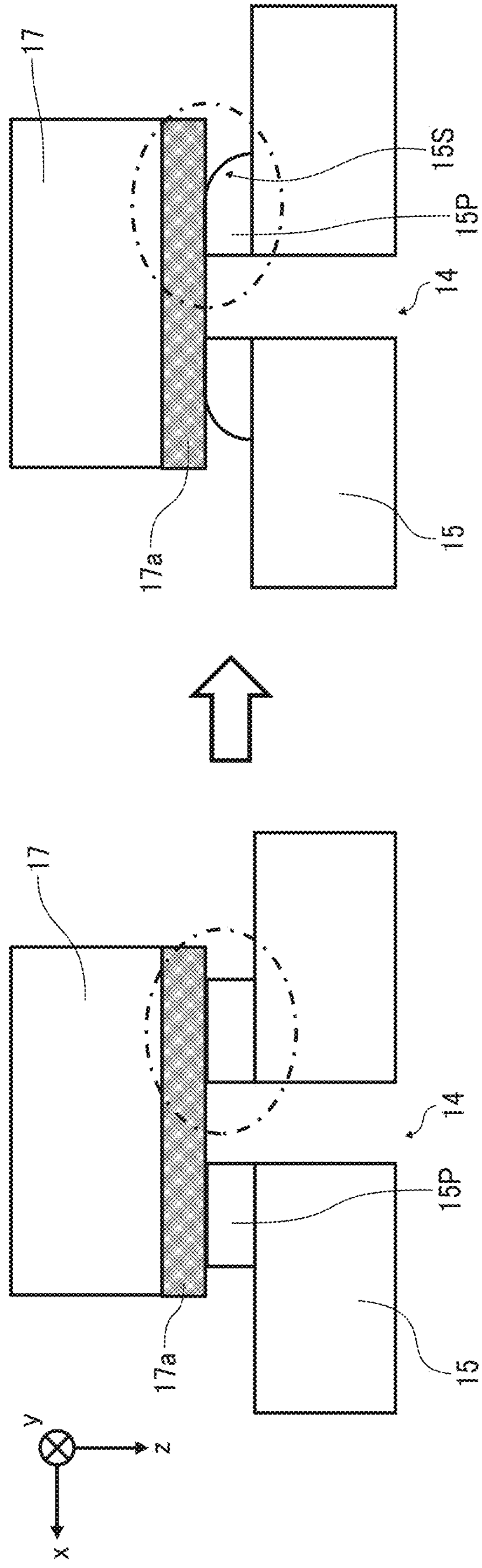
FIGS. 12A and 12B are diagrams for describing a method of forming an edge processed portion by performing edge processing on a cylindrical protrusion provided at an edge of a nozzle hole.
Figure 12B:
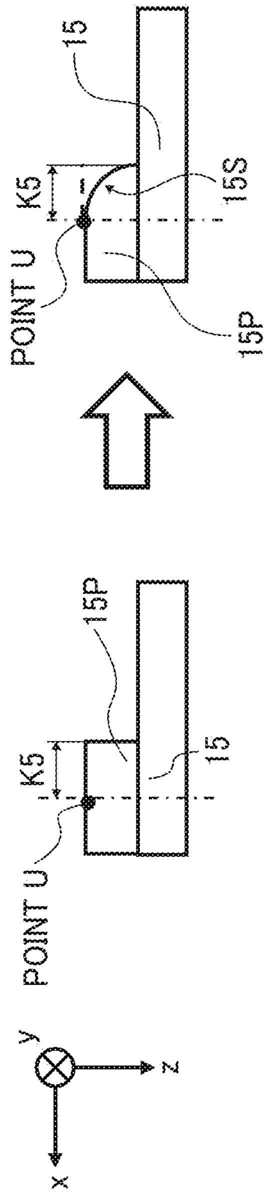

FIGS. 12A and 12B are diagrams for describing a method of forming an edge processed portion by performing edge processing on a cylindrical protrusion provided at an edge of a nozzle hole in the present embodiment. The basic idea of the edge processing is similar to the above. Therefore, on the premise of this idea, the method of forming the edge processed portion by performing the edge processing on the cylindrical protrusion provided at the edge of the nozzle hole is described below.

The method of forming the edge processed portion by performing the edge processing on the protrusion provided at the edge of the nozzle hole is described. FIG. 12A is a diagram illustrating a state in which the edge processing is performed on the protrusion provided at the edge of the nozzle hole, and FIG. 12B is a diagram illustrating a specific edge processing method, an enlarged view of a portion surrounded by a dashed-dotted line circle in FIG. 12A. An edge processed portion 15S in FIGS. 12A and 12B illustrates a case where R processing is performed (an R shape is formed) as the edge processing.

Here, a reason for which the protrusion is provided at the edge of the nozzle hole is that, if the (cylindrical) protrusion is provided to adjust, the edge processing width (edge processing amount) is easily adjusted since this does not depend on the sizes of the nozzle hole and the outer shape of the needle valve and the like.

In FIG. 12A, in a left diagram, a corner is formed on a protrusion 15P formed at an edge of the nozzle 14 on a surface on a side opposite to the discharge surface of the nozzle plate. The protrusion 15P is formed so as to be continuous from the edge of the nozzle 14. In a right diagram, it is found that the edge is subjected to the edge processing for forming the R surface, which is a curved surface, to form the edge processed portion 15S.

As a specific processing method, as illustrated in FIG. 12B, a predetermined distance K5 is measured in a horizontal direction (x-axis direction) from a point U at a predetermined position of a surface on which the protrusion 15P and the sealing member 17*a* are in contact with each other, the point U as a vertex of the protrusion 15P toward the nozzle 14 to form the R shape, which is a curved surface (R surface is formed, R processing is performed). The predetermined distance K5 is an edge processing width (edge processing amount).

At that time, for example, cutting using a cutting tool or a milling cutter is considered as a processing method.

R (radius) forming the R surface need not necessarily be 90 degrees, and even an acute angle is allowed as long as it is not angular. In this manner, the edge processing width in the present embodiment can be defined as a radial width of the protrusion on a plane parallel to a protruding surface of the protrusion of the edge processed portion.

The edge processing of the protrusion 15P illustrated in FIG. 12B is referred to as outer diameter side edge processing since the edge processing on an outer diameter side of the protrusion is performed in the present embodiment. The edge processed portion subjected to the edge processing by the outer diameter side edge processing is referred to as an outer diameter side edge processed portion. The outer diameter side edge processing width, which is the edge processing width thereof, can be defined as the radial width of the protrusion on a plane parallel to the protruding surface of the protrusion of the outer diameter side edge processed portion. In contrast, performing the edge processing on the protrusion 15P at a predetermined distance from the point U toward the side opposite to the nozzle 14 side (the + direction side of the x-axis) is referred to as inner diameter side edge processing since the edge processing on an inner diameter side of the protrusion is performed. The edge processed portion subjected to the edge processing by the inner diameter side edge processing is referred to as an inner diameter side edge processed portion. The inner diameter side edge processing width, which is the edge processing width thereof, can be defined as the radial width of the protrusion on a plane parallel to the protruding surface of the protrusion of the inner diameter side edge processed portion.

Here, processing and adjustment are easily performed on the outer diameter side of the protrusion. Therefore, as the edge processing, first, adjustment may be performed by the outer diameter side edge processing, and when finer adjustment is requested, the inner diameter side edge processing may be performed.

Figure 13:
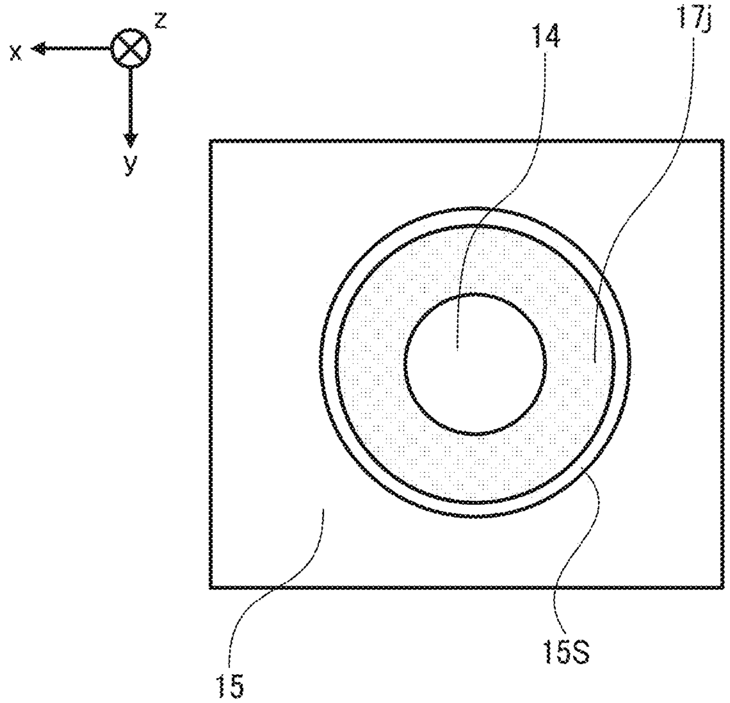
FIG. 13 is a diagram illustrating contact between a protrusion and a sealing member when the nozzle is closed when the sealing member is provided at the leading end of the needle valve.

FIG. 13 is a diagram illustrating a state in which the protrusion provided at the edge of the nozzle hole and the needle valve close the nozzle. A state when the nozzle 14 is closed when the drive controller 40 applies a voltage to the piezoelectric element 18 to drive is described with reference to FIG. 13. Here, FIG. 13 is a diagram illustrating contact between the protrusion and the sealing member when the nozzle is closed when the sealing member is provided at the leading end of the needle valve. FIG. 13 is also a diagram illustrating a shape of a seal portion on the protrusion provided at the edge of the nozzle hole illustrated in a right diagram in FIG. 12A.

The sealing member 17*a* is provided at the leading end of the needle valve 17 (an end on a + direction side of the y-axis of the needle valve 17). When the leading end of the needle valve 17 is pressed against the protrusion 15P, the sealing member 17*a* provided at the leading end is compressed, so that the needle valve 17 surely closes the nozzle 14 (refer to the right diagram in FIG. 12A). At that time, the sealing member 17*a* is in direct contact with the protrusion 15P. In order to prevent wear of the sealing member 17*a*, the edge of the protrusion 15P includes the edge processed portion 15S in advance.

In FIG. 13, when the nozzle is closed, a seal portion 17*j* is formed between the protrusion 15P and the sealing member 17*a*. The needle valve and the sealing member have a circular shape. At that time, since the nozzle 14 has a circular shape, this is formed as a surface in a double circular shape. In contrast, due to an influence of axial displacement between the sealing member 17*a* and the nozzle 14 or accuracy of roundness of each of the sealing member 17*a* and the nozzle 14, axial displacement of around 100 μm or roundness of 30 μm or less is allowed. That is, the shape of the seal portion 17*j* is not strictly a concentric double circular shape.

[Regarding Variation of Edge Processed Portion of Protrusion]

Figure 14A:
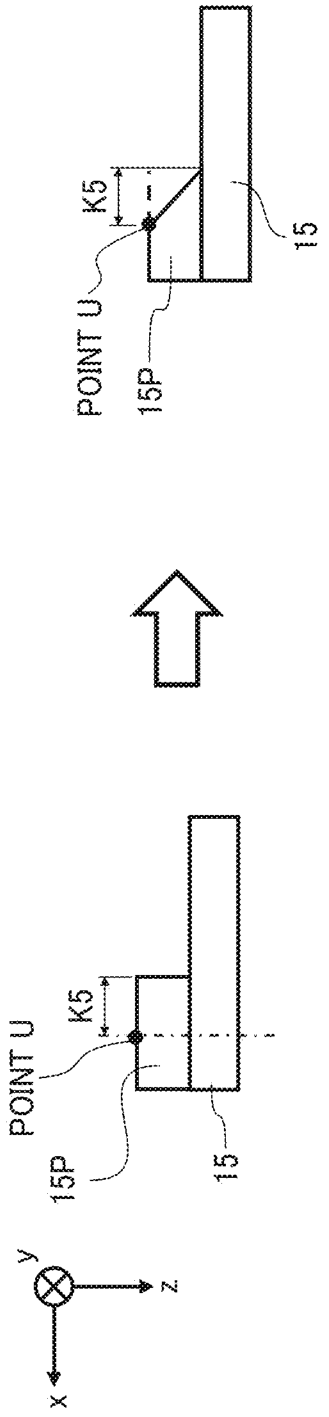
FIGS. 14A and 14B are diagrams illustrating a variation of an edge processed portion of the protrusion.
Figure 14B:
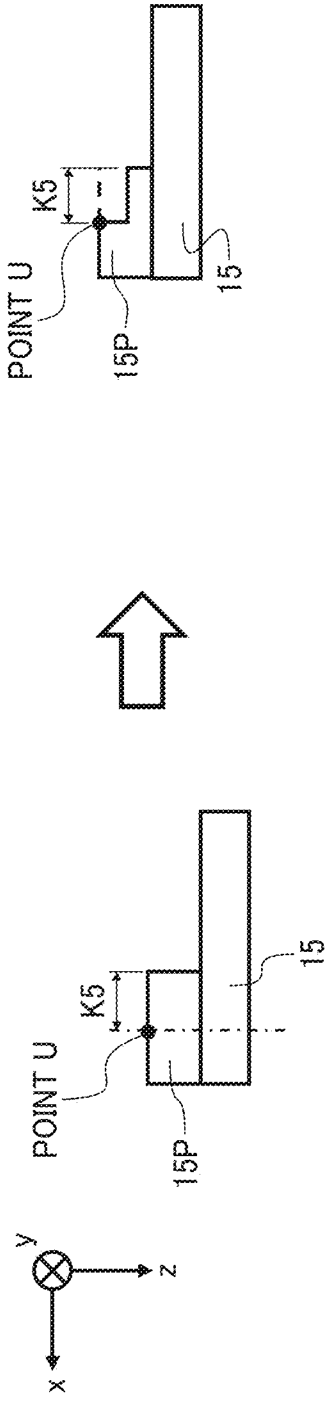

FIGS. 14A and 14B illustrate a variation of the edge processed portion of the protrusion. An example in which the outer diameter side edge processing is performed is herein described. The diagrams illustrated in FIGS. 14A and 14B are enlarged views of a portion surrounded by a dashed-dotted line circle in FIG. 12A. FIG. 14A illustrates a state in which C surface processing is performed as the edge processing. A predetermined distance K5 is measured in a horizontal direction (x-axis direction) from the point U as the vertex of the protrusion toward the nozzle 14 to form a C surface, which is a small inclined surface. As for the C surface, for example, cutting using a cutting tool or a milling cutter is considered as a processing method. In the present embodiment, the C surface is formed at 45 degrees, but this need not necessarily be 45 degrees, and is allowed as long as it is not angular on a straight line.

For example, in a case of minute processing, C surface processing using a cutting tool having a simple shape has high processing accuracy and is versatile. This point is superior to chamfering by R processing. When a cutting width is large, cutting by a drill can make the cutting surface larger and make the processing faster as compared with cutting by a cutting tool.

Other processing methods are described. FIG. 14B illustrates a case where stepped processing with a step is performed as the edge processing instead of the C surface described above. In FIG. 14B, a predetermined distance K5 in a horizontal direction (x-axis direction) is measured from the point P as the vertex of the protrusion toward the nozzle 14 to make the small stepped configuration. This step need not necessarily be at 90 degrees, and may have a tapered shape, or may be subjected to minute R processing or C surface processing to eliminate angulation after cutting.

The liquid discharge head (10) includes: a nozzle plate (15) having: a first nozzle (14) having a first diameter; and a second nozzle (14) having the first diameter, from each of which a liquid is dischargeable from a first face of the nozzle plate (15); a channel (16) communicating with each of the first nozzle (14) and the second nozzle (14), the channel (16) on a second face opposite to the first face of the nozzle plate (15); multiple sealing members (17*a*) having: a first sealing member (17*a*) having a second diameter (K3) larger than the first diameter of the first nozzle, the first sealing member (17*a*) to contact with the second face of the nozzle plate (15) to close the first nozzle (14); and a second sealing member (17*a*) having a third diameter (K4) larger than the first diameter of the second nozzle (14) and the second diameter (K3) of the first sealing member (17*a*), the second sealing member (17*a*) to contact with the second face of the nozzle plate (15) to close the second nozzle (14); and multiple needle valves (17) including: a first needle valve (17) holding the first sealing member (17*a*) and movable between: a first position at which the first sealing member (17*a*) contacts the second face of the nozzle plate (15) to close the first nozzle (14); and a second position at which the first sealing member (17*a*) separated from the second face of the nozzle plate (15) to open the first nozzle (14); and a second needle valve (17L) holding the second sealing member (17M) and movable between: a first position at which the second sealing member (17*a*) contacts the second face of the nozzle plate (15) to close the second nozzle (14); and a second position at which the second sealing member (17*a*) separated from the second face of the nozzle plate (15) to open the second nozzle (14), wherein the first nozzle (14) has a first edge processed portion in which a first edge of the first nozzle (14) on the second face is processed to have a first edge processing width (K5) in a radial direction of the first nozzle (14), and the second nozzle (14) has a second edge processed portion in which a second edge of the second nozzle (14) is processed to have a second edge processing width (K5) larger than the first edge processing width (K5) in a radial direction of the second nozzle (14).

Each of the first edge processed portion and the second edge processed portion has one of: a chamfered (C) edge; a fillet (R) edge; or a stepped edge.

Each of the multiple sealing members (17*a*) has a contact face contactable with the second face of the nozzle plate (15), and the contact face has a concentric circular shape.

[Specific Example in which Edge Processing Amount of Protrusion Provided at Edge of Nozzle is Different Between Nozzles]

Figure 15:
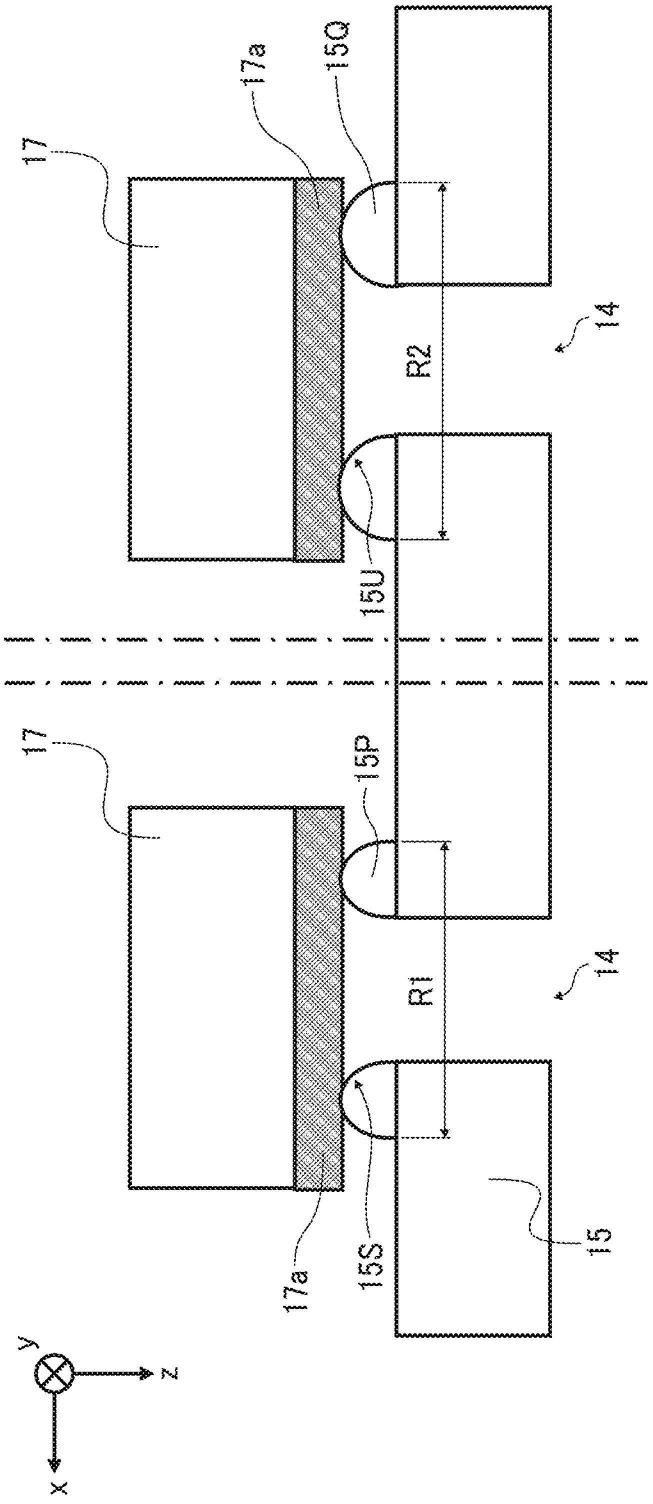
FIG. 15 is a diagram illustrating that edge processing amount of the protrusion provided at an edge of a nozzle is different between nozzles in a configuration including a plurality of nozzles.

Based on the above description, a specific example in which the edge processing amount of the protrusion provided at the edge of the nozzle is different between the nozzles in the configuration including a plurality of nozzles is described. FIG. 15 is a diagram illustrating that the edge processing amount of the protrusion provided at the edge of the nozzle is different between the nozzles in the configuration including a plurality of nozzles. With reference to this drawing, it is described that the edge processing is performed on a plurality of nozzles, and the edge processing amount is made different according to a finished dimension of the protrusion to suppress the variation in discharging performance between the nozzles.

In the following description, both the outer diameter side edge processing and the inner diameter side edge processing are performed on the protrusion, and both edge processing widths (edge processing amounts) are the same. In the following embodiment, processing of providing an R shape (R surface) is described as an example of the edge processing performed on the protrusion, but as described above, it is also possible to apply the C surface processing or small stepped processing. The edge processing width of the edge processed portion regarding the protrusion is as defined above.

FIG. 15 illustrates an example of a discharge apparatus including a plurality of nozzles, and there is a processing difference between the nozzles.

Therefore, the outer diameter of the protrusion is different between the nozzles. In the configuration according to FIG. 15, the nozzle 14 (nozzle on a left side in FIG. 15) including the protrusion 15P (an example of a second protrusion) and the nozzle 14 (nozzle on a right side in FIG. 15) including the protrusion 15Q (an example of a first protrusion) are provided. When an outer diameter of the protrusion 15P is set to R1 and an outer diameter of the protrusion 15Q is set to R2, a relationship therebetween is R1<R2.

Here, the protrusion having the outer diameter smaller than the diameter of the needle valve directly comes into contact with the sealing member to form the seal portion. For example, the protrusion has a function of forming a seal portion having a certain contact area between the same and the sealing member when the nozzle is closed, so that a difference in sealing function due to axial displacement between the needle valve and the nozzle can be eliminated.

However, the width of the protrusion often has the processing variation of several μm or more. As a processing method of the edge processing at that time, etching or milling can be considered. It is known that the discharging performance depends on the fluid resistance of the nozzle, and the fluid resistance depends on the area of the seal portion. For example, when the edge processing width (edge processing amount) is chamfering with a constant dimension, when the width of the protrusion is different between the nozzles, the fluid resistance is different between the nozzles, and as a result, the discharging performance is different between the nozzles.

Based on this, in the configuration illustrated in FIG. 15, the edge processing amount (edge processing width) of the protrusion is adjusted by the outer diameter of the protrusion. For example, in order to stabilize the fluid resistance until discharge, when the outer diameter of the protrusion is large due to the processing variation, the edge processing amount (edge processing width) is relatively increased. When the outer diameter of the protrusion is small due to the processing variation, the edge processing amount is relatively decreased. For example, in FIG. 15, the outer diameter of the protrusion is finished as designed, and the edge processing in the edge processed portion of the protrusion at that time is R=5 μm. In FIG. 15, the outer diameter of the needle valve 17 and the outer diameter of the sealing member 17*a* are finished as designed. The outer diameter of the protrusion 15P in FIG. 15 is finished as designed. In contrast, the size of the protrusion 15Q on the right side in FIG. 15 becomes larger than the design value by 10 μm. At that time, the fluid resistance between the sealing member and the protrusion is larger than the design value. Therefore, in order to decrease the fluid resistance, the edge processing in the edge processed portion 15U of the protrusion 15Q on a right side is set to R>5 μm to stabilize the fluid resistance. That is, a relationship in edge processing amount is edge processed portion 15S<edge processed portion 15U when the edge processed portion on the left side is 15S.

Another example is described. For example, the size of the protrusion is constant between the nozzles and is finished as designed. In contrast, the outer diameter of the needle and the outer diameter of the sealing member of a certain nozzle are larger than the design value by 10 μm, and the other nozzles are finished as designed. At that time, in a certain nozzle, the fluid resistance between the sealing member and the protrusion is larger than the design value. Therefore, in order to decrease the fluid resistance of a certain nozzle, the edge processing in the edge processed portion may be set to R>5 μm to stabilize the fluid resistance.

The liquid discharge head (10) includes: a nozzle plate (15) having: a first nozzle (14); and a second nozzle (14), from each of which a liquid is dischargeable from a first face of the nozzle plate (15); a channel (16) communicating with each of the first nozzle (14) and the second nozzle (14), the channel (16) on a second face opposite to the first face of the nozzle plate (15); multiple cylindrical protrusions (15P, 15Q) having: a first cylindrical protrusion (15P) around the first nozzle (14) and protruding continuously from an inner wall face of the first nozzle (14) toward the channel, the first cylindrical protrusion (15P) having a first outer diameter (R1); and a second cylindrical protrusion (15Q) around the second nozzle (14) and protruding continuously from an inner wall face of the second nozzle (14) toward the channel (16), the second cylindrical protrusion (15Q) having a second outer diameter (R2) larger than the first outer diameter (R1) of the first cylindrical protrusion (15P); multiple sealing members (17*a*) having: a first sealing member (17*a*) to contact with a top face of the first cylindrical protrusion (15P); and a second sealing member (17*a*) to contact with a top face of the second cylindrical protrusion (15Q); and multiple needle valves (17) including: a first needle valve (17) holding the first sealing member (17*a*) and movable between: a first position at which the first sealing member (17*a*) contacts the first cylindrical protrusion (15P) to close the first nozzle (14); and a second position at which the first sealing member (17*a*) separated from the first cylindrical protrusion (15P) to open the first nozzle (14); and a second needle valve (17) holding the second sealing member and movable between: a first position at which the second sealing member (17*a*) contacts the second cylindrical protrusion (15Q) to close the second nozzle (14); and a second position at which the second sealing member (17*a*) separated from the second cylindrical protrusion (15Q) to open the second nozzle (14), wherein the first cylindrical protrusion (15P) has a first edge processed portion in which a first edge of the first cylindrical protrusion (15P) is processed to have a first edge processing width (K5) in a radial direction of the first cylindrical protrusion (15P), and the second cylindrical protrusion (15Q) has a second edge processed portion in which a second edge of the second cylindrical protrusion (15Q) is processed to have a second edge processing width (K5) larger than the first edge processing width (K5) in a radial direction of the second cylindrical protrusion (15Q).

The first edge processed portion has a first outer-edge processed portion in which an outer edge of the first edge of the first cylindrical protrusion (15P) is processed to have a first outer-edge processing width (K5) in the radial direction of the first cylindrical protrusion (15P), and the second edge processed portion has a second outer-edge processed portion in which an outer edge of the second edge of the second cylindrical protrusion (15Q) is processed to have a second outer-edge processing width (K5) larger than the first outer-edge processing width (K5) in the radial direction of the second cylindrical protrusion (15Q).

Each of the first outer-edge processed portion and the second outer-edge processed portion has one of: a chamfered (C) edge; a fillet (R) edge; or a stepped edge.

The first edge processed portion has a first inner-edge processed portion in which an inner edge of the first edge of the first cylindrical protrusion (15P) is processed to have a first inner-edge processing width (K5) in the radial direction of the first cylindrical protrusion (15P), and the second edge processed portion has a second inner-edge processed portion in which an inner edge of the second edge of the second cylindrical protrusion (15Q) is processed to have a second inner-edge processing width (K5) larger than the first inner-edge processing width (K5) in the radial direction of the second cylindrical protrusion (15Q).

Each of the multiple sealing members 17*a* has a contact face contactable with one of the top face of the first cylindrical protrusion 15P and the top face of the second cylindrical protrusion 15Q, and the contact face has a concentric circular shape.

[Another Specific Example in which Edge Processing Amount of Protrusion Provided at Edge of Nozzle is Different Between Nozzles]

Figure 16A:
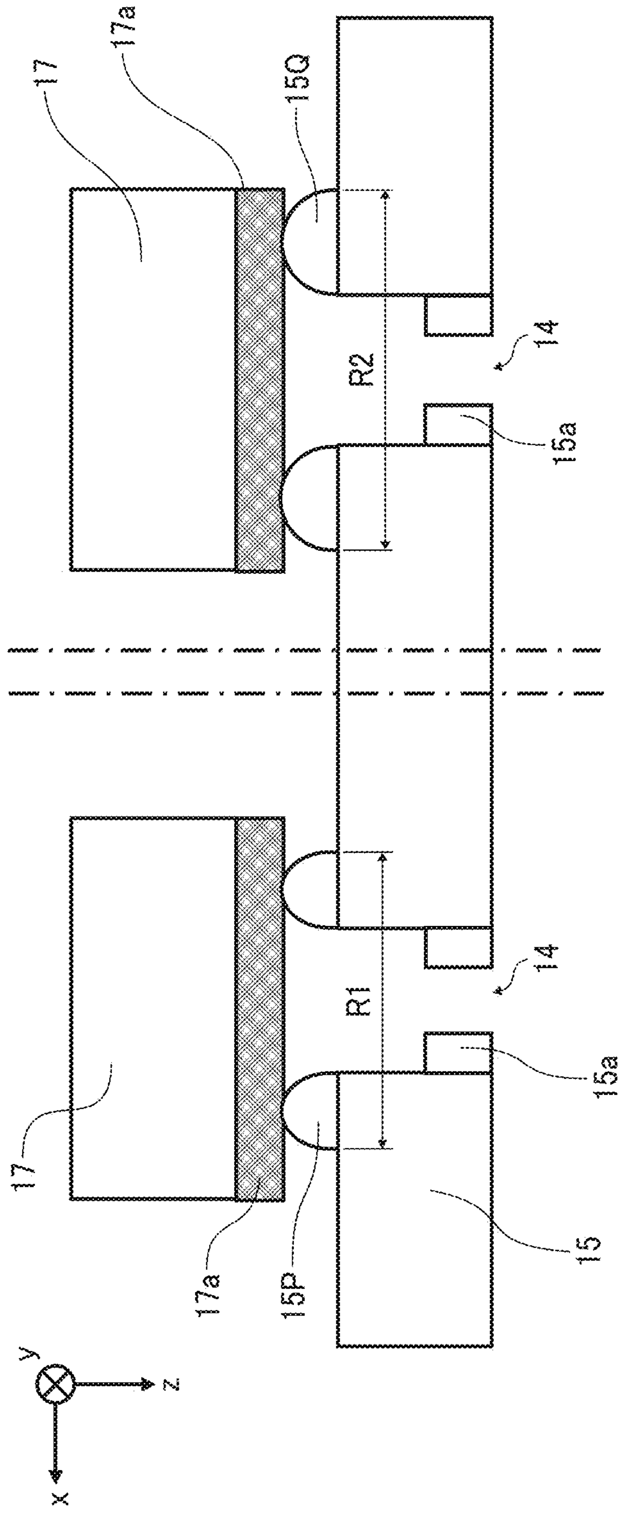
FIG. 16A is a diagram illustrating a configuration in which a step portion is provided in a nozzle in a configuration including a plurality of nozzles.

FIG. 16A is a diagram illustrating a configuration in which a step portion is provided in the nozzle in a configuration including a plurality of nozzles. In the configuration according to FIG. 15, a step portion 15*a* is provided on the nozzle 14 to form a stepped shape. In the following description, both the outer diameter side edge processing and the inner diameter side edge processing are performed on the protrusion, and both edge processing widths (edge processing amounts) are the same. In the following embodiment, processing of providing an R shape (R surface) is described as an example of the edge processing performed on the protrusion, but as described above, it is also possible to apply the C surface processing or small stepped processing.

A site having a large inner diameter on the liquid chamber side of the nozzle 14 (a portion from the surface opposite to the discharge surface of the nozzle plate 15 to the step portion 15*a*) plays a role of decreasing the fluid resistance of the liquid to improve the flow and increasing the discharge amount. A site having a small inner diameter on the discharge side of the nozzle 14 (a portion provided with the step portion 15*a*) plays a role of limiting the discharge amount of the liquid and improving a discharge speed from a relationship between a flow amount and a channel cross-sectional area.

A nozzle having a small inner diameter of the hole has a straight shape from an inlet to a discharge port, and when the length increases, the fluid resistance increases, so that the fluidity decreases. In a case of a nozzle having a large inner diameter of the hole, the discharge amount becomes excessive. Therefore, by providing the step portion in the hole of the nozzle as in the configuration according to FIG. 16A, the fluid resistance can be decrease at the inlet to improve the flow of the liquid, the discharge speed can be improved in the vicinity of the discharge port, and the discharge of the liquid can be stabilized. In the embodiment to be described later, a configuration in which the nozzle hole has such stepped shape is described as an example, and such configuration may obtain these effects.

In the configuration according to FIG. 16A, a method of performing the edge processing on the protrusion when the outer diameter of the protrusion provided at the edge of the nozzle is different between the nozzles is similar to that described in FIG. 15.

Here, the configuration according to FIG. 16A can be formed by cutting using a drill as a processing method. In contrast, the configuration regarding the stepped shape can be implemented by a method other than the processing method according to FIG. 16A.

In the configuration in which the step portion is formed in the nozzle to form the stepped shape, when processing is performed from one plate shaped member, various processing methods can be exemplified, and easy processing method is different each time due to a difference in material. At that time, if an easy method can be appropriately selected, work efficiency can be improved. A specific example of this is described.

Figure 16B:
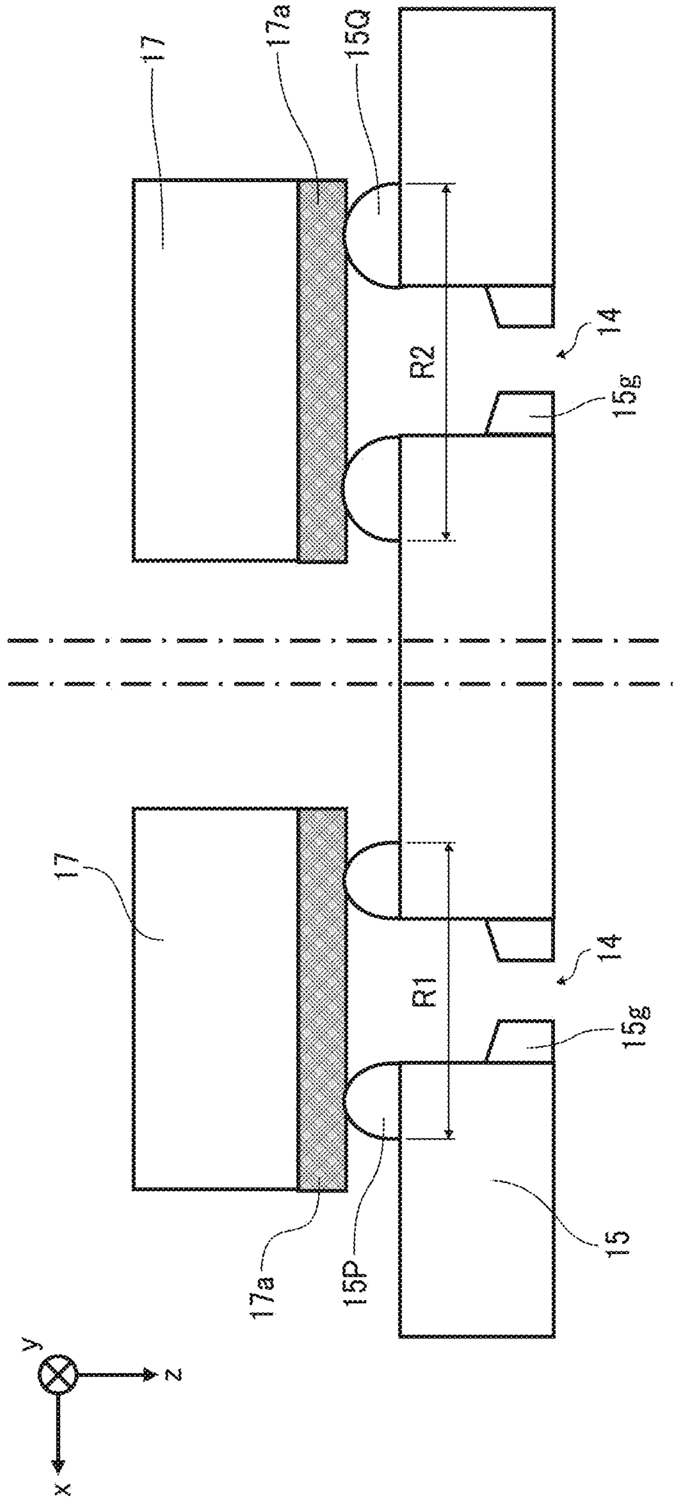
FIG. 16B is a diagram illustrating another configuration in which a step portion is provided in a nozzle in a configuration including a plurality of nozzles.

FIG. 16B is a diagram illustrating another configuration in which a step portion is provided in the nozzle in the configuration including a plurality of nozzles. In the configuration according to FIG. 15, a step portion 15*g* is provided in the nozzle 14 to form a stepped shape. In the following description, both the outer diameter side edge processing and the inner diameter side edge processing are performed on the protrusion, and both edge processing widths (edge processing amounts) are the same. In the following embodiment, processing of providing an R shape (R surface) is described as an example of the edge processing performed on the protrusion, but as described above, it is also possible to apply the C surface processing or small stepped processing.

Here, the step portion 15*g* includes a slope (inclined portion) in which the inner diameter decreases from the liquid chamber side toward the discharge side. The configuration according to FIG. 16B can be formed by punching with a pin.

For example, when it is desirable that a certain material is cut with a drill to make a shape as the configuration according to FIG. 16A, and a certain material is punched by punching to make a shape as the configuration according to FIG. 16B, an optimal processing method can be selected, and work efficiency can be improved.

[Diagram for Describing Method of Edge Processing]

Here, a diagram for describing a method of edge processing according to the present embodiment is illustrated with reference to FIGS. 17A to 17C. Numerical values and the like mentioned here for the sake of description are merely examples, and the present embodiment is not limited thereto. Here, in the configuration in which the protrusion is provided at the edge of the hole of the nozzle, description is focused on a case of performing the edge processing on the protrusion.

FIG. 17A is a diagram illustrating a configuration for describing the method of the edge processing according to the present embodiment. Here, an inlet nozzle diameter (an inner diameter of an inlet nozzle) is represented by din (=2×r1), and an outlet nozzle diameter (an inner diameter of a step portion of the nozzle) is represented by dout. Note that, r1 represents a distance from a center line, which is a line passing through the center axis of the nozzle, to a nozzle inner wall. The outlet nozzle is also referred to as a nozzle outlet, and the outlet nozzle diameter is also referred to as a nozzle outlet size.

The outer diameter of the protrusion (seal) (the outer diameter of the protrusion) is represented by 2×r2, an inlet nozzle length (a length from the inlet of the nozzle to the step portion) is represented by lin, an outlet nozzle length (a length of the step portion) is represented by lout, and a distance between the needle valve (sealing member) and the protrusion is represented by h.

Note that, r2 represents a distance from the center line passing through the center axis of the nozzle to an edge in the outer diameter direction of the protrusion. The inlet nozzle is also referred to as a nozzle inlet, and the outlet nozzle length is also referred to as a nozzle outlet length.

Then, μ represents ink viscosity, and Δx represents the edge processing width (edge processing amount) of the protrusion.

A fluid resistance value Rf represented by them is as represented by Rf equation in FIG. 17B. FIG. 17C illustrates setting values in the respective configurations.

[Regarding Procedure of Edge Processing]

Next, a procedure of the edge processing for adjusting the fluid resistance between the nozzles are described. It is herein described supposing that there is no variation other than the outer diameter of the protrusion, the length of the step portion, and the inner diameter of the step portion, and any one of them varies.

[Procedure of Edge Processing when Outer Diameter of Protrusion Varies Between Nozzles]

Figure 18A:
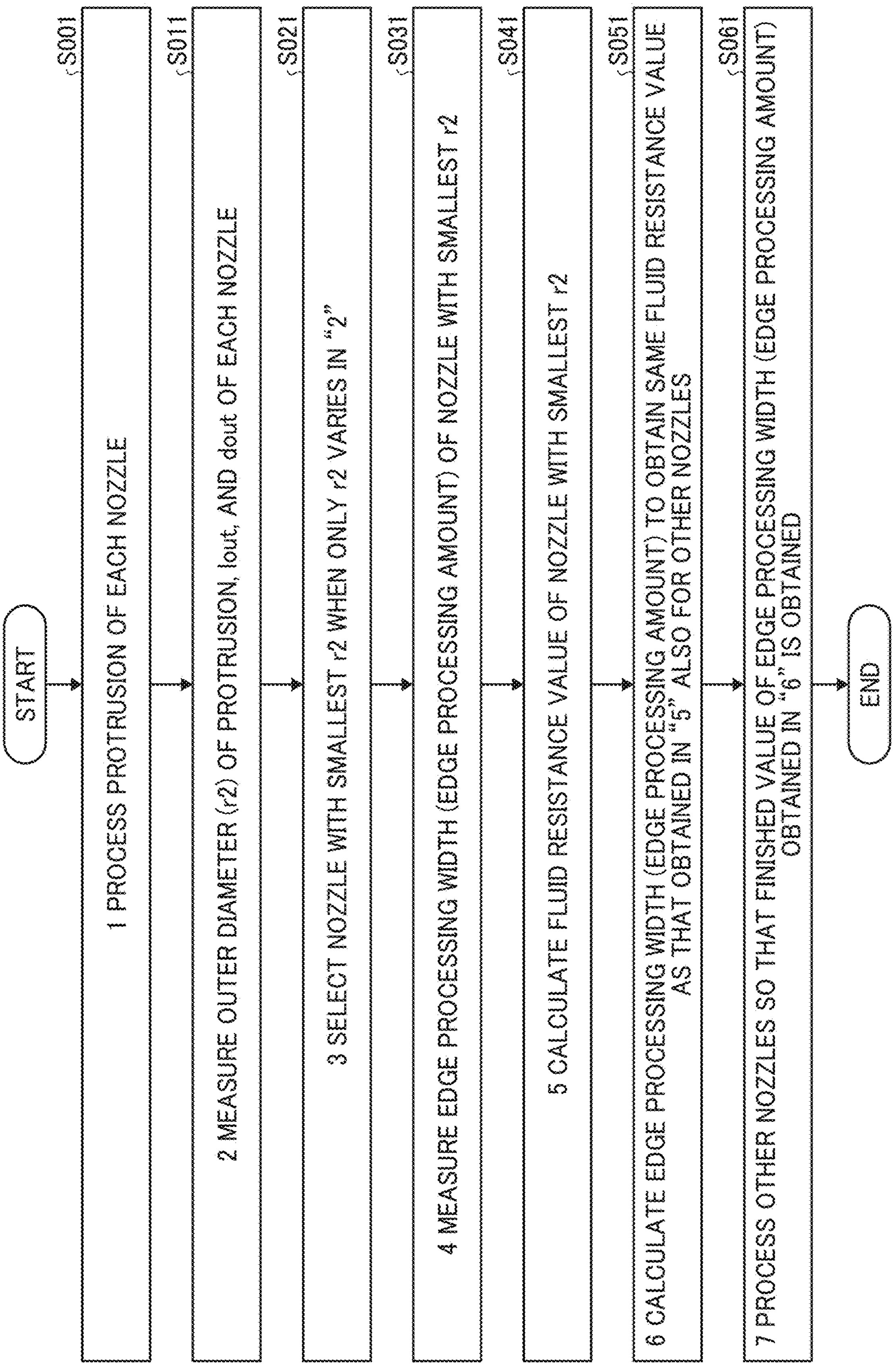
FIG. 18A is a flowchart illustrating a procedure of edge processing when an outer diameter of a protrusion varies between nozzles.

FIG. 18A is a flowchart illustrating the procedure of the edge processing when the outer diameter of the protrusion varies between the nozzles. The numbers in the flowchart represent the numbers in the procedure. First, a procedure method of the edge processing when the outer diameter of the protrusion provided at the edge of the nozzle varies between the nozzles is described using this.

First, at S001, the protrusion of each nozzle is processed (procedure 1). Since the protrusion has a shape including a corner when the protrusion is provided at the edge of the nozzle, this processing is for performing edge processing on the corner. The edge processing is herein referred to as first edge processing.

Next, at S011, the outer diameter (r2) of the protrusion, lout, and dout of each nozzle are measured (procedure 2). Then, the procedure proceeds to S021, and when lout and dout do not vary between the nozzles in procedure 2 and the outer diameter of the protrusion varies, the nozzle with smallest r2 is selected (procedure 3).

Then, the procedure proceeds to S031, and the edge processing width (edge processing amount) of the nozzle with smallest r2 is measured (procedure 4). Thereafter, the procedure proceeds to S041, and the fluid resistance value Rf of the nozzle with smallest r2 is calculated (procedure 5).

Then, the procedure proceeds to S051, and the edge processing width (edge processing amount) with which the same fluid resistance value as that obtained in procedure 5 is obtained is calculated also for the other nozzles (procedure 6). Thereafter, the procedure proceeds to S061, and the edge processing is also performed on the other nozzles so that the finish value of the edge processing width (edge processing amount) obtained in procedure 6 is obtained (procedure 7). This edge processing is herein referred to as second edge processing. Thereafter, the nozzle plate and the like are assembled.

Figure 18B:
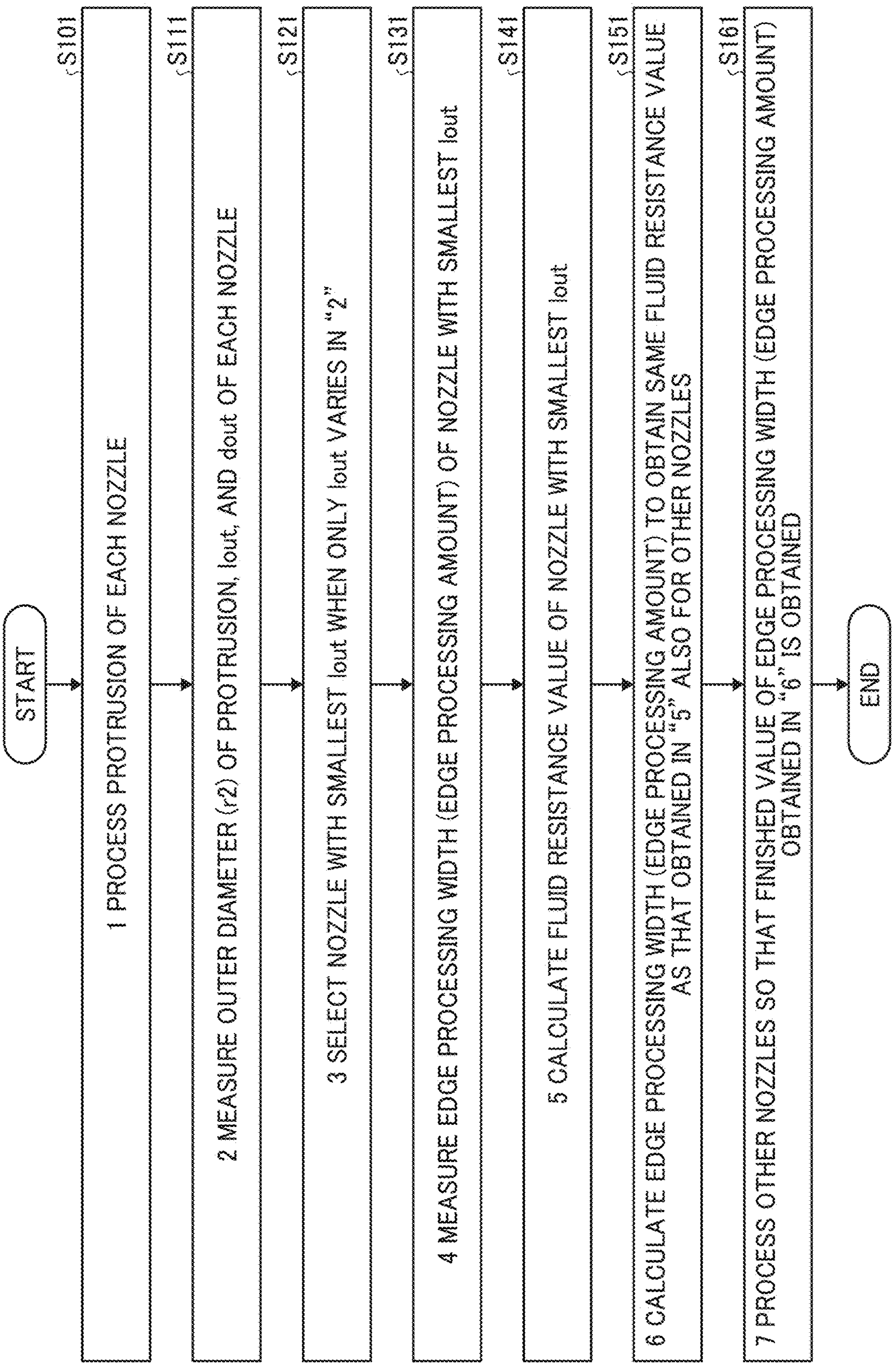
FIG. 18B is a flowchart illustrating a procedure of edge processing when a length of a step portion of the nozzle varies between nozzles.

FIG. 18B is a flowchart illustrating a procedure of the edge processing when the length of the step portion of the nozzle varies among the nozzles. The numbers in the flowchart indicate the numbers in the procedure. A procedure method of the edge processing when the length of the step portion of the nozzle varies between the nozzles is described using this.

First, at S101, the protrusion of each nozzle is processed (procedure 1). Since the protrusion has a shape including a corner when the protrusion is provided at the edge of the nozzle, this processing is for performing edge processing on the corner. The edge processing is herein referred to as first edge processing.

Next, at S111, the outer diameter (r2) of the protrusion, lout, and dout of each nozzle are measured (procedure 2). Then, the procedure proceeds to S121, and when r2 and lout do not vary between the nozzles in procedure 2 and the length of the step portion of the nozzle varies, the nozzle with smallest lout is selected (procedure 3).

Then, the procedure proceeds to S131, and the edge processing width (edge processing amount) of the nozzle with smallest lout is measured (procedure 4). Thereafter, the procedure proceeds to S141, and the fluid resistance value Rf of the nozzle with smallest lout is calculated (procedure 5).

Then, the procedure proceeds to S151, and the edge processing width (edge processing amount) with which the same fluid resistance value as that obtained in procedure 5 is obtained is calculated also for the other nozzles (procedure 6). Thereafter, the procedure proceeds to S161, and the edge processing is also performed on the other nozzles so that the finish value of the edge processing width (edge processing amount) obtained in procedure 6 is obtained (procedure 7). This edge processing is herein referred to as second edge processing. Thereafter, the nozzle plate and the like are assembled.

Figure 18C:
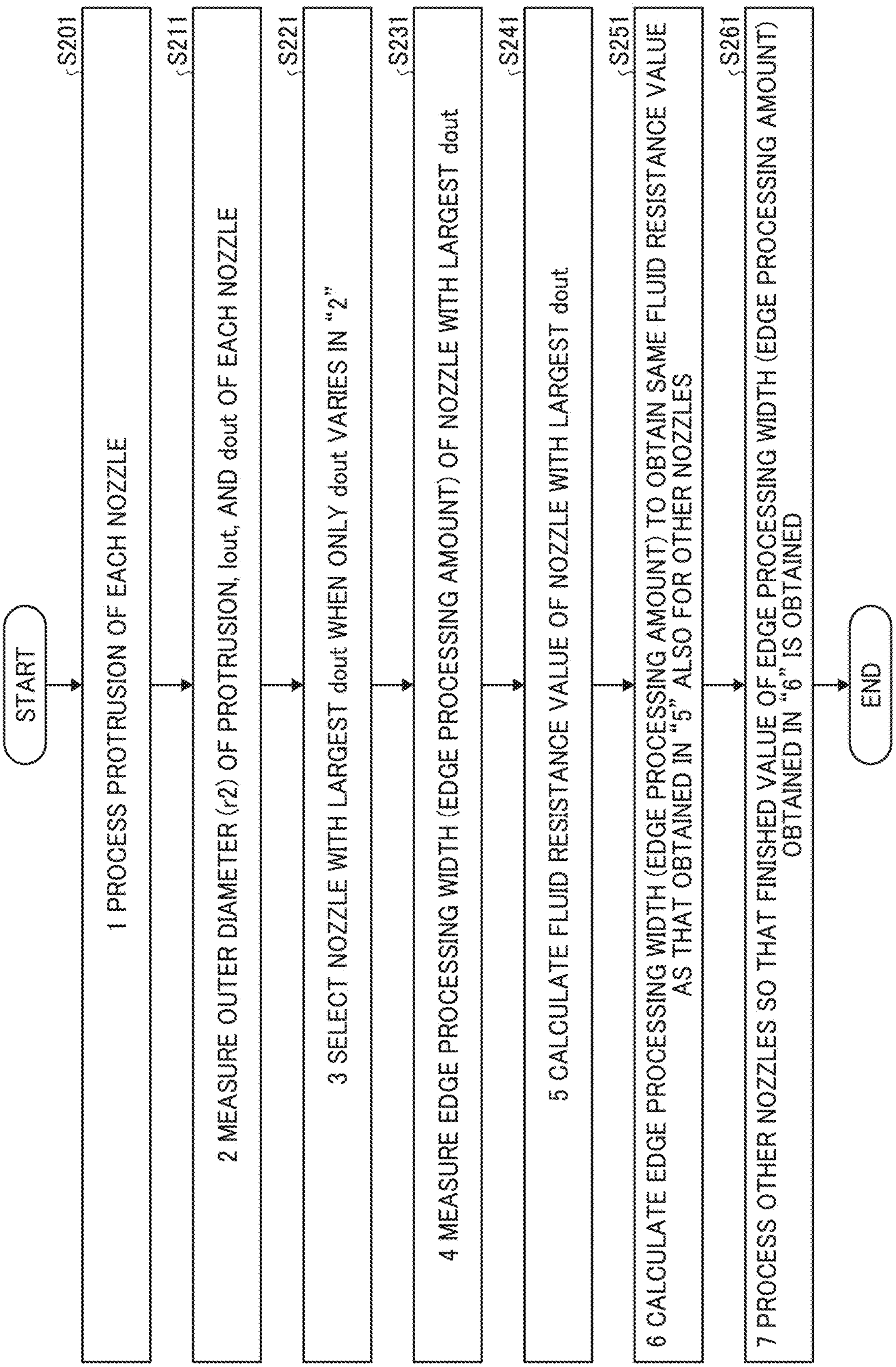
FIG. 18C is a flowchart illustrating a procedure of edge processing when an inner diameter of a step portion of the nozzle varies between nozzles.

FIG. 18C is a flowchart illustrating a procedure of the edge processing when the inner diameter (outlet size) of the step portion of the nozzle varies between the nozzles. The numbers in the flowchart indicate the numbers in the procedure. A procedure method of edge processing when the length of the step portion of the nozzle varies between the nozzles is described using this.

First, at S201, the protrusion of each nozzle is processed (procedure 1). Since the protrusion has a shape including a corner when the protrusion is provided at the edge of the nozzle, this processing is for performing edge processing on the corner. The edge processing is herein referred to as first edge processing.

Next, at S211, the outer diameter (r2) of the protrusion, lout, and dout of each nozzle are measured (procedure 2). Then, the procedure proceeds to S221, and when r2 and lout do not vary between the nozzles in procedure 2 and the inner diameter (outlet size) of the step portion of the nozzle varies, the nozzle with largest dout is selected (procedure 3).

Then, the procedure proceeds to S231, and the edge processing width (edge processing amount) of the nozzle with largest dout is measured (procedure 4). Thereafter, the procedure proceeds to S241, and the fluid resistance value Rf of the nozzle with largest dout is calculated (procedure 5).

Then, the procedure proceeds to S251, and the edge processing width (edge processing amount) with which the same fluid resistance value as that obtained in procedure 5 is obtained is calculated also for the other nozzles (procedure 6). Thereafter, the procedure proceeds to S261, and the edge processing is also performed on the other nozzles so that the finish value of the edge processing width (edge processing amount) obtained in procedure 6 is obtained (procedure 7). This edge processing is herein referred to as second edge processing. Thereafter, the nozzle plate and the like are assembled.

[Specific Example of Method of Edge Processing]

Next, a specific example of a method of the edge processing is described. FIGS. 19A to 19C are tables illustrating a specific example of the method of the edge processing. Here, FIG. 19A is a table illustrating a specific example of the edge processing when the outer diameter of the protrusion varies between the nozzles. FIG. 19B is a table illustrating a specific example of the edge processing when the length of the step portion of the nozzle varies between the nozzles. FIG. 19C is a diagram illustrating a specific example of the edge processing when the inner diameter of the step portion of the nozzle varies between the nozzles. Here, the set values illustrated in FIGS. 17A to 17C are used as the specific numerical values illustrated in FIGS. 19A to 19C. In the configuration according to FIGS. 19A to 19C, a case where the number of nozzles is three is described as an example. The three nozzles in FIGS. 19A to 19C are referred to as a nozzle 1, a nozzle 2, and a nozzle 3 for description. Although a case where the number of nozzles is three is herein described, the present embodiment can be applied to a case where the number of nozzles is two or four or more.

[Specific Example of Edge Processing when Outer Diameter of Protrusion Varies Between Nozzles]

First, FIG. 19A is described. The edge processing procedure according to FIG. 19A is performed based on the processing procedure illustrated in FIG. 18A.

Since the protrusion has a shape including a corner when the protrusion is provided at the edge of the nozzle, the edge processing is performed on the corner (first edge processing) (corresponding to S001 in FIG. 18A). The edge processing width (edge processing amount) at that time is, for example, 1 μm in the present embodiment.

Next, the outer diameter (r2) of the protrusion, lout, and dout of each nozzle are measured (corresponding to S011 in FIG. 18A). At that time, since lout and dout do not vary between the nozzles and the outer diameter of the protrusion varies, the nozzle with smallest r2 is selected (corresponding to S021 in FIG. 18A).

Then, the edge processing width (edge processing amount) of the nozzle with smallest r2 is measured (corresponding to S031 in FIG. 18A). Thereafter, the fluid resistance value Rf of the nozzle with smallest r2 is calculated (corresponding to S041 in FIG. 18A).

Here, in FIG. 19A, since r2 of the nozzle 3 is the smallest among the protrusions of the three nozzles, the nozzle 3 is selected. Then, the fluid resistance value Rf of the nozzle 3 is calculated.

Then, the fluid resistance value Rf is calculated, and the edge processing width (edge processing amount) with which the same fluid resistance value as that of the nozzle 3 is obtained is calculated also for the other nozzles (nozzles 1 and 2) (corresponding to S051 in FIG. 18A). Thereafter, processing of performing the edge processing (second edge processing) is also performed on the nozzles 1 and 2 so as to obtain the finished value of the obtained edge processing width (edge processing amount) (corresponding to S061 in FIG. 18A).

Specifically, the edge processing is performed on the nozzles 1 and 2 with a larger edge processing width (edge processing amount) than that of the nozzle 3.

In addition, Δx illustrated in FIG. 19A is a final edge processing width (edge processing amount) of the three nozzles. In the nozzle 3, the amount of the first edge processing is the final amount. In contrast, as for the nozzles 1 and 2, the amount of the second edge processing is the final amount in addition to the edge processing amount in the first edge processing. As illustrated in FIG. 19A, it is found that the edge processing width (edge processing amount) Δx of the nozzle 2 with largest r2 is the largest, and the edge processing width (edge processing amount) Δx of the nozzle 3 with smallest r2 is the smallest.

[Specific Example of Edge Processing when Length of Step Portion of Nozzle Varies Between Nozzles]

Next, FIG. 19B is described. The edge processing procedure according to FIG. 19B is performed based on the processing procedure illustrated in FIG. 18B.

First, since the protrusion has a shape including a corner when the protrusion is provided at the edge of the nozzle, the edge processing is performed on the corner (first edge processing) (corresponding to S101 in FIG. 18B). The edge processing width (edge processing amount) at that time is, for example, 1 μm in the present embodiment.

Next, the outer diameter (r2) of the protrusion, lout, and dout of each nozzle are measured (corresponding to S111 in FIG. 18B). At that time, since r2 and dout do not vary between the nozzles and the length of the step portion (outlet length) varies, the nozzle with smallest lout is selected (corresponding to S121 in FIG. 18B).

Then, the edge processing width (edge processing amount) of the nozzle with smallest lout is measured (corresponding to S131 in FIG. 18B). Thereafter, the fluid resistance value Rf of the nozzle with smallest lout is calculated (corresponding to S141 in FIG. 18B).

Here, in FIG. 19B, since lout of the nozzle 3 is the smallest among the lengths of the step portion of the three nozzles, the nozzle 3 is selected. Then, the fluid resistance value Rf of the nozzle 3 is calculated.

Then, the fluid resistance value Rf is calculated, and the edge processing width (edge processing amount) with which the same fluid resistance value as that of the nozzle 3 is obtained is calculated also for the other nozzles (nozzles 1 and 2) (corresponding to S151 in FIG. 18B). Thereafter, processing of performing the edge processing (second edge processing) is also performed on the nozzles 1 and 2 so as to obtain a finished value of the obtained edge processing width (edge processing amount) (corresponding to S161 in FIG. 18B).

Specifically, the edge processing is performed on the nozzles 1 and 2 with a larger edge processing width (edge processing amount) than that of the nozzle 3.

In addition, Δx illustrated in FIG. 19B is a final edge processing width (edge processing amount) of the three nozzles. In the nozzle 3, the amount of the first edge processing is the final amount. In contrast, as for the nozzles 1 and 2, the amount of the second edge processing is the final amount in addition to the edge processing amount in the first edge processing. As illustrated in FIG. 19B, it is found that the edge processing width (edge processing amount) Δx of the nozzle 2 with largest lout is the largest, and the edge processing width (edge processing amount) Δx of the nozzle 3 with smallest lout is the smallest.

[Specific Example of Edge Processing when Inner Diameter of Step Portion Varies Between Nozzles]

FIG. 19C is described. The edge processing procedure in FIG. 19C is performed based on the processing procedure illustrated in FIG. 18C.

First, since the protrusion has a shape including a corner when the protrusion is provided at the edge of the nozzle, the edge processing is performed on the corner (first edge processing) (corresponding to S201 in FIG. 18C). The edge processing width (edge processing amount) at that time is, for example, 1 μm in the present embodiment.

Next, the outer diameter (r2) of the protrusion, lout, and dout of each nozzle are measured (corresponding to S211 in FIG. 18C). At that time, since r2 and lout do not vary between the nozzles and the inner diameter of the step portion (outlet size) varies, the nozzle with largest dout is selected (corresponding to S221 in FIG. 18C).

Then, the edge processing width (edge processing amount) of the nozzle with largest dout is measured (corresponding to S231 in FIG. 18C). Thereafter, the fluid resistance value Rf of the nozzle with largest dout is calculated (corresponding to S241 in FIG. 18C).

Here, in FIG. 19C, since lout of the nozzle 3 is the smallest among the lengths of the step portions of the three nozzles, the nozzle 3 is selected. Then, the fluid resistance value Rf of the nozzle 3 is calculated.

Then, the fluid resistance value Rf is calculated, and the edge processing width (edge processing amount) with which the same fluid resistance value as that of the nozzle 3 is obtained is calculated also for the other nozzles (nozzles 1 and 2) (corresponding to S251 in FIG. 18C). Thereafter, processing of performing the edge processing (second edge processing) is also performed on the nozzles 1 and 2 so as to obtain a finished value of the obtained edge processing width (edge processing amount) (corresponding to S261 in FIG. 18C).

Specifically, the edge processing is performed on the nozzles 1 and 2 with a larger edge processing width (edge processing amount) than that of the nozzle 3.

In addition, Δx illustrated in FIG. 19C is a final edge processing width (edge processing amount) of the three nozzles. In the nozzle 3, the amount of the first edge processing is the final amount. In contrast, as for the nozzles 1 and 2, the amount of the second edge processing is the final amount in addition to the edge processing amount in the first edge processing. As illustrated in FIG. 19C, it is found that the edge processing width (edge processing amount) Δx of the nozzle 2 with smallest dout is the largest, and the edge processing width (edge processing amount) Δx of the nozzle 3 with largest dout is the smallest.

[Regarding Another Specific Example of Performing Edge Processing on Edge of Nozzle]

Hereinafter, another specific embodiment in which the edge processing amount performed on the edge of the hole of the nozzle is different between the nozzles in a configuration including a plurality of nozzles is described. The basic idea of the edge processing is similar to the above. In the following embodiment, as the edge processing performed on the edge of the nozzle, processing of providing an R shape (R surface) is described as an example, but as described above, it is also possible to apply the C surface processing or small stepped processing. The edge processing width regarding the edge processed portion of the nozzle is as defined above.

Figure 20:
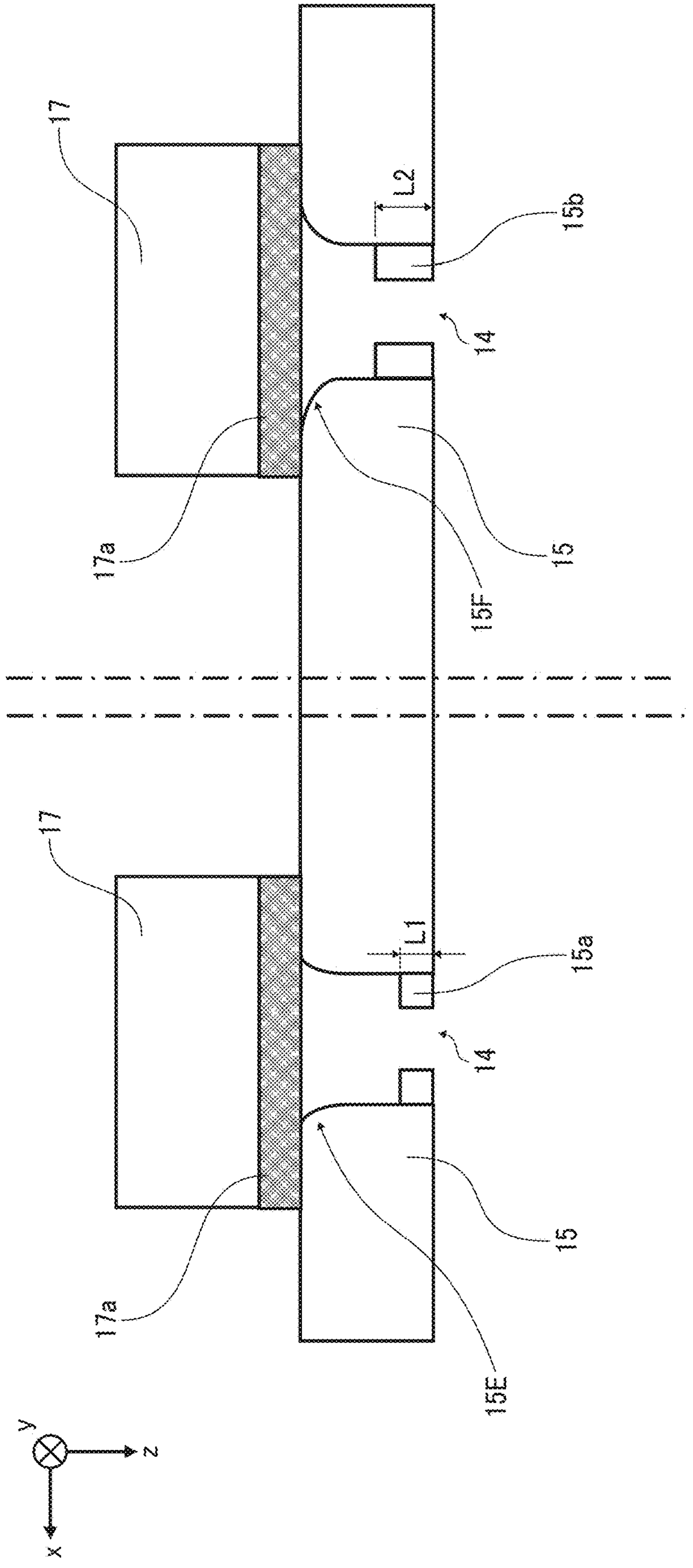
FIG. 20 is a diagram illustrating that an edge processing amount of an edge of a nozzle is different between nozzles in a configuration including a plurality of stepped nozzles having different lengths of step portions.

FIG. 20 is a diagram illustrating that the edge processing amount of the edge of the nozzle is different between the nozzles in a configuration including a plurality of stepped nozzles having different lengths in step portion. With reference to this drawing, it is described that the edge processing is performed on a plurality of nozzles, and the edge processing amount is made different according to a finished dimension of the step portion to suppress the variation in discharging performance between the nozzles.

FIG. 20 illustrates an example of a discharge apparatus including a plurality of nozzles in which each nozzle is provided with a step portion and there is a processing difference between the nozzles. The nozzle (nozzle on a left side in FIG. 20) in which the length of the step portion (outlet length) is L1 and the nozzle (nozzle on a right side in FIG. 20) in which the length of the step portion (outlet length) is L2 are provided. The step portion having the length L1 is a step portion 15*a* (an example of a second small-diameter portion length), and the step portion having a length L2 is a step portion 15*b* (an example of a first small-diameter portion length). A relationship therebetween is L1<L2.

Here, examples of a processing method include a method of cutting with a drill and joining divided nozzle plates with an adhesive, and at that time, a processing variation is supposed to be around several 100 μm. It is known that the discharging performance depends on the fluid resistance of the nozzle, and the fluid resistance depends on the inner diameter and the length of the nozzle. For example, when the edge processing is chamfering with a constant dimension, the length of the step portion is different in the configuration in FIG. 20, so that the fluid resistance is different between the nozzles, and as a result, the discharging performance is different between the nozzles.

In view of this, in the configuration illustrated in FIG. 20, the edge processing amount is adjusted for the edge of the nozzle according to the length of the step portion. For example, in order to stabilize the fluid resistance until discharge, when the length of the step portion is large due to the processing variation, the edge processing amount (edge processing width) is relatively increased. When the length of the step portion is small due to the processing variation, the edge processing amount is relatively decreased.

For example, in FIG. 20, when the outer diameter of the needle valve and the outer diameter of the sealing member are finished as designed, the edge processing amount of the edge processed portion at that time is R=5 μm. The length of the step portion 15*a* on the left side in FIG. 20 is finished as designed. In contrast, the length of the step portion 15*b* on the right side in FIG. 20 becomes larger than the design value by 10 μm. At that time, the fluid resistance of the nozzle on the right side is larger than the design value. Therefore, in order to decrease the fluid resistance, the edge processing in the edge processed portion 15F on the right side is set to R>5 μm to stabilize the fluid resistance. That is, a relationship in edge processing amount is set as edge processed portion 15E<edge processed portion 15F when the edge processed portion on the left side is set to the edge processed portion 15E.

In the above-described configuration, a case of one step portion is described, but the present embodiment can also be applied to a configuration in which a plurality of step portions is provided in order to design requested discharging performance or by a characteristic shape by a processing method.

Figure 21:
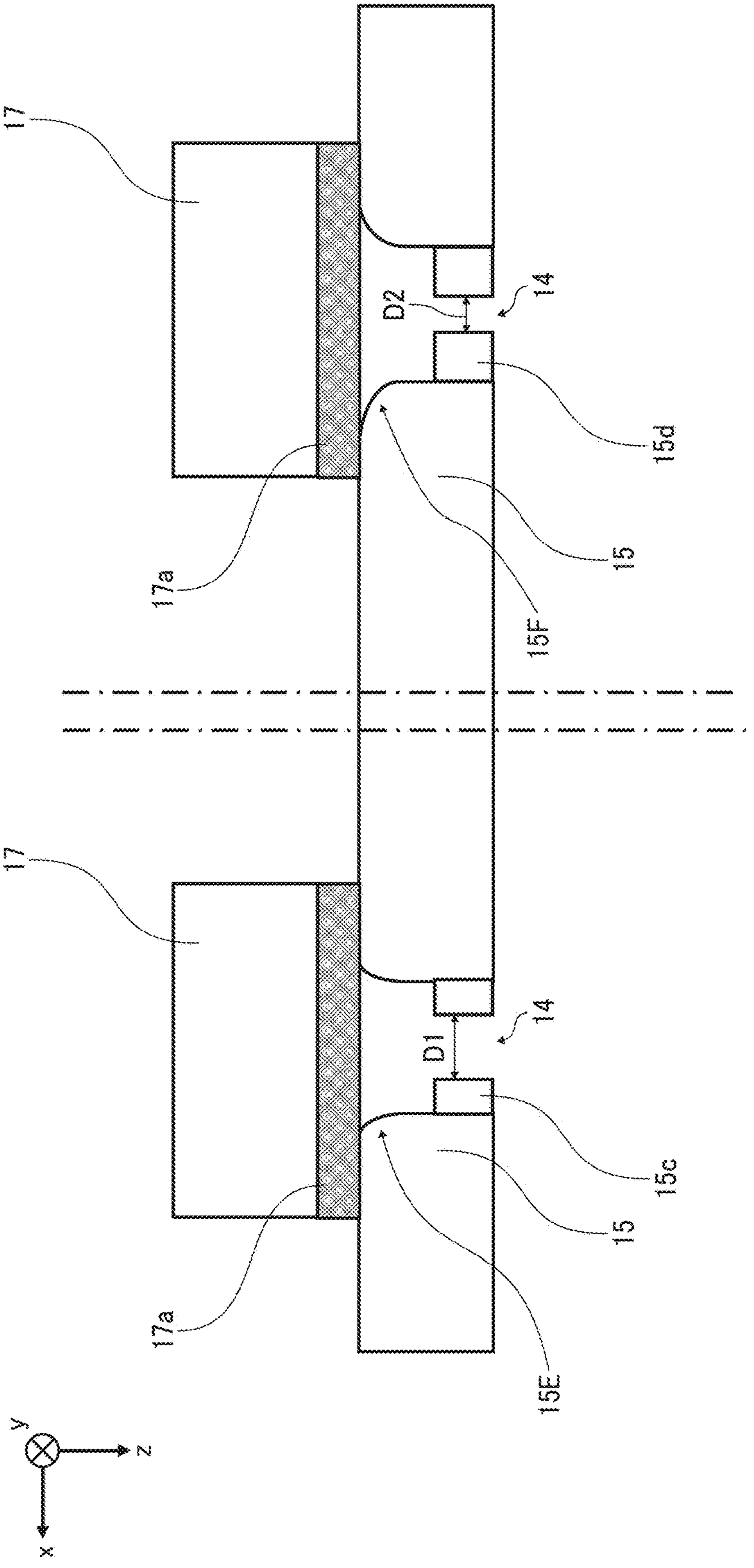
FIG. 21 is a diagram illustrating that an edge processing amount of an edge of a nozzle is different between nozzles in a configuration including a plurality of stepped nozzles having different inner diameters of step portions.

FIG. 21 is a diagram illustrating that the edge processing amount of the edge of the nozzle is different between the nozzles in a configuration including a plurality of stepped nozzles having different inner diameters in step portion. With reference to this drawing, it is described that the edge processing is performed on a plurality of nozzles, and the edge processing amount is made different according to a finished dimension of the step portion to suppress the variation in discharging performance between the nozzles.

FIG. 21 illustrates an example of a discharge apparatus including a plurality of nozzles in which each nozzle is provided with a step portion and there is a processing difference between the nozzles. The nozzle (nozzle on a left side in FIG. 21) in which the inner diameter of the step portion (outlet size) is D1 and the nozzle (nozzle on a right side in FIG. 21) in which the inner diameter of the step portion (outlet size) is D2 are provided. The step portion having the outlet size D1 is a step portion 15*c* (an example of a second inner diameter), and the step portion having the outlet size D2 is a step portion 15*d* (an example of a first inner diameter). A relationship therebetween is D1>D2.

Here, examples of a processing method include a method of cutting with a drill and joining divided nozzle plates with an adhesive, and at that time, a processing variation is supposed to be around several 100 μm. It is known that the discharging performance depends on the fluid resistance of the nozzle, and the fluid resistance depends on the inner diameter and the length of the nozzle. For example, when the edge processing is chamfering with a constant dimension, the inner diameter of the step portion is different in the configuration in FIG. 21, so that the fluid resistance is different between the nozzles, and as a result, the discharging performance is different between the nozzles.

In view of this, in the configuration illustrated in FIG. 21, the edge processing amount is adjusted for the edge of the nozzle according to the inner diameter of the step portion. For example, in order to stabilize the fluid resistance until discharge, when the inner diameter of the step portion is small due to the processing variation, the edge processing amount (edge processing width) is relatively increased. When the inner diameter of the step portion is large due to the processing variation, the edge processing amount is relatively decreased.

For example, in FIG. 21, when the outer diameter of the needle valve and the outer diameter of the sealing member are finished as designed, the edge processing amount of the edge processed portion at that time is R=5 μm. The inner diameter of the step portion 15*c* on the left side in FIG. 21 is finished as designed. In contrast, the inner diameter of the step portion 15*d* on the right side in FIG. 21 becomes smaller than the design value by 10 μm. At that time, the fluid resistance of the nozzle on the right side is larger than the design value. Therefore, in order to decrease the fluid resistance, the edge processing in the edge processed portion 15F on the right side is set to R>5 μm to stabilize the fluid resistance. That is, a relationship in edge processing amount is set as edge processed portion 15E<edge processed portion 15F when the edge processed portion on the left side is set to the edge processed portion 15E.

In the above-described configuration, a case of one step portion is described, but the present embodiment can also be applied to a configuration in which a plurality of step portions is provided in order to design requested discharging performance or by a characteristic shape by a processing method.

Figure 22:
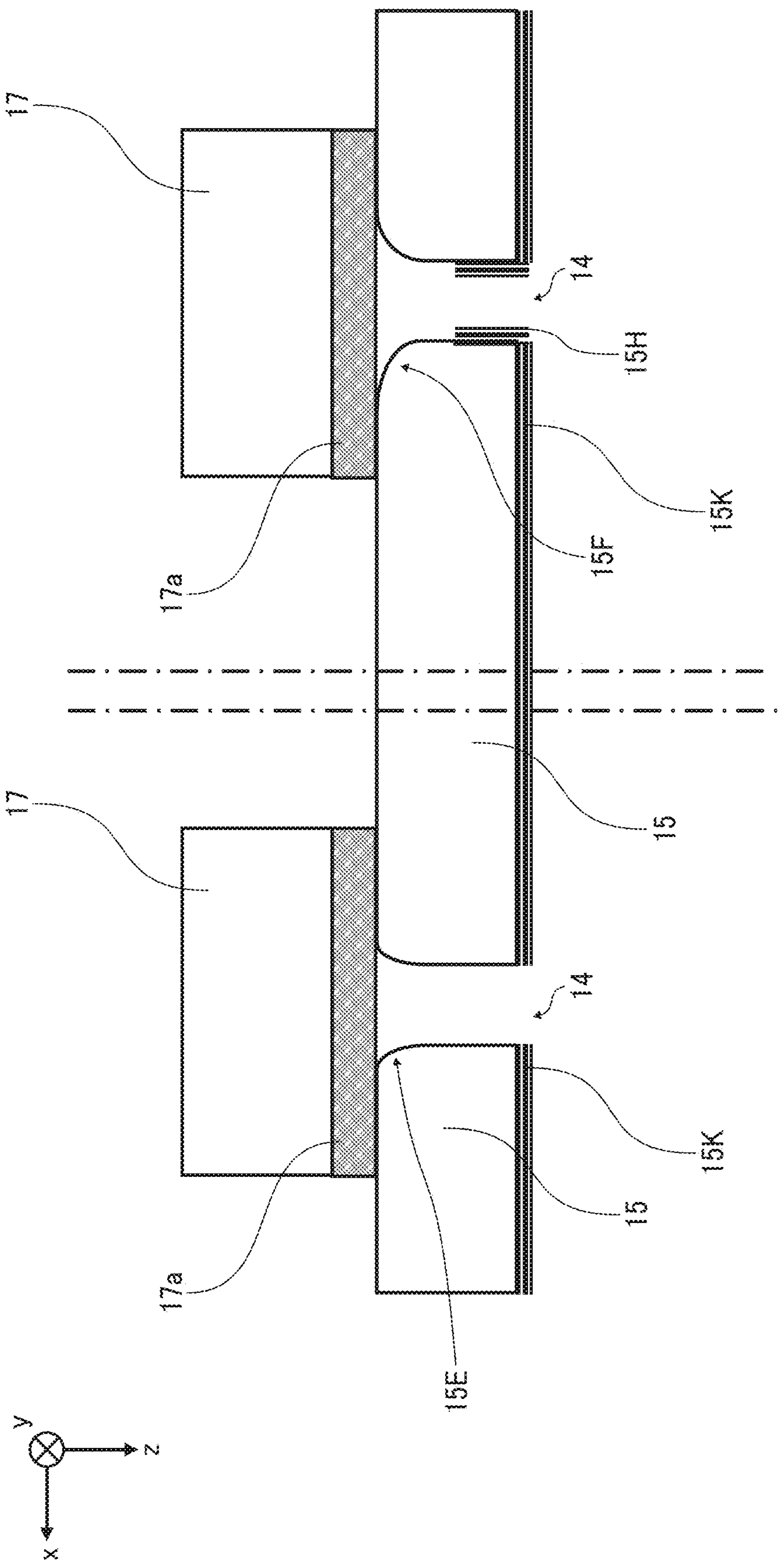
FIG. 22 is a diagram illustrating that an edge processing amount of an edge of a nozzle is different between nozzles in a configuration including a plurality of nozzles in which discharge amounts of a coating layer to the nozzles are different.

FIG. 22 is a diagram illustrating that the edge processing amount of the edge of the nozzle is different between the nozzles in a configuration including a plurality of nozzles in which a discharge amount of a coating layer to the nozzle is different. With reference to this drawing, it is described that the edge processing is performed on a plurality of nozzles, and the edge processing amount is made different according to a projection amount (discharge amount) of the coating layer to the nozzle to suppress the variation in discharging performance between the nozzles.

FIG. 22 illustrates an example of a discharge apparatus including a plurality of nozzles. FIG. 22 illustrates a state in which the coating layer applied to the surface on the discharge side of the nozzle plate projects to an inner wall of the hole of the nozzle on the right side of the drawing. Here, the surface on the discharge side of the nozzle plate may be subjected to coating processing to form the coating layer. Examples of a function of the coating layer include functions of water repellency, oil repellency, stain resistance, and scratch resistance. Examples of a material of the coating layer in the present embodiment include a PTFE-based water-repellent film and a TiN-based ceramic coating. The present embodiment is not limited to them. Examples of an application method include vapor deposition, immersion, and coating. The coating layer projecting so as to cover the inner wall of the nozzle is removed by plasma treatment, but cannot be sufficiently removed depending on coating strength and the diameter of the nozzle, and some remains on the inner wall of the hole of the nozzle.

In the configuration according to FIG. 22, the nozzle (nozzle on the left side in FIG. 22) in which the coating layer is not discharged to the inner wall of the nozzle and the nozzle (nozzle on the right side in FIG. 22) in which the coating layer projects (is discharged) to the inner wall of the nozzle with a predetermined amount are provided. Here, for the sake of description, “the coating layer is not discharged to the inner wall of the nozzle” is a state in which the coating layer is not discharged to the inner wall of the nozzle, or the amount of the discharged coating layer is almost zero. The coating layer applied to the discharge surface of the nozzle plate 15 is referred to as a coating layer 15K. The coating layer discharged to the inner wall of the hole of the nozzle on the right side in FIG. 22 is defined as coating projection 15H (an example of second coating). Here, “projecting” of the coating layer is also referred to as “discharged”.

Here, it is known that the discharging performance depends on the fluid resistance of the nozzle, and the fluid resistance depends on the diameter of the nozzle. For example, when the edge processing is chamfering with a constant dimension, the projection amount of the coating layer to the nozzle is different, so that the fluid resistance is different between the nozzles, and as a result, the discharging performance is different between the nozzles.

In view of this, in the configuration illustrated in FIG. 22, the edge processing amount is adjusted for the edge of the nozzle according to the projection amount of the coating layer. For example, in order to stabilize the fluid resistance until discharge, when the projection amount is large, the edge processing amount (edge processing width) is relatively increased. When the projection amount is small, the edge processing amount is relatively decreased.

For example, in FIG. 22, when the outer diameters of the nozzle, the needle valve, and the sealing member are finished as designed, the edge processing amount in the edge processed portion at that time is R=5 μm. The coating does not project to the inner wall of the hole in the nozzle on the left side in FIG. 22, but the coating projection 15H projects to the inner wall of the hole by 5 μm in the nozzle on the right side in FIG. 22. At that time, the fluid resistance of the nozzle on the right side is larger than the design value. Therefore, in order to decrease the fluid resistance, the edge processing in the edge processed portion 15F on the right side is set to R>5 μm to stabilize the fluid resistance.

That is, a relationship in edge processing amount is set as edge processed portion 15E<edge processed portion 15F when the edge processed portion on the left side is set to the edge processed portion 15E.

[When Edge Processing is Performed on Needle Valve]

Hereinafter, an embodiment in which the edge processing amount performed on the needle valve is different between the needle valves in the configuration including a plurality of needle valves is described. The basic idea of the edge processing is similar to the above. In the following embodiment, the sealing member is provided on the nozzle plate side. The sealing member is provided corresponding to each needle valve, but for example, a hole may be formed at a position corresponding to each needle valve in one sheet shaped object. Processing of providing an R shape (R surface) is described as an example of the edge processing performed on the needle valve, but as described above, it is also possible to apply the C surface processing or small stepped processing. The edge processing width regarding the edge processed portion of the needle valve is as defined above unless otherwise specified.

Figure 23:
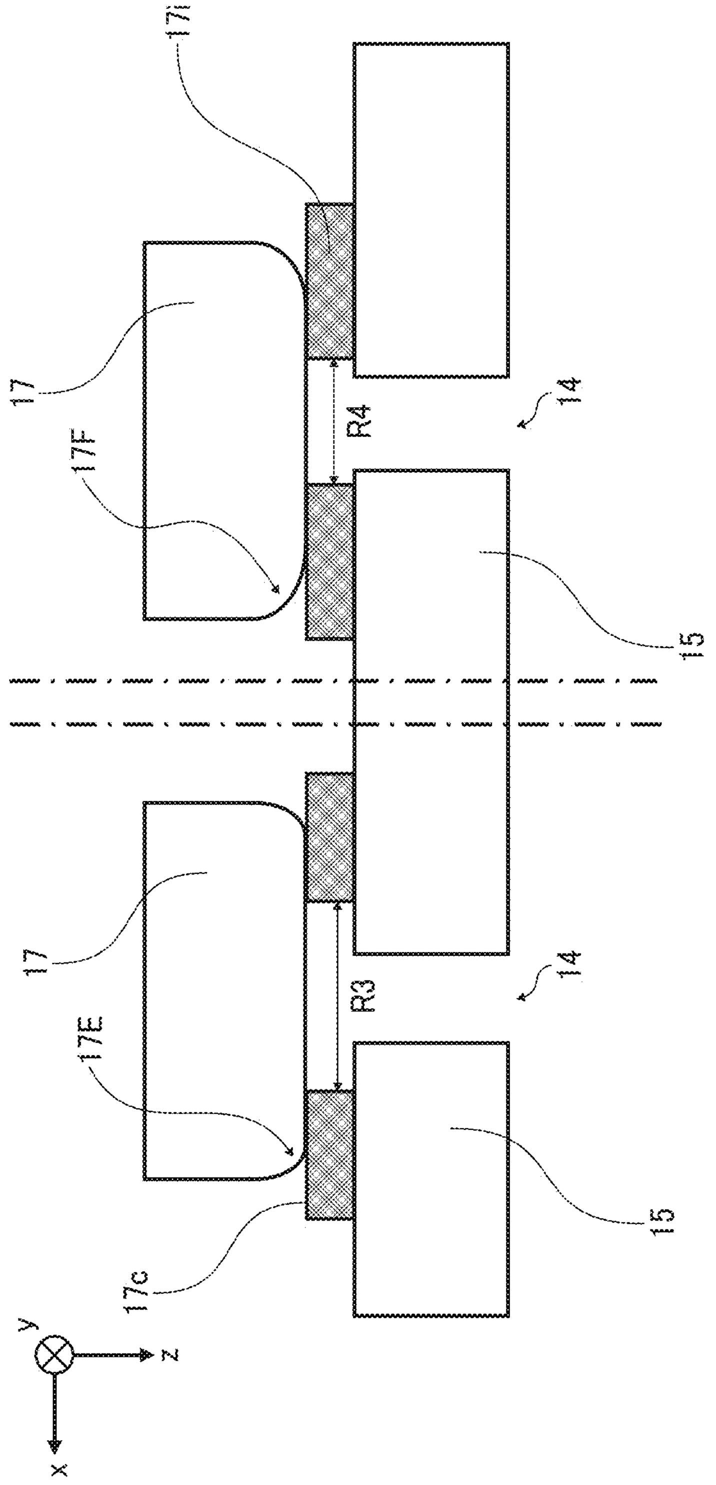
FIG. 23 is a diagram illustrating that an edge processing amount of an edge of a needle valve is different between needle valves in a configuration including a plurality of needle valves.

FIG. 23 is a diagram illustrating that the edge processing amount of the edge of the needle valve is different between the needle valves in a configuration including a plurality of needle valves. With reference to this drawing, it is described that the edge processing is performed on a plurality of nozzles, and the edge processing amount is made different according to a finished dimension of the inner diameter of the sealing member to suppress the variation in discharging performance between the needle valves.

FIG. 23 illustrates an example of a discharge apparatus including a plurality of nozzles, in which sealing members 17*c* and 17*i* having different inner diameters of holes of the sealing members due to a processing difference are provided. In a configuration according to FIG. 23, the inner diameter of the hole of the sealing member 17*c* is set to R3 (left side in FIG. 23, an example of a first inner diameter), and the inner diameter of the hole of the sealing member 17*i* is set to R4 (right side in FIG. 23, an example of a second inner diameter). A relationship therebetween is R3<R4.

For example, the sealing member may be processed by cutting using a cutting tool; since the sealing member is formed of an elastic member such as rubber, this has elasticity and the cutting property is poor, so that a processing variation is supposed to be about several 100 μm. It is known that the discharging performance depends on the fluid resistance between the sealing member and the needle valve, and the fluid resistance depends on an area of the seal portion. For example, when the edge of the needle valve is subjected to chamfering with a uniform dimension between the needle valves as the edge processing, the inner diameter of the hole of the sealing member is different, so that the area of the seal portion is different between the needle valves. As a result, the discharging performance differs between the needle valves.

In view of this, in the configuration illustrated in FIG. 23, the edge processing amount is adjusted for the edge of the nozzle according to a difference in inner diameter of the hole of the sealing member. For example, in order to stabilize the fluid resistance until discharge, when the inner diameter of the hole of the sealing member is large due to the processing variation, the edge processing amount (edge processing width) is relatively decreased. When the inner diameter of the hole of the sealing member is small due to the processing variation, the edge processing amount is relatively increased.

For example, in FIG. 23, the hole size of the nozzle 14 is finished as designed, and the edge processing amount in the edge processed portion at that time is R=5 μm. The inner diameter R3 of the hole of the sealing member 17*c* on the left side in FIG. 23 is finished as designed. In contrast, the inner diameter R4 of the hole of the sealing member 17*i* on the right side in FIG. 23 becomes smaller than the design value by 10 μm. At that time, the fluid resistance between the sealing member 17*i* and the needle valve 17 is larger than the design value. Therefore, in order to decrease the fluid resistance, the edge processing in the edge processed portion 17F on the right side is set to R>5 μm to stabilize the fluid resistance. That is, a relationship in edge processing amount is set as edge processed portion 17E<edge processed portion 17F when the edge processed portion on the left side is set to the edge processed portion 17E.

Figure 24:
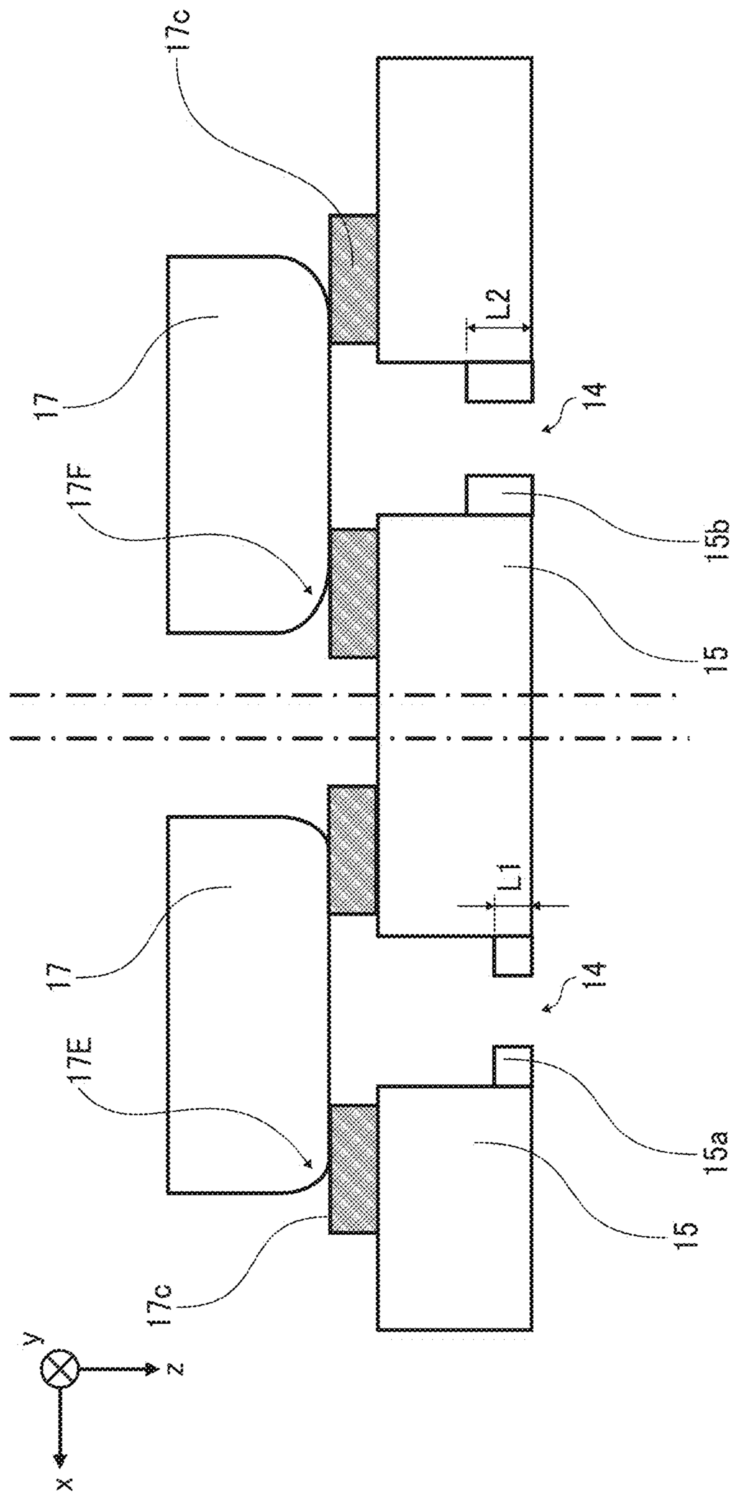
FIG. 24 is a diagram illustrating that an edge processing amount of an edge of a needle valve is different between needle valves in a configuration including a plurality of stepped nozzles having different lengths of step portions.

FIG. 24 is a diagram illustrating that the edge processing amount of the edge of the needle valve is different between the needle valves in the configuration including a plurality of stepped nozzles having different lengths in step portion. With reference to this drawing, it is described that the edge processing is performed on a plurality of needle valves, and the edge processing amount is made different according to a finished dimension of the step portion to suppress the variation in discharging performance between the needle valves.

FIG. 24 illustrates an example of a discharge apparatus including a plurality of needle valves in which the nozzle corresponding to each needle valve is provided with a step portion and there is a processing difference between the nozzles. The nozzle (nozzle on a left side in FIG. 24) in which the length of the step portion (outlet length) is L1 and the nozzle (nozzle on a right side in FIG. 24) in which the length of the step portion (outlet length) is L2 are provided. The step portion having the length L1 is a step portion 15*a*, and the step portion having the length L2 is a step portion 15*b*. A relationship therebetween is L1<L2.

Here, examples of a processing method include a method of cutting with a drill and joining divided nozzle plates with an adhesive, and at that time, a processing variation is supposed to be around several 100 μm. It is known that the discharging performance depends on the fluid resistance of the nozzle, and the fluid resistance depends on the inner diameter and the length of the nozzle. For example, when the edge processing is chamfering with a constant dimension, the length of the step portion is different in the configuration in FIG. 24, so that the fluid resistance is different between the nozzles, and as a result, the discharging performance is different between the nozzles.

In view of this, in the configuration illustrated in FIG. 24, the edge processing amount is adjusted for the edge of the needle valve according to the length of the step portion. For example, in order to stabilize the fluid resistance until discharge, when the length of the step portion is large due to the processing variation, the edge processing amount (edge processing width) is relatively increased. When the length of the step portion is small due to the processing variation, the edge processing amount is relatively decreased. For example, in FIG. 24, when the outer diameter of the needle valve and the inner diameter of the hole of the sealing member are finished as designed, the edge processing amount of the edge processed portion at that time is R=5 μm. The length of the step portion 15*a* on the left side in FIG. 24 is finished as designed. In contrast, the length of the step portion 15*b* on the right side in FIG. 24 becomes longer than the design value by 10 μm. At that time, the fluid resistance of the nozzle on the right side is larger than the design value. Therefore, in order to decrease the fluid resistance, the edge processing in the edge processed portion 17F on the right side is set to R>5 μm to stabilize the fluid resistance. That is, a relationship in edge processing amount is set as edge processed portion 17E<edge processed portion 17F when the edge processed portion on the left side is set to the edge processed portion 17E.

In the above-described configuration, a case of one step portion is described, but the present embodiment can also be applied to a configuration in which a plurality of step portions is provided in order to design requested discharging performance or by a characteristic shape by a processing method.

Figure 25:
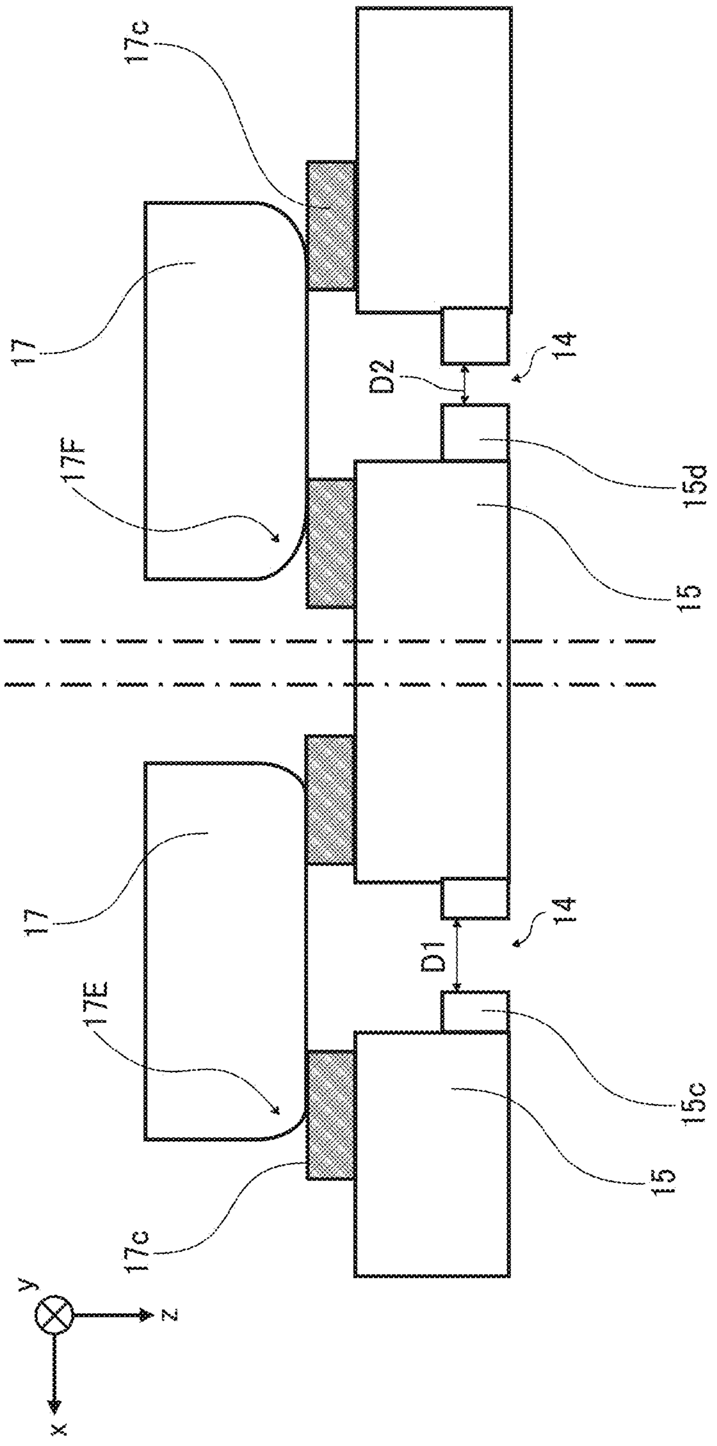
FIG. 25 is a diagram illustrating that an edge processing amount of an edge of a needle valve is different between needle valves in a configuration including a plurality of stepped nozzles having different inner diameters of step portions.

FIG. 25 is a diagram illustrating that the edge processing amount of the edge of the needle valve is different between the needle valves in a configuration including a plurality of stepped nozzles having different inner diameters in step portion. With reference to this drawing, it is described that the edge processing is performed on a plurality of needle valves, and the edge processing amount is made different according to a finished dimension of the step portion to suppress the variation in discharging performance between the needle valves.

FIG. 25 illustrates an example of a discharge apparatus including a plurality of needle valves in which the nozzle corresponding to each needle valve is provided with a step portion and there is a processing difference between the nozzles. The nozzle (nozzle on a left side in FIG. 25) in which the inner diameter of the step portion (outlet size) is D1 and the nozzle (nozzle on a right side in FIG. 25) in which the inner diameter of the step portion (outlet size) is D2 are provided. The step portion having the outlet size D1 is a step portion 15*c*, and the step portion having the outlet size D2 is a step portion 15*d*. A relationship therebetween is D1>D2.

Here, examples of a processing method include a method of cutting with a drill and joining divided nozzle plates with an adhesive, and at that time, a processing variation is supposed to be around several 100 μm. It is known that the discharging performance depends on the fluid resistance of the nozzle, and the fluid resistance depends on the inner diameter and the length of the nozzle. For example, when the edge processing is chamfering with a constant dimension, the inner diameter of the step portion is different in the configuration in FIG. 25, so that the fluid resistance is different between the nozzles, and as a result, the discharging performance is different between the nozzles.

In view of this, in the configuration illustrated in FIG. 25, the edge processing amount is adjusted for the edge of the needle valve according to the inner diameter of the step portion. For example, in order to stabilize the fluid resistance until discharge, when the inner diameter of the step portion is small due to the processing variation, the edge processing amount (edge processing width) is relatively increased. When the inner diameter of the step portion is large due to the processing variation, the edge processing amount is relatively decreased. For example, in FIG. 25, when the outer diameter of the needle valve and the inner diameter of the hole of the sealing member are finished as designed, the edge processing amount of the edge processed portion at that time is R=5 μm.

The inner diameter of the step portion 15*c* on the left side in FIG. 25 is finished as designed. In contrast, the inner diameter of the step portion 15*d* on the right side in FIG. 25 becomes smaller than the design value by 10 μm. At that time, the fluid resistance of the nozzle on the right side is larger than the design value. Therefore, in order to decrease the fluid resistance, the edge processing in the edge processed portion 17F on the right side is set to R>5 μm to stabilize the fluid resistance. That is, a relationship in edge processing amount is set as edge processed portion 17E<edge processed portion 17F when the edge processed portion on the left side is set to the edge processed portion 17E.

In the above-described configuration, a case of one step portion is described, but the present embodiment can also be applied to a configuration in which a plurality of step portions is provided in order to design requested discharging performance or by a characteristic shape by a processing method.

Figure 26:
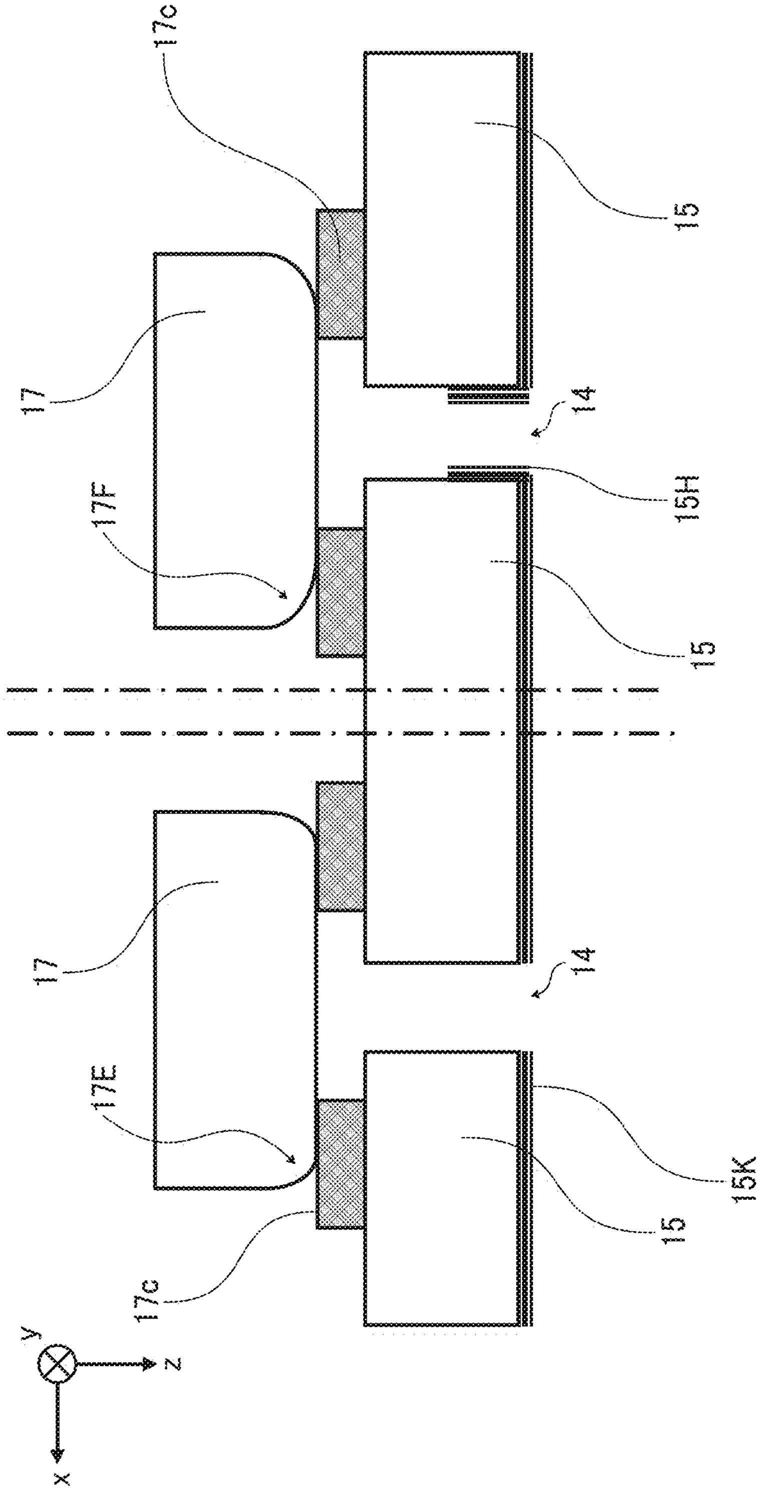
FIG. 26 is a diagram illustrating that an edge processing amount of an edge of a nozzle is different between nozzles in a configuration including a plurality of needle valves in which discharge amounts of a coating layer to the nozzles are different.

FIG. 26 is a diagram illustrating that the edge processing amount of the edge of the nozzle is different between the nozzles in a configuration including a plurality of needle valves in which a discharge amount of a coating layer to the nozzle is different. With reference to this drawing, it is described that the edge processing is performed on a plurality of nozzles, and the edge processing amount is made different according to a projection amount (discharge amount) of the coating layer to the nozzle to suppress the variation in discharging performance between the nozzles.

FIG. 26 illustrates an example of a discharge apparatus including a plurality of nozzles. FIG. 26 illustrates a state in which the coating layer applied to the surface on the discharge side of the nozzle plate projects to the inner wall of the hole of the nozzle on the right side of the drawing.

Here, the surface on the discharge side of the nozzle plate may be subjected to coating processing to form the coating layer. Examples of a function of the coating layer include functions of water repellency, oil repellency, stain resistance, and scratch resistance. Examples of an application method include vapor deposition, immersion, and coating. Examples of a material of the coating layer in the present embodiment include a PTFE-based water-repellent film and a TiN-based ceramic coating. The present embodiment is not limited to them. The coating layer projecting so as to cover the inner wall of the nozzle is removed by plasma treatment, but cannot be sufficiently removed depending on coating strength and the diameter of the nozzle, and some remains on the inner wall of the hole of the nozzle.

In the configuration according to FIG. 26, the nozzle (nozzle on the left side in FIG. 26) in which the coating layer is not discharged to the inner wall of the nozzle and the nozzle (nozzle on the right side in FIG. 26) in which the coating layer projects (is discharged) to the inner wall of the nozzle with a predetermined amount are provided. Here, for the sake of description, "the coating layer is not discharged to the inner wall of the nozzle" is a state in which the coating layer is not discharged to the inner wall of the nozzle, or the amount of the discharged coating layer is almost zero. The coating layer applied to the discharge surface of the nozzle plate 15 is referred to as a coating layer 15K. The coating layer discharged to the inner wall of the hole of the nozzle on the right side in FIG. 26 is defined as coating projection 15H. Here, "projecting" of the coating layer is also referred to as "discharged".

Here, it is known that the discharging performance depends on the fluid resistance of the nozzle, and the fluid resistance depends on the diameter of the nozzle. For example, when the edge processing is chamfering with a constant dimension, the projection amount of the coating layer to the nozzle is different, so that the fluid resistance is different between the nozzles, and as a result, the discharging performance is different between the nozzles.

In view of this, in the configuration illustrated in FIG. 26, the edge processing amount is adjusted for the edge of the needle valve corresponding to the nozzle according to the projection amount of the coating layer. For example, in order to stabilize the fluid resistance until discharge, when the projection amount is large, the edge processing amount (edge processing width) is relatively increased. When the projection amount is small, the edge processing amount is relatively decreased. For example, in FIG. 26, when the outer diameter of the needle valve, the inner diameter of the hole of the sealing member, and the nozzle are finished as designed, the edge processing amount of the edge processed portion at that time is R=5 μm. The coating does not project to the inner wall of the hole in the nozzle on the left side in FIG. 26, but the coating projection 15H projects to the inner wall of the hole by 5 μm in the nozzle on the right side in FIG. 26. At that time, the fluid resistance of the nozzle on the right side is larger than the design value. Therefore, in order to decrease the fluid resistance, the edge processing in the edge processed portion 17F on the right side is set to R>5 μm to stabilize the fluid resistance. That is, a relationship in edge processing amount is set as edge processed portion 17E<edge processed portion 17F when the edge processed portion on the left side is set to the edge processed portion 17E.

Figure 27:
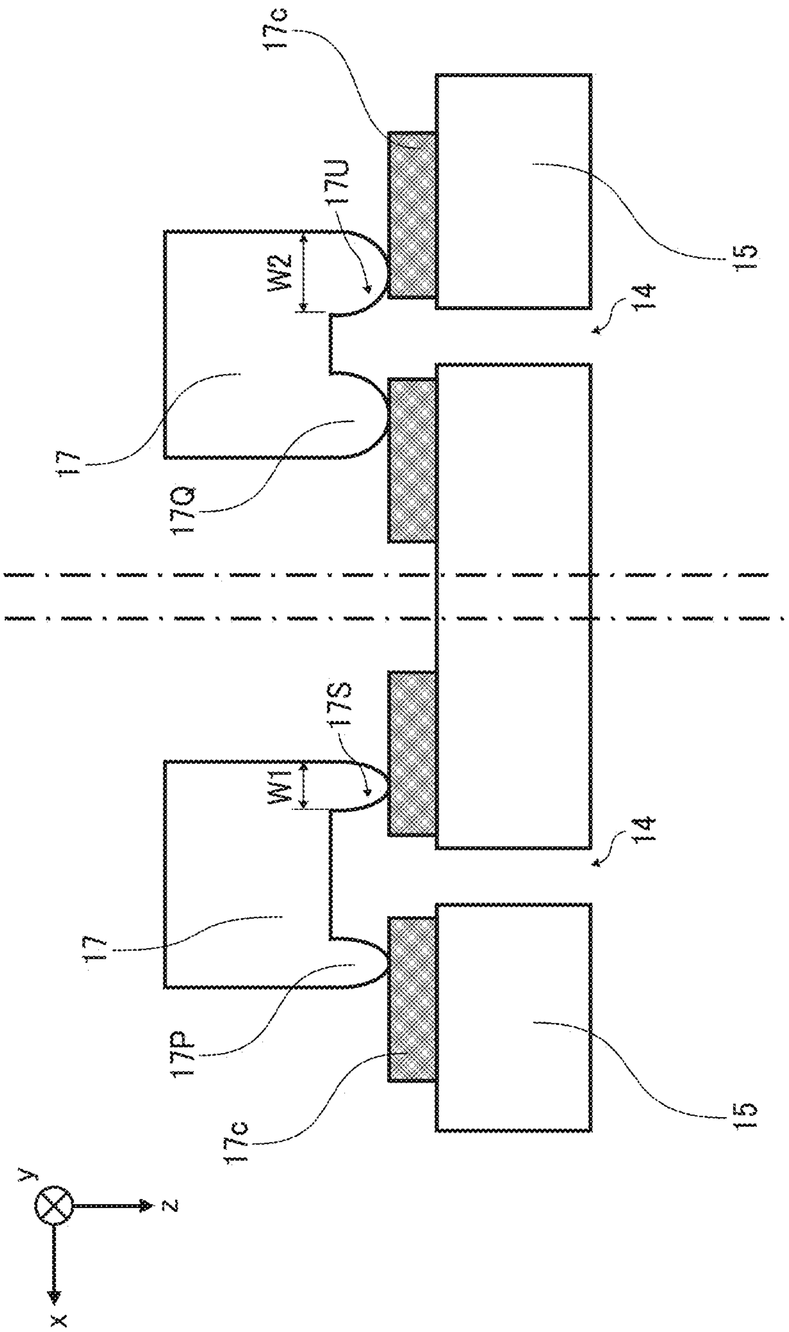
FIG. 27 is a diagram illustrating that an edge processing amount of a protrusion provided at an edge of the needle valve is different between the needle valves in a configuration including a plurality of needle valves.

FIG. 27 is a diagram illustrating that the edge processing amount of the protrusion provided at the edge of the needle valve is different between the needle valves in the configuration including a plurality of needle valves. With reference to this drawing, it is described that the edge processing is performed on a plurality of needle valves, and the edge processing amount is made different according to a finished dimension of the protrusion to suppress the variation in discharging performance between the needle valves. The edge processing width in the present embodiment can be defined as a radial width of the protrusion on a plane parallel to a protruding surface of the protrusion provided on the needle valve of the edge processed portion.

FIG. 27 is an example of a discharge apparatus including a plurality of needle valves, and each needle valve includes a protrusion. There is a processing difference in width of the protrusion of the needle valve between the needle valves. Therefore, the configuration in FIG. 27 includes the needle valve 17 (nozzle on the left side in FIG. 27) including a protrusion 17P and the needle valve 17 (nozzle on the right side in FIG. 27) including a protrusion 17Q. When a width of the protrusion 17P is set to W1 and a width of the protrusion 17Q is set to W2, a relationship therebetween is W1<W2.

Here, the protrusion of each needle valve having the inner diameter smaller than the inner diameter of the hole of the sealing member directly comes into contact with the sealing member to form the seal portion. In other words, the needle valve includes a recess (an example of a recess) of an inner diameter larger than the inner diameter of the nozzle hole on a surface in contact with the sealing member. The protrusion has a function of forming the seal portion of a certain contact area between the same and the sealing member when the nozzle is closed. Here, it is necessary to eliminate a difference in sealing function due to axial displacement between the needle valve and the nozzle.

However, the width of the protrusion often has the processing variation of several μm or more. As a processing method of the edge processing at that time, etching or milling can be considered. It is known that the discharging performance depends on the fluid resistance of the nozzle, and the fluid resistance depends on the area of the seal portion. For example, when the edge processing width (edge processing amount) is chamfering with a constant dimension, when the width of the protrusion is different between the nozzles, the fluid resistance is different between the nozzles, and as a result, the discharging performance is different between the nozzles.

In view of this, in the configuration illustrated in FIG. 27, the edge processing amount (edge processing width) of the protrusion is adjusted according to the width of the protrusion. For example, in order to stabilize the fluid resistance until discharge, when the outer diameter of the protrusion is large due to the processing variation, the edge processing amount (edge processing width) is relatively increased. When the width of the protrusion is small due to the processing variation, the edge processing amount is relatively decreased. For example, in FIG. 27, the width of the protrusion is finished as designed, and the edge processing amount in the edge processed portion of the protrusion at that time is R=5 μm. In FIG. 27, the outer diameter of the needle valve, the inner diameter of the hole of the sealing member, and the nozzle are finished as designed. The width of the protrusion 17P of the needle valve 17 on the left side in FIG. 27 is finished as designed. In contrast, the protrusion 17Q of the needle valve 17 on the right side of FIG. 27 becomes larger than the design value by 10 μm. At that time, the fluid resistance between the sealing member and the protrusion is larger than the design value. Therefore, in order to decrease the fluid resistance, the edge processing in the edge processed portion 17U of the protrusion 17Q on a right side is set to R>5 μm to stabilize the fluid resistance. That is, a relationship in edge processing amount is set as edge processed portion 17S<edge processed portion 17U when the edge processed portion of the protrusion 17P is set to the edge processed portion 17S.

The liquid discharge head (10) includes: a nozzle plate (15) having: a first nozzle (14) having a first diameter; and a second nozzle (14) having the first diameter, from each of which a liquid is dischargeable from a first face of the nozzle plate (15); a channel (16) communicating with each of the first nozzle (14) and the second nozzle (14), the channel (16) on a second face opposite to the first face of the nozzle plate (15); multiple sealing members (17*c*, 17*i*) having: a first sealing member (17*c*) on the second face of the nozzle plate (15) surrounding the first nozzle (14), the first sealing member (17*a*) having a first opening having a second diameter (R3) larger than the first diameter of the first nozzle; and a second sealing member (17*i*) on the second face of the nozzle plate (15) surrounding the second nozzle (14), the second sealing member (17*i*) having a second opening having a third diameter (R4) larger than the first diameter of the first nozzle and the second diameter of the first opening; and multiple needle valves (17) including: a first needle valve (17) movable between: a first position at which the first needle valve (17) contacts the first sealing member (17*c*) to close the first nozzle (14); and a second position at which the first needle valve (17) separated from the second sealing member (17*c*) to open the first nozzle (14); and a second needle valve (17) movable between: a first position at which the second needle valve (17) contacts the second sealing member (17*i*) to close the second nozzle (14); and a second position at which the second needle valve (17) separated from the second sealing member (17*i*) to open the second nozzle (14), wherein the first needle valve (17) has a first edge processed portion in which a first edge of the first needle valve (14) facing the second face is processed to have a first edge processing width (17E) in a radial direction of the first needle valve (17), and the second needle valve (17) has a second edge processed portion in which a second edge of the second needle valve (17) is processed to have a second edge processing width (17F) larger than the first edge processing width (17E) in a radial direction of the second needle valve (17).

Each of the first edge processed portion and the second edge processed portion has one of: a chamfered (C) edge; a fillet (R) edge; or a stepped edge.

Each of the multiple sealing members (17*a*) has a contact face contactable with the second face of the nozzle plate (15), and the contact face has a concentric circular shape.

The first needle valve (17) has a first annular protrusion (17S) having a first inner diameter larger than the first diameter of the first nozzle (14), and the second needle valve (17) has a second annular protrusion (17Q) having a second inner diameter smaller than the first inner diameter of the first annular protrusion (17S) and larger than the first diameter of the first nozzle (14), and the first annular protrusion (17S) has a first edge processed portion in which a first edge of the first annular protrusion (17S) facing the second face is processed to have a first edge processing width (W1) in a radial direction of the first annular protrusion (17S), and the second annular protrusion (17Q) has a second edge processed portion in which a second edge of the second annular protrusion (17Q) facing the second face is processed to have a second edge processing width (W2) larger than the first edge processing width (W1) in a radial direction of the second annular protrusion (17S).

The multiple sealing members (17*c*) are an elastic body compressible and deformable by the multiple cylindrical protrusions (15P, 15Q) respectively contacting the multiple sealing members.

The first nozzle (14) includes a first small-diameter portion (15*c*) on the first face of the nozzle plate (15), the first small-diameter portion (15*c*) having a first inner diameter (D1) smaller than the first diameter of the first nozzle (14) on the second face; and the second nozzle (14) includes a second small-diameter portion (15*d*) on the first face of the nozzle plate (15), the second small-diameter portion (15*d*) having a second inner diameter (D2) smaller than the first inner diameter of the first small-diameter portion (15*c*) and the second diameter of the second nozzle (14) on the second face.

[Liquid Discharge Apparatus]

Hereinafter, a liquid discharge apparatus to which the above-described liquid discharge head or liquid discharge unit is applied is described. The configuration according to the above-described embodiment can be applied to a configuration described below. X, Y, and X directions illustrated in the drawings of the present and subsequent embodiments are different from definitions of the directions so far. A head 100 described below is obtained by applying the configuration of the liquid discharge head 10 described above. Here, the head 100 is described. Some of the reference signs of other terms are also given anew for convenience of description.

[Application Example to Vehicle Body Coating System]

Figure 28:
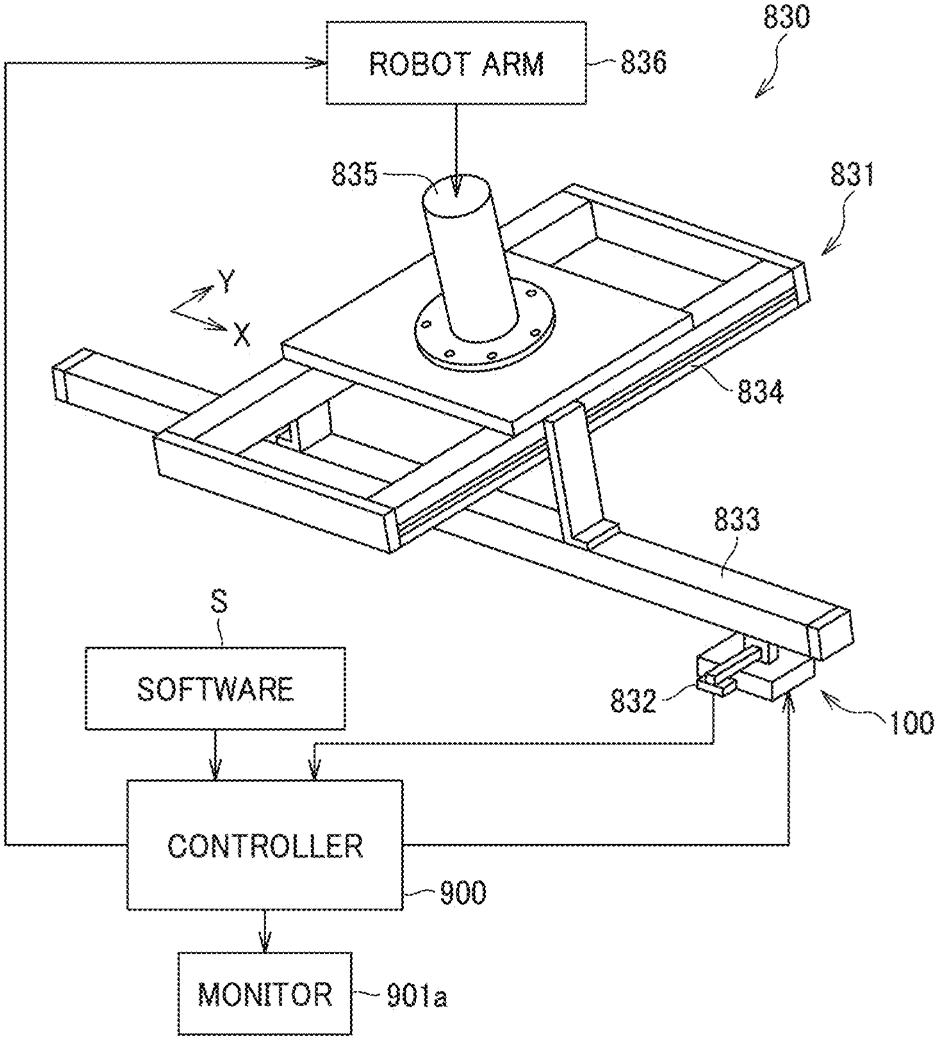
FIG. 28 is an illustrative view illustrating an example of a vehicle body coating system.
Figure 29A:
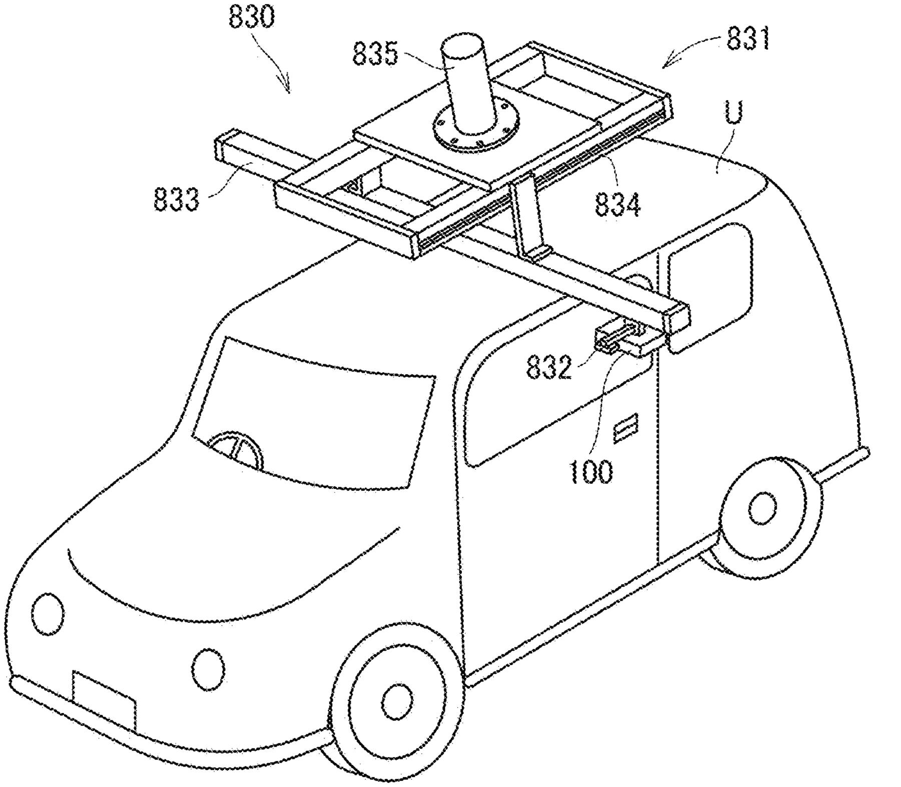
FIGS. 29A and 29B are illustrative views illustrating a usage example of the vehicle body coating system.
Figure 29B:
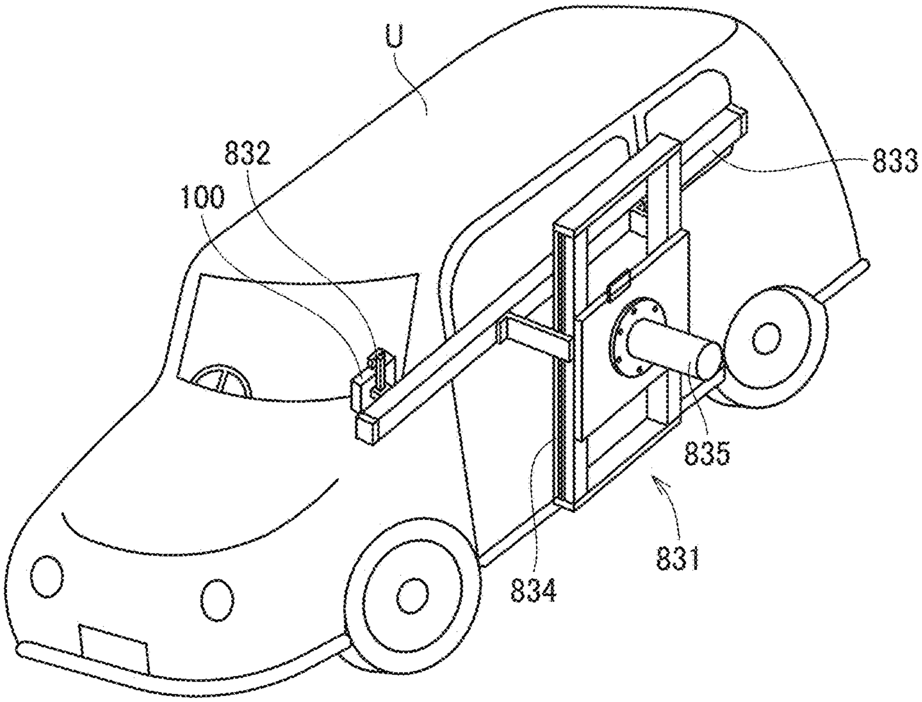

As an example of the liquid discharge apparatus, an application example to a vehicle body coating system is described with reference to FIGS. 28 to 29B. FIG. 28 is an illustrative view illustrating an example of the vehicle body coating system. FIGS. 29A and 29B are illustrative views illustrating a usage example of the vehicle body coating system, in which FIG. 29A is a view illustrating a first example of arrangement of the vehicle body coating system on an object to be coated, and FIG. 29B is a view illustrating a second example of arrangement of the vehicle body coating system on the object to be coated.

A vehicle body coating system 830 includes at least one head 100, a camera 832 arranged in the vicinity of the head 100, an X-Y table 831 that moves the head 100 and the camera 832 in the X direction and the Y direction, image editing software S that edits an image imaged by the camera 832, a monitor 901*a* that displays an image to be edited and the like, a controller 900 and the like.

The controller 900 operates the X-Y table 831 and allows the head 100 to discharge liquid (for example, paint) based on a predetermined control program.

The vehicle body coating system 830 can apply the paint discharged from the head 100 to an object to be coated U.

The head 100 discharges the paint from a nozzle hole 102 toward a surface to be coated of the object to be coated U.

The paint discharged from the nozzle hole 102 is discharged in a direction substantially orthogonal to an X-Y plane.

A distance between the nozzle hole 102 and the surface to be coated of the object to be coated U is, for example, about 20 cm.

The X-Y table 831 includes an X-axis 833 formed with a linear moving mechanism, and a Y-axis 834 that moves the X-axis 833 in the Y direction while holding the X-axis 833 with two arms. A shaft 835 is provided on the Y-axis 834. By holding the shaft 835 with a robot arm 836, the head 100 and the camera 832 can be freely arranged with respect to the object to be coated U.

For example, when the object to be coated U is an automobile, it is possible to arrange above the object to be coated U as illustrated in FIG. 29A, or beside the object to be coated U as illustrated in FIG. 29B. The controller 900 controls the operation of the robot arm 836 based on a predetermined program.

The camera 832 images a predetermined range on the surface to be coated of the object to be coated U at a constant minute interval while moving in the X-Y direction together with the head 100. The camera 832 is, for example, a digital camera. In the camera 832, specifications of a lens that can image a plurality of subdivided images obtained by dividing a predetermined range of the surface to be coated, and specifications such as resolution are appropriately selected. The imaging of the plurality of subdivided images of the surface to be coated by the camera 832 is continuously and automatically performed according to a program provided in advance in the controller 900.

As described above, since the vehicle body coating system 830 includes the head 100, even when the distance between the object to be coated U and the nozzle hole 102 is long, this may apply the paint to a desired position of the object to be coated U with high accuracy. Since the head 100 can stably discharge the paint, the vehicle body coating system 830 can apply the paint to the object to be coated U with high accuracy.

[Application Example to Printing Apparatus]

Figure 30:
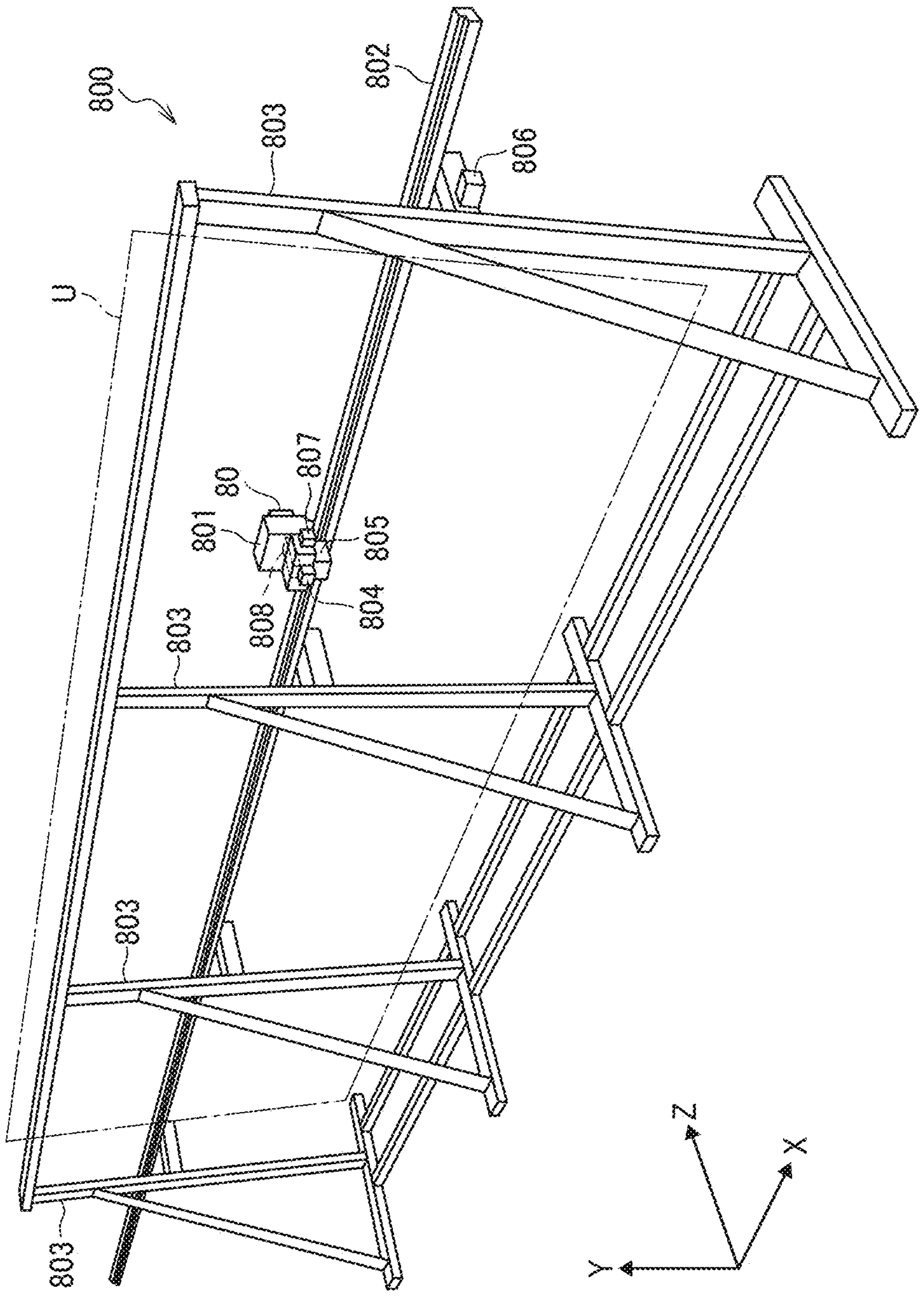
FIG. 30 is a perspective view of a carriage of a printing apparatus.
Figure 31:
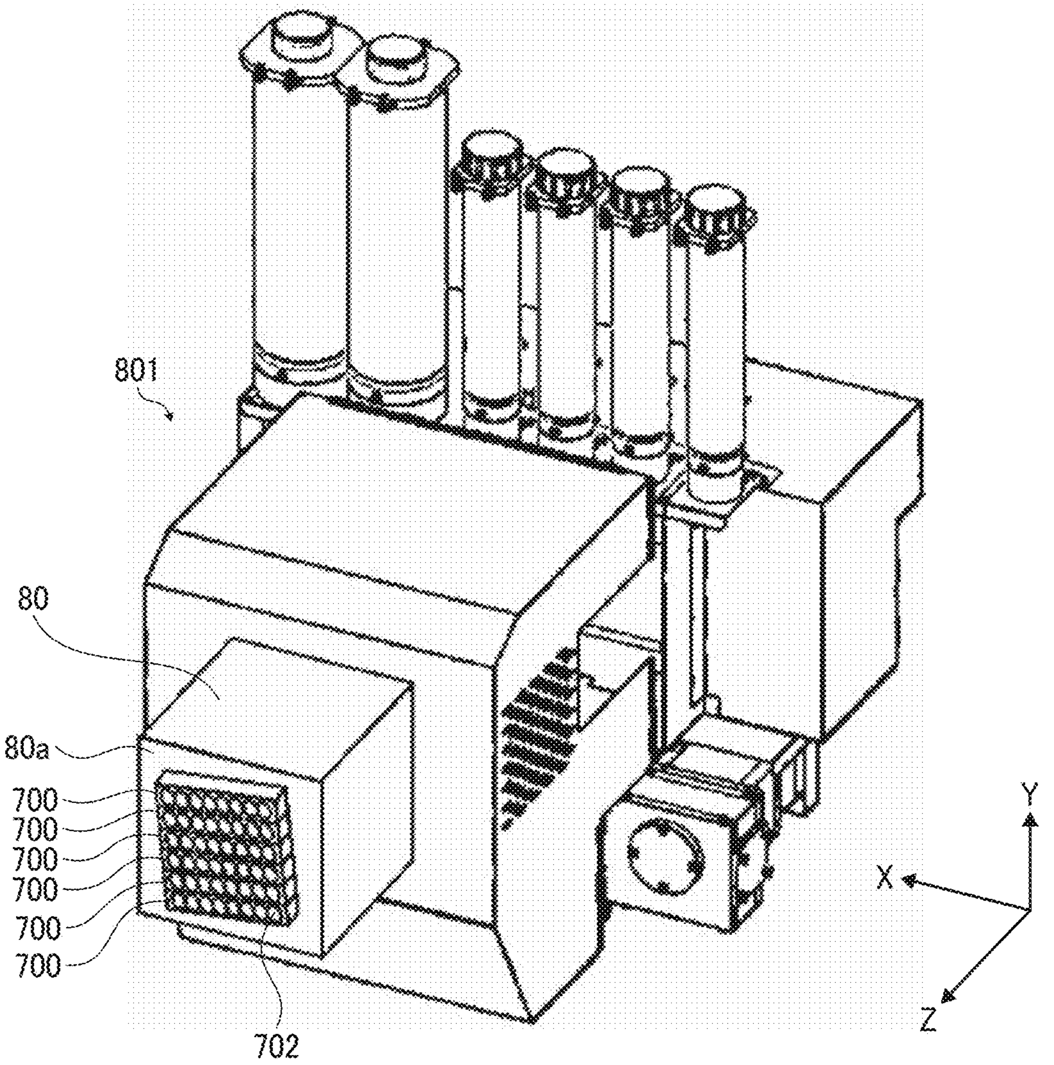
FIG. 31 is an entire perspective view illustrating an example of the printing apparatus.

As an example of the liquid discharge apparatus, an application example to a printing apparatus is described with reference to FIGS. 30 and 31. FIG. 30 is a perspective view of a carriage of the printing apparatus, and FIG. 31 is an entire perspective view illustrating an example of the printing apparatus on which the carriage in FIG. 30 is mounted. FIG. 30 is a view of a carriage 801 mounted on a printing apparatus 800 illustrated in FIG. 31 as viewed from the object to be coated U side.

The carriage 801 includes a head holder 80. The carriage 801 is movable in the Z direction (positive side and negative side) along a Z-axis rail 804 by power from a first Z direction driver 807 of the printing apparatus 800 described later.

The head holder 80 is movable in the Z direction (positive side and negative side) with respect to the carriage 801 by power from a second Z direction driver 808 of the printing apparatus 800 described later. The head holder 80 includes a head securing plate 80*a* to which a head module 700 is attached. Here, the carriage 801 is an example of a holder. In this example, the liquid discharge head including a plurality of nozzle holes is referred to as a head module for convenience.

In the present application example, a configuration in which six liquid discharge heads (head modules) including a plurality of nozzle holes are attached to the head securing plate 80*a* is exemplified, and six head modules 700 are arranged side by side in a stacked manner.

The head module 700 includes a plurality of nozzle holes 702. The type and number of colors of the paint used in the head module 700 may be different for each head module 700, or may be the same. For example, when the printing apparatus 800 is an apparatus using a single color, the paint used in each head module 700 may be the same color. The number of head modules is not limited to six. The number may be larger than six or smaller than six. By arranging in a staggered manner, for example, the number of nozzles for six head modules may be implemented by five or less head modules.

As illustrated in the drawing, the head module 700 is secured to the head securing plate 80*a* in a state in which a nozzle row (row formed by eight nozzle holes 702) intersects a horizontal plane (X-Z plane) and an arrangement direction of the plurality of nozzle holes 702 is inclined with respect to the X-axis. In this state, the nozzle holes 702 discharge droplets in a direction (positive side in the Z direction) intersecting the direction of gravity.

The printing apparatus 800 illustrated in FIG. 31 is installed to face the object to be coated U. The printing apparatus 800 includes an X-axis rail 802, a Y-axis rail 803, and a Z-axis rail 804. The Y-axis rail 803 intersects the X-axis rail 802, and the Z-axis rail 804 intersects the X-axis rail 802 and the Y-axis rail 803.

The Y-axis rail 803 holds the X-axis rail 802 in such a manner that the X-axis rail 802 is movable in the Y direction (positive side and negative side). The X-axis rail 802 holds the Z-axis rail 804 in such a manner that the Z-axis rail 804 is movable in the X direction (positive side and negative side). The Z-axis rail 804 holds the carriage 801 in such a manner that the carriage 801 is movable in the Z direction (positive side and negative side).

The printing apparatus 800 includes a first Z direction driver 807 that moves the carriage 801 in the Z direction along the Z-axis rail 804, and an X direction driver 805 that moves the Z-axis rail 804 in the X direction along the X-axis rail 802. The printing apparatus 800 includes a Y direction driver 806 that moves the X-axis rail 802 in the Y direction along the Y-axis rail 803. The printing apparatus 800 further includes a second Z direction driver 808 that moves the head holder 80 in the Z direction with respect to the carriage 801.

The printing apparatus 800 discharges the paint from the head module 700 provided on the head holder 80 while moving the carriage 801 in the X direction, the Y direction, and the Z direction to perform printing on the object to be coated U. The movement of the carriage 801 and the head holder 80 in the Z direction does not necessarily movement parallel to the Z direction, and may be oblique movement as long as the movement includes at least a component in the Z direction.

A surface shape of the object to be coated U is illustrated as a plane, but this may be a surface close to vertical such as a vehicle body of a vehicle or a truck, a body of an aircraft and the like, a surface having a large curvature radius, or a surface having some irregularities.

[Electrode Manufacturing Apparatus]

Figure 32:
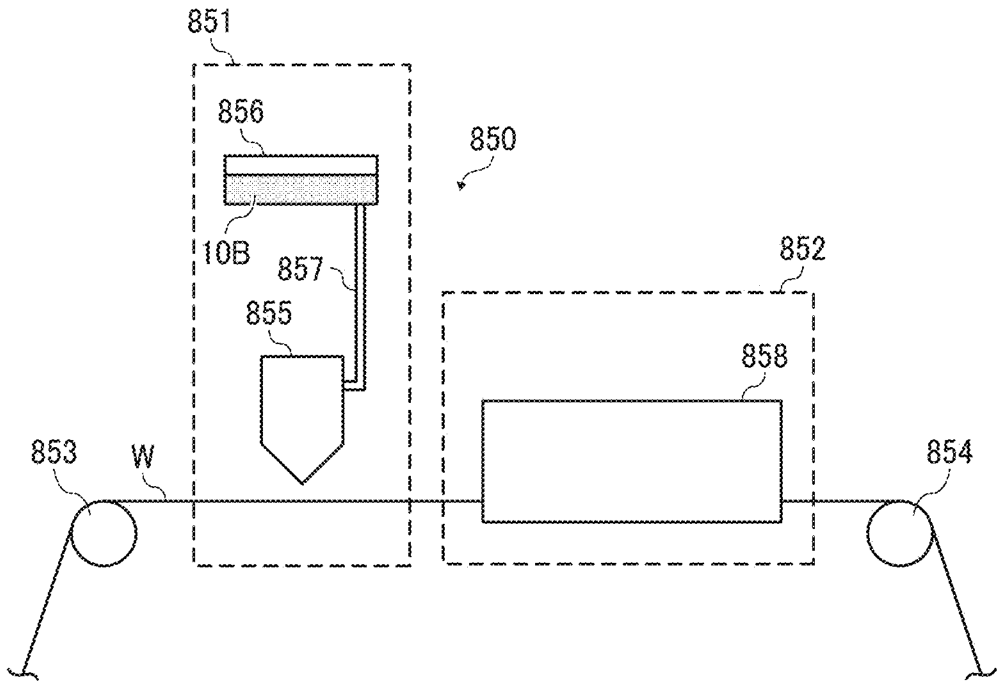
FIG. 32 is a schematic view illustrating an example of an electrode manufacturing apparatus for implementing a method for manufacturing an electrode according to the embodiment.

The liquid discharge apparatus according to the present embodiment includes a manufacturing apparatus for an electrode and an electrochemical element. The electrode manufacturing apparatus is described below. FIG. 32 is a schematic view of an example of the electrode manufacturing apparatus according to the present embodiment. An electrode manufacturing device (electrode manufacturing apparatus) 850 is an apparatus that discharges a liquid composition using the liquid discharge apparatus described above to manufacture an electrode including a layer including an electrode material.

[Forming Unit of Layer Including Electrode Material, and Forming Process of Layer Including Electrode Material]

A discharge unit in the present embodiment is the liquid discharge apparatus described above. By the discharge, the liquid composition can be applied onto a target to form a liquid composition layer. The target (hereinafter, sometimes referred to as a "discharge target") is not limited in particular as long as a layer including an electrode material is formed therefor, and can be appropriately selected according to an object. There are, for example, an electrode substrate (current collector), an active material layer, and a layer containing a solid electrode material. If the discharge unit and discharge process can form the layer including the electrode material on the discharge target, a configuration may directly discharge the liquid composition to form the layer including the electrode material, and a configuration may indirectly discharge the liquid composition to form the layer including the electrode material.

[Other Configurations and Other Processes]

Other configurations in a manufacturing apparatus for an electrode mixture layer are not particularly limited as long as the effects of the present embodiment are not impaired, and can be appropriately selected according to the purpose, and examples thereof include a heater, for example. Other processes in a method for manufacturing an electrode mixture layer are not particularly limited as long as the effects of the present embodiment are not impaired, and can be appropriately selected according to the purpose, and examples thereof include a heating process, for example.

[Heaters and Heating Processes]

The heater heats the liquid composition discharged by the discharge unit. The heating process is a process of heating the liquid composition discharged in the discharge process. The liquid composition layer can be dried by the heating.

[Configuration of Forming Layer Including Electrode Material by Directly Discharging Liquid Composition]

As an example of the electrode manufacturing apparatus, an electrode manufacturing apparatus for forming an electrode mixture layer containing an active material on an electrode substrate (current collector) is described below. The electrode manufacturing apparatus 850 includes a discharge process unit 851 and a heating process unit 852. The discharge process unit 851 performs a process of applying a liquid composition onto a printing base material W including a discharge target to form a liquid composition layer. The heating process unit 852 performs a heating process of heating the liquid composition layer to obtain an electrode mixture layer. The electrode manufacturing apparatus includes convey units 853 and 854 that convey the printing base material W, and the convey units 853 and 854 convey the printing base material W at a preset speed in order of the discharge process unit 851 and the heating process unit 852. A method for manufacturing the printing base material W including the discharge target such as the active material layer is not particularly limited, and a known method can be appropriately selected. The discharge process unit 851 includes a printing apparatus 855 of the present embodiment that implements an applying process of applying the liquid composition onto the printing base material W, a storage container 856 that stores the liquid composition, and a supply tube 857 that supplies the liquid composition stored in the storage container 856 to the printing apparatus 855.

The storage container 856 stores the liquid composition 108, and the discharge process unit 851 discharges the liquid composition 108 from the printing apparatus 855 and applies the liquid composition 108 onto the printing base material W to form the liquid composition layer in a thin film shape. The storage container 856 may be integrated with the manufacturing apparatus for the electrode mixture layer, or may be detachable from the manufacturing apparatus for the electrode mixture layer. The container may be used for adding to the storage container integrated with the manufacturing apparatus for the electrode mixture layer or detachable from the manufacturing apparatus for the electrode mixture layer.

The storage container 856 and the supply tube 857 can be optionally selected as long as the liquid composition 108 can be stably stored and supplied.

As illustrated in FIG. 32, the heating process unit 852 includes a heating device 858, and includes a solvent removing process of heating and drying solvent remaining in the liquid composition layer by the heating device 858 to remove.

Thus, an electrode mixture layer can be formed. The heating process unit 852 may perform the solvent removing process under reduced pressure.

The heating device 858 is not particularly limited, and can be appropriately selected according to a purpose; examples thereof include substrate heating, an IR heater, and a warm air heater, and they may be combined. The heating temperature and time can be appropriately selected according to a boiling point of the solvent contained in the liquid composition 108 and a thickness to be formed.

Figure 33:
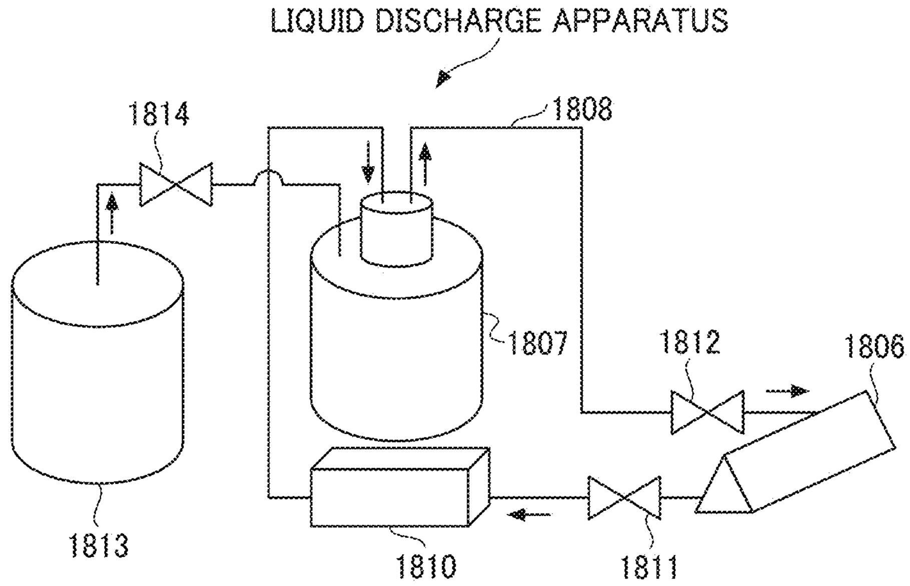
FIG. 33 is a schematic view illustrating another example of an electrode manufacturing apparatus for implementing a method for manufacturing an electrode mixture layer according to the embodiment.

FIG. 33 is a schematic view illustrating another example of the electrode manufacturing apparatus (liquid discharge apparatus) according to the present embodiment. The liquid discharge apparatus controls a pump 1810 and control valves 1811 and 1812, so that the liquid composition can circulate through a discharge head 1, a tank 1807, and a tube 1808. The liquid discharge apparatus is provided with an external tank 1813, and when the liquid composition in the tank 1807 decreases, the liquid composition can be supplied from the external tank 1813 to the tank 1807 by controlling the pump 1810 and the control valves 1811, 1812, and 1814. When the electrode manufacturing apparatus according to the present embodiment is used, the liquid composition can be discharged to a target place of the discharge target. The electrode mixture layer can be suitably used as, for example, a part of the configuration of an electrochemical element. The configuration other than the electrode mixture layer in the electrochemical element is not particularly limited, and a known configuration can be appropriately selected; examples thereof include a positive electrode, a negative electrode, and a separator.

[Supplement]

In the present embodiment, the "liquid discharge apparatus" is an apparatus that includes a liquid discharge head and drives the liquid discharge head to discharge liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may include devices to feed, convey, and eject the material on which liquid can adhere. The liquid discharge apparatus may further include a pretreatment apparatus and a post-treatment apparatus. The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The term "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "material onto which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

The material of the "material on which liquid can adhere" may be any material as long as liquid can adhere even temporarily, such as paper, thread, fiber, cloth, leather, metal, plastic, glass, wood, ceramics, a current collector such as aluminum foil or copper foil, or an electrode in which an active material layer is formed on the current collector.

The term "liquid" includes any liquid having a viscosity or a surface tension that is dischargeable from the head and is not limited in particular. However, preferably, the viscosity of the liquid is not greater than 30 mPa's under ordinary temperature and ordinary pressure or by heating or cooling. More specifically, examples thereof include solutions, suspensions, and emulsions containing solvents such as water and organic solvents, colorants such as dyes and pigments, function-imparting materials such as polymerizable compounds, resins, and surfactants, biocompatible materials such as DNA, amino acids, proteins, and calcium, edible materials such as natural pigments, active materials and solid electrolytes used as electrode materials, inks containing conductive materials and insulating materials, and the like. Such a solution, a suspension, or an emulsion can be used for, for example, a paint for coating, inkjet ink, surface treatment solution, a liquid for forming components of electronic element or light-emitting element or a resist pattern of electronic circuit, a material solution for three-dimensional fabrication, an electrode, and an electrochemical element.

The "liquid discharge apparatus" may be an apparatus to relatively move the liquid discharge head and a material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The "liquid discharge apparatus" is not limited to a stationary apparatus. The liquid discharge apparatus may be, for example, a robot equipped with a liquid discharge head, the robot movable by remote control or autonomous travel, and can also be applied to outer wall coating of a building, painting of a road marking (crosswalk, stop line, speed display and the like) and the like by a movable robot. A building and a road in this case are also included in the "objects onto which liquid can adhere".

The above description is an example, and the present embodiment has unique effects for each of the following aspects.

Aspect 1

According to an Aspect 1, a nozzle plate (for example, nozzle plate 15) including a plurality of nozzle holes (for example, nozzles 14) configured to discharge liquid (for example, ink); a channel (for example, channel 16) configured to supply the liquid to the plurality of nozzle holes, the channel provided on an opposite surface, the surface on an opposite side of a discharge surface of the nozzle plate; a plurality of protrusions (for example, protrusions 15P, 15Q) each provided corresponding to each of the plurality of nozzle holes, the protrusion including a protruding surface formed around the nozzle hole continuously from an inner wall of the nozzle hole so as to protrude toward the channel; a plurality of sealing members (for example, sealing members 17*a*, 17*c*, 17*g*, 17*h*, 17*i*, 17M) each provided corresponding to each of the plurality of nozzle holes, the sealing member having an outer diameter larger than an outer diameter on the opposite surface of the protrusion, the sealing member configured to come into contact with the protruding surface to close the nozzle hole; and a plurality of needle valves (for example, needle valves 17, 17L) each provided on the channel side of each of the plurality of nozzle holes, the needle valve configured to hold the sealing member at one end on the nozzle plate side so as to move the sealing member between a position in contact with the protruding surface and a position separated from the protruding surface are included, an edge of the protrusion including an edge processed portion (for example, edge processed portion 15S, 15U) subjected to edge processing, the plurality of protrusions including a first protrusion (for example, protrusion 15Q) having a first outer diameter and a second protrusion (for example, protrusion 15P) having a second outer diameter smaller than the first outer diameter, and when a radial width of the protrusion on a plane parallel to the protruding surface of the edge processed portion is set as an edge processing width, the edge processing width of the first protrusion being larger than the edge processing width of the second protrusion.

Aspect 2

According to an Aspect 2, in the Aspect 1, the edge processed portion includes an outer diameter side edge processed portion in which an edge on an outer diameter side of the protrusion is subjected to edge processing, and when a radial width of the protrusion on a plane parallel to the protruding surface of the outer diameter side edge processed portion is set as an outer diameter side edge processing width, the outer diameter side edge processing width of the first protrusion is larger than the outer diameter side edge processing width of the second protrusion.

Aspect 3

According to an Aspect 3, in the Aspect 2, the outer diameter side edge processed portion has an R shape, a C surface shape, or a stepped shape.

Aspect 4

According to an Aspect 4, in the Aspect 2, the edge processed portion includes an inner diameter side edge processed portion in which an edge on an inner diameter side of the protrusion is subjected to edge processing, and when a radial width of the protrusion on a plane parallel to the protruding surface of the inner diameter side edge processed portion is set as an inner diameter side edge processing width, the inner diameter side edge processing width of the first protrusion is larger than the inner diameter side edge processing width of the second protrusion.

Aspect 5

According to an Aspect 5, in the Aspect 4, the inner diameter side edge processed portion has an R shape, a C surface shape, or a stepped shape.

Aspect 6

According to an Aspect 6, in any one of the Aspects 1 to 5, a contact surface (for example, seal portion 17*j*) on which the protruding surface and the sealing member come into contact with each other has a double circular shape.

Aspect 7

According to an Aspect 7, a nozzle plate including a plurality of nozzle holes configured to discharge liquid; a channel configured to supply the liquid to the plurality of nozzle holes; a plurality of sealing members each provided corresponding to each of the plurality of nozzle holes, the sealing member having an outer diameter larger than an outer diameter of the nozzle hole on an opposite surface, the surface on an opposite side of a discharge surface of the nozzle plate, the sealing member configured to come into contact with a peripheral portion of the nozzle hole on the opposite surface to close the nozzle hole; and a plurality of needle valves each provided on the channel side of each of the plurality of nozzle holes, the needle valve configured to hold the sealing member at one end on the nozzle plate side so as to move the sealing member between a position in contact with the nozzle plate and a position separated from the nozzle plate are included, an edge on the opposite surface side of the nozzle hole including an edge processed portion (for example, edge processed portion 15E, 15F) formed by performing edge processing, the plurality of sealing members including a first sealing member (for example, sealing member 17M) having a first outer diameter and a second sealing member (for example, sealing member 17*a*) having a second outer diameter smaller than the first outer diameter, and when a width of the edge processed portion in a radial direction of the nozzle on a plane parallel to the opposite surface of the edge processed portion is set as an edge processing width, the edge processing width of the nozzle hole corresponding to the first sealing member being larger than the edge processing width of the nozzle hole corresponding to the second sealing member.

Aspect 8

According to an Aspect 8, in the Aspect 7, the edge processed portion has an R shape, a C surface shape, or a stepped shape.

Aspect 9

According to an Aspect 9, in the Aspect 7 or 8, a contact surface (seal portion 17*a*) on which the opposite surface of the nozzle plate and the sealing member come into contact with each other has a double circular shape.

Aspect 10

According to an Aspect 10, a nozzle plate including a plurality of nozzle holes configured to discharge liquid; a channel configured to supply the liquid to the plurality of nozzle holes; a plurality of sealing members (for example, sealing members 17*c*, 17*i*) provided on a surface on the channel side of the nozzle plate each including an opening corresponding to each of the plurality of nozzle holes and having an inner diameter larger than an inner diameter of the nozzle hole; and a plurality of needle valves each provided on the channel side of each of the plurality of nozzle holes, movable between a position at which the needle valve comes into contact with the sealing member to close the nozzle hole and a position at which the needle valve is separated from the sealing member to allow the nozzle hole to communicate with the channel, and having an outer diameter larger than a diameter of the opening are included, the needle valve including an edge processed portion (edge processed portion 17E, 17F) formed by performing edge processing on an outer edge of a surface in contact with the sealing member, the opening of the plurality of sealing members including a first opening having a first inner diameter (for example, R3) and a second opening having a second inner diameter (for example, R4) smaller than the first inner diameter, and when a width of the edge processed portion in a radial direction of the needle valve on a plane parallel to a surface in contact with the sealing member of the edge processed portion is set as an edge processing width, the edge processing width of the needle valve corresponding to the first opening being smaller than the edge processing width of the nozzle hole corresponding to the second opening.

Aspect 11

According to an Aspect 11, in the Aspect 10, the edge processed portion has an R shape, a C surface shape, or a stepped shape.

Aspect 12

According to an Aspect 12, in the Aspect 10 or 11, a contact surface on which the opposite surface of the nozzle plate and the sealing member come into contact with each other has a double circular shape.

Aspect 13

According to an Aspect 13, in any one of the Aspects 10 to 12, the needle valve includes a recess (for example, protrusion 17P, 17Q) having an inner diameter larger than an inner diameter of the nozzle hole on a surface in contact with the sealing member, and an edge on a side of the surface in contact with the sealing member of the recess includes a recess edge processed portion subjected to edge processing.

Aspect 14

According to an Aspect 14, a nozzle plate including a plurality of nozzle holes configured to discharge liquid; a channel configured to supply the liquid to the plurality of nozzle holes; a plurality of sealing members each provided corresponding to each of the plurality of nozzle holes, the sealing member having an outer diameter larger than an outer diameter of the nozzle hole on an opposite surface, the surface on an opposite side of a discharge surface of the nozzle plate, the sealing member configured to come into contact with a peripheral portion of the nozzle hole on the opposite surface to close the nozzle hole; and a plurality of needle valves each provided on the channel side of each of the plurality of nozzle holes, the needle valve configured to hold the sealing member at one end on the nozzle plate side so as to move the sealing member between a position in contact with the nozzle plate and a position separated from the nozzle plate are included, the nozzle hole including an edge processed portion formed by performing edge processing on an edge on the opposite surface side, and a nozzle small-diameter portion with an inner diameter smaller than an inner diameter on the opposite surface side on the discharge surface side, the plurality of nozzle holes including a first nozzle hole including a first small-diameter length (for example, step portion 15*b*) in which a length of the small-diameter portion in a liquid discharge direction is a predetermined length, and a second nozzle hole including a second small-diameter length (for example, step portion 15*a*) in which a length of the small-diameter portion in a liquid discharge direction is a predetermined length shorter than the first small-diameter length, and when a width of the edge processed portion in a radial direction of the nozzle on a plane parallel to the opposite surface of the edge processed portion is set as an edge processing width, the edge processing width of the first nozzle hole being larger than the edge processing width of the second nozzle hole.

Aspect 15

According to an Aspect 15, a nozzle plate including a plurality of nozzle holes configured to discharge liquid; a channel configured to supply the liquid to the plurality of nozzle holes; a plurality of sealing members each provided corresponding to each of the plurality of nozzle holes, the sealing member having an outer diameter larger than an outer diameter of the nozzle hole on an opposite surface, the surface on an opposite side of a discharge surface of the nozzle plate, the sealing member configured to come into contact with a peripheral portion of the nozzle hole on the opposite surface to close the nozzle hole; and a plurality of needle valves each provided on the channel side of each of the plurality of nozzle holes, the needle valve configured to hold the sealing member at one end on the nozzle plate side so as to move the sealing member between a position in contact with the nozzle plate and a position separated from the nozzle plate are included, the nozzle hole including an edge processed portion formed by performing edge processing on an edge on the opposite surface side, and a nozzle small-diameter portion with an inner diameter smaller than an inner diameter on the opposite surface side on the discharge surface side, the plurality of nozzle holes including a first nozzle hole having a first inner diameter (for example, step portion 15*d*) in which an inner diameter of the small-diameter portion is a predetermined size, and a second nozzle hole including a second inner diameter (for example, step portion 15*c*) in which an inner diameter of the small-diameter portion is a predetermined size larger than the first inner diameter, and when a width of the edge processed portion in a radial direction of the nozzle on a plane parallel to the opposite surface of the edge processed portion is set as an edge processing width, the edge processing width of the first nozzle hole being larger than the edge processing width of the second nozzle hole.

Aspect 16

According to an Aspect 16, a nozzle plate including a plurality of nozzle holes configured to discharge liquid; a channel configured to supply the liquid to the plurality of nozzle holes; a plurality of sealing members each provided corresponding to each of the plurality of nozzle holes, the sealing member having an outer diameter larger than an outer diameter of the nozzle hole on an opposite surface, the surface on an opposite side of a discharge surface of the nozzle plate, the sealing member configured to come into contact with a peripheral portion of the nozzle hole on the opposite surface to close the nozzle hole; and a plurality of needle valves each provided on the channel side of each of the plurality of nozzle holes, the needle valve configured to hold the sealing member at one end on the nozzle plate side so as to move the sealing member between a position in contact with the nozzle plate and a position separated from the nozzle plate; and a coating layer (for example, coating layer 15K) formed by performing coating processing on the discharge surface are included, the nozzle hole including an edge processed portion formed by performing edge processing on an edge on the opposite surface side, and a coating in which the coating layer is formed on a part of an inner wall in contact with an edge on the discharge side, the plurality of nozzle holes including a first nozzle hole including a first coating discharge portion in which the coating layer of the coating is discharged on the opposite surface side and the discharged coating layer has a predetermined width, and a second nozzle hole including a second coating (for example, coating layer protrusion 15H) in which the coating layer of the coating is discharged on the opposite surface side and the discharged coating layer has a predetermined width larger than the width of the first coating discharge portion, and when a width of the edge processed portion in a radial direction of the nozzle on a plane parallel to the opposite surface of the edge processed portion is set as an edge processing width, the edge processing width of the first nozzle hole being larger than the edge processing width of the second nozzle hole.

Aspect 17

According to an Aspect 17, in the Aspect 16, the coating processing includes at least one of water repellency, oil repellency, stain resistance, and scratch resistance.

Aspect 18

According to an Aspect 18, in any one of the Aspects 1 to 17, the nozzle plate and the needle valve are made of metal or alloy.

Aspect 19

According to an Aspect 19, in any one of the Aspects 1 to 18, the sealing member is an elastic body.

Aspect 20

According to an Aspect 20, in any one of the Aspects 1 to 13, the nozzle hole includes a small-diameter portion having an inner diameter smaller than an inner diameter of the nozzle on the opposite surface, and the small-diameter portion is formed on the discharge side of the nozzle plate.

Aspect 21

According to an Aspect 21, a liquid discharge apparatus (for example, liquid discharge apparatus) includes a moving unit (for example, a piezoelectric element 18) that moves the needle valve; and the liquid discharge head according to any one of the Aspects 1 to 20.

The invention claimed is:

1. A liquid discharge head comprising:

a nozzle plate having:
- a first nozzle; and
- a second nozzle,
- from each of which a liquid is dischargeable from a first face of the nozzle plate;

a channel communicating with each of the first nozzle and the second nozzle, the channel on a second face opposite to the first face of the nozzle plate;

multiple cylindrical protrusions having:
- a first cylindrical protrusion around the first nozzle and protruding continuously from an inner wall face of the first nozzle toward the channel, the first cylindrical protrusion having a first outer diameter; and
- a second cylindrical protrusion around the second nozzle and protruding continuously from an inner wall face of the second nozzle toward the channel, the second cylindrical protrusion having a second outer diameter larger than the first outer diameter of the first cylindrical protrusion;

multiple sealing members having:
- a first sealing member to contact with a top face of the first cylindrical protrusion; and
- a second sealing member to contact with a top face of the second cylindrical protrusion; and multiple needle valves including:
- a first needle valve holding the first sealing member and movable between:
  - a first position at which the first sealing member contacts the first cylindrical protrusion to close the first nozzle; and
  - a second position at which the first sealing member separated from the first cylindrical protrusion to open the first nozzle; and a second needle valve holding the second sealing member and movable between:

a first position at which the second sealing member contacts the second cylindrical protrusion to close the second nozzle; and a second position at which the second sealing member separated from the second cylindrical protrusion to open the second nozzle, wherein the first cylindrical protrusion has a first edge processed portion in which a first edge of the first cylindrical protrusion is processed to have a first edge processing width in a radial direction of the first cylindrical protrusion, and the second cylindrical protrusion has a second edge processed portion in which a second edge of the second cylindrical protrusion is processed to have a second edge processing width larger than the first edge processing width in a radial direction of the second cylindrical protrusion.

2. The liquid discharge head according to claim 1, wherein the first edge processed portion has a first outer-edge processed portion in which an outer edge of the first edge of the first cylindrical protrusion is processed to have a first outer-edge processing width in the radial direction of the first cylindrical protrusion, and the second edge processed portion has a second outer-edge processed portion in which an outer edge of the second edge of the second cylindrical protrusion is processed to have a second outer-edge processing width larger than the first outer-edge processing width in the radial direction of the second cylindrical protrusion.

3. The liquid discharge head according to claim 2, wherein each of the first outer-edge processed portion and the second outer-edge processed portion has one of:

a chamfered edge;

a fillet edge; or a stepped edge.

4. The liquid discharge head according to claim 2, wherein the first edge processed portion has a first inner-edge processed portion in which an inner edge of the first edge of the first cylindrical protrusion is processed to have a first inner-edge processing width in the radial direction of the first cylindrical protrusion, and the second edge processed portion has a second inner-edge processed portion in which an inner edge of the second edge of the second cylindrical protrusion is processed to have a second inner-edge processing width larger than the first inner-edge processing width in the radial direction of the second cylindrical protrusion.

5. The liquid discharge head according to claim 4, wherein each of the first inner-edge processed portion and the second inner-edge processed portion has one of:

a chamfered edge;

a fillet edge; or a stepped edge.

6. The liquid discharge head according to claim 1, wherein each of the multiple sealing members has a contact face contactable with one of the top face of the first cylindrical protrusion and the top face of the second cylindrical protrusion, and the contact face has a concentric circular shape.

7. The liquid discharge head according to claim 1, wherein the multiple sealing members are an elastic body compressible and deformable by the multiple cylindrical protrusions respectively contacting the multiple sealing members.

8. The liquid discharge head according to claim 1, wherein the first nozzle includes a first small-diameter portion on the first face of the nozzle plate, the first small-diameter portion having a first inner diameter smaller than the first diameter of the first nozzle on the second face; and the second nozzle includes a second small-diameter portion on the first face of the nozzle plate, the second small-diameter portion having a second inner diameter smaller than the first inner diameter of the first small-diameter portion and a diameter of the second nozzle on the second face.

9. A liquid discharge apparatus comprising:

the liquid discharge head according to claim 1; and a carriage to move the liquid discharge head.

10. A liquid discharge head comprising:

a nozzle plate having:

a first nozzle having a first diameter; and a second nozzle having the first diameter, from each of which a liquid is dischargeable from a first face of the nozzle plate;

a channel communicating with each of the first nozzle and the second nozzle, the channel on a second face opposite to the first face of the nozzle plate;

multiple sealing members having:

a first sealing member having a second diameter larger than the first diameter of the first nozzle, the first sealing member to contact with the second face of the nozzle plate to close the first nozzle; and a second sealing member having a third diameter larger than the first diameter of the second nozzle and the second diameter of the first sealing member, the second sealing member to contact with the second face of the nozzle plate to close the second nozzle; and multiple needle valves including:

a first needle valve holding the first sealing member and movable between:

a first position at which the first sealing member contacts the second face of the nozzle plate to close the first nozzle; and a second position at which the first sealing member separated from the second face of the nozzle plate to open the first nozzle; and a second needle valve holding the second sealing member and movable between:

a first position at which the second sealing member contacts the second face of the nozzle plate to close the second nozzle; and a second position at which the second sealing member separated from the second face of the nozzle plate to open the second nozzle, wherein the first nozzle has a first edge processed portion in which a first edge of the first nozzle on the second face is processed to have a first edge processing width in a radial direction of the first nozzle, and the second nozzle has a second edge processed portion in which a second edge of the second nozzle is processed to have a second edge processing width larger than the first edge processing width in a radial direction of the second nozzle.

11. The liquid discharge head according to claim 10, wherein each of the first edge processed portion and the second edge processed portion has one of:
a chamfered edge;
a fillet edge; or
a stepped edge.

12. The liquid discharge head according to claim 10, each of the multiple sealing members has a contact face contactable with the second face of the nozzle plate, and
the contact face has a concentric circular shape.

13. A liquid discharge head comprising:
a nozzle plate having:
a first nozzle having a first diameter; and
a second nozzle having the first diameter,
from each of which a liquid is dischargeable from a first face of the nozzle plate;
a channel communicating with each of the first nozzle and the second nozzle, the channel on a second face opposite to the first face of the nozzle plate; multiple sealing members having:
a first sealing member on the second face of the nozzle plate surrounding the first nozzle, the first sealing member having a first opening having a second diameter larger than the first diameter of the first nozzle; and
a second sealing member on the second face of the nozzle plate surrounding the second nozzle, the second sealing member having a second opening having a third diameter larger than the first diameter of the first nozzle and the second diameter of the first opening; and
multiple needle valves including:
a first needle valve movable between:
a first position at which the first needle valve contacts the first sealing member to close the first nozzle; and
a second position at which the first needle valve separated from the second sealing member to open the first nozzle; and
a second needle valve movable between:
a first position at which the second needle valve contacts the second sealing member to close the second nozzle; and
a second position at which the second needle valve separated from the second sealing member to open the second nozzle,
wherein the first needle valve has a first edge processed portion in which a first edge of the first needle valve facing the second face is processed to have a first edge processing width in a radial direction of the first needle valve, and
the second needle valve has a second edge processed portion in which a second edge of the second needle valve is processed to have a second edge processing width larger than the first edge processing width in a radial direction of the second needle valve.

14. The liquid discharge head according to claim 13, wherein each of the first edge processed portion and the second edge processed portion has one of:
a chamfered edge;
a fillet edge; or
a stepped edge.

15. The liquid discharge head according to claim 13, the multiple sealing members have multiple contact faces contactable with the multiple needle valves, respectively, and
each of the multiple contact faces has a concentric circular shape.

16. The liquid discharge head according to claim 13, wherein the first needle valve has a first annular protrusion having a first inner diameter larger than the first diameter of the first nozzle, and
the second needle valve has a second annular protrusion having a second inner diameter smaller than the first inner diameter of the first annular protrusion and larger than the first diameter of the first nozzle, and
the first annular protrusion has a first edge processed portion in which a first edge of the first annular protrusion facing the second face is processed to have a first edge processing width in a radial direction of the first annular protrusion, and
the second annular protrusion has a second edge processed portion in which a second edge of the second annular protrusion facing the second face is processed to have a second edge processing width larger than the first edge processing width in a radial direction of the second annular protrusion.

* * * * *